(12) United States Patent
Katano et al.

(10) Patent No.: US 9,711,812 B2
(45) Date of Patent: Jul. 18, 2017

(54) PIPING UNIT FOR FUEL CELL, FUEL CELL UNIT EQUIPPED WITH PIPING UNIT AND FUEL CELL SYSTEM

(75) Inventors: Koji Katano, Toyota (JP); Naritsune Miyanaga, Toyota (JP); Takashi Mishima, Toyota (JP)

(73) Assignees: TOYOTA JIDOSHA KABUSHIKI KAISHA, Toyota-Shi (JP); AISIN SEIKI KABUSHIKI KAISHA, Kariya-Shi (JP)

( * ) Notice: Subject to any disclaimer, the term of this patent is extended or adjusted under 35 U.S.C. 154(b) by 417 days.

(21) Appl. No.: 13/809,606

(22) PCT Filed: Jul. 13, 2010

(86) PCT No.: PCT/JP2010/004550
§ 371 (c)(1),
(2), (4) Date: Mar. 6, 2013

(87) PCT Pub. No.: WO2012/007989
PCT Pub. Date: Jan. 19, 2012

(65) Prior Publication Data
US 2013/0202979 A1    Aug. 8, 2013

(51) Int. Cl.
*H01M 8/04* (2016.01)
*H01M 8/24* (2016.01)
(Continued)

(52) U.S. Cl.
CPC ... *H01M 8/04201* (2013.01); *H01M 8/04164* (2013.01); *H01M 8/04223* (2013.01); *H01M 8/04753* (2013.01); *H01M 8/04761* (2013.01); *H01M 8/2484* (2016.02); *H01M 8/04007* (2013.01); *H01M 8/04097* (2013.01);
(Continued)

(58) Field of Classification Search
CPC .......................................... H01M 8/24–8/2495
See application file for complete search history.

(56) References Cited

U.S. PATENT DOCUMENTS 5,462,815 A * 10/1995 Horiuchi ........................ 429/415
6,242,119 B1 * 6/2001 Komura et al. ............... 429/424
(Continued)

FOREIGN PATENT DOCUMENTS

DE    102008063540 A1    6/2010
JP       2005-276576 A   10/2005
(Continued)

*Primary Examiner* — Jonathan Crepeau
*Assistant Examiner* — Jacob Buchanan
(74) *Attorney, Agent, or Firm* — Andrews Kurth Kenyon LLP

(57) ABSTRACT

A piping unit includes a cathode gas supply passage arranged to supply a cathode gas, and a cathode gas discharge passage arranged to discharge a cathode off-gas. The cathode gas supply passage includes a cathode supply valve, upstream cathode gas piping and downstream cathode gas piping. The cathode gas discharge passage includes a cathode exhaust valve, upstream cathode off-gas piping and downstream cathode off-gas piping. The cathode gas supply passage and the cathode gas discharge passage are connected with each other by cathode bypass piping and are integrated with each other by joining the cathode supply valve with the upstream cathode off-gas piping.

12 Claims, 36 Drawing Sheets

(51) Int. Cl.
*H01M 8/04082* (2016.01)
*H01M 8/2484* (2016.01)
*H01M 8/04746* (2016.01)
*H01M 8/04007* (2016.01)
*H01M 8/04089* (2016.01)
*H01M 8/04119* (2016.01)
*H01M 8/04223* (2016.01)
*H01M 8/1018* (2016.01)

(52) U.S. Cl.
CPC .... *H01M 8/04141* (2013.01); *H01M 8/04253* (2013.01); *H01M 2008/1095* (2013.01); *Y10T 137/9247* (2015.04)

(56) References Cited

U.S. PATENT DOCUMENTS

| | | | |
|---|---|---|---|
| 2003/0031905 A1* | 2/2003 | Saito et al. | 429/26 |
| 2003/0219644 A1* | 11/2003 | Inai et al. | 429/38 |
| 2005/0079128 A1* | 4/2005 | deVos et al. | 423/658.2 |
| 2005/0106446 A1* | 5/2005 | Sato et al. | 429/38 |
| 2007/0259243 A1 | 11/2007 | Jufuku et al. | |
| 2008/0145741 A1* | 6/2008 | Kimura et al. | 429/34 |
| 2009/0047555 A1* | 2/2009 | Sugawara et al. | 429/19 |
| 2010/0021783 A1 | 1/2010 | Osada et al. | |
| 2010/0143759 A1 | 6/2010 | Kaupert et al. | |
| 2010/0183939 A1 | 7/2010 | Sekine et al. | |

FOREIGN PATENT DOCUMENTS

| | | |
|---|---|---|
| JP | 2006-107979 A | 4/2006 |
| JP | 2006-221915 A | 8/2006 |
| JP | 2007-324006 A | 12/2007 |
| JP | 2008-021439 A | 1/2008 |
| JP | 2008-066087 A | 3/2008 |
| JP | 2008-177100 A | 7/2008 |
| JP | 2008-181783 A | 8/2008 |
| JP | 2008226520 A | 9/2008 |
| JP | 2008-251513 A | 10/2008 |
| WO | 2008/087542 A1 | 7/2008 |

\* cited by examiner

Fig.7A FIRST EMBODIMENT
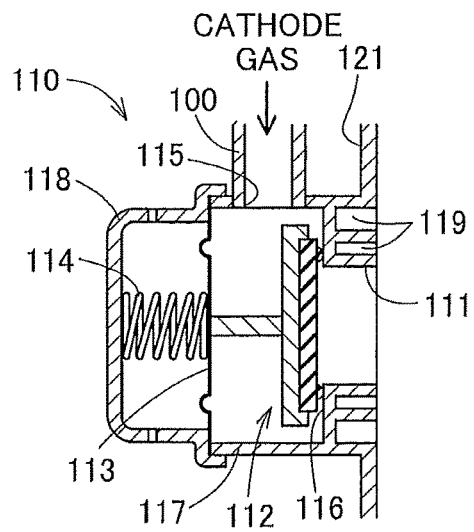
Fig.7B REFERENCE EXAMPLE
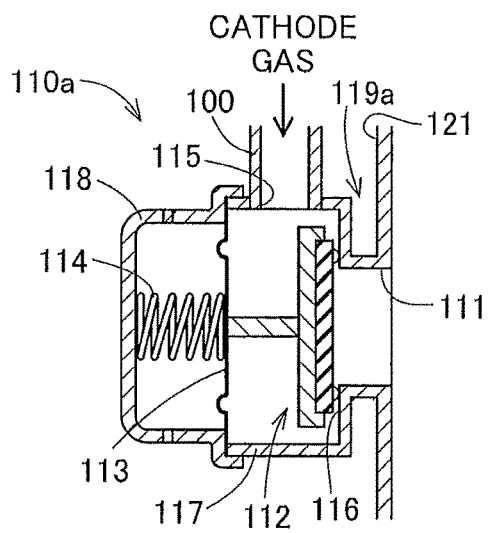
Fig.7C
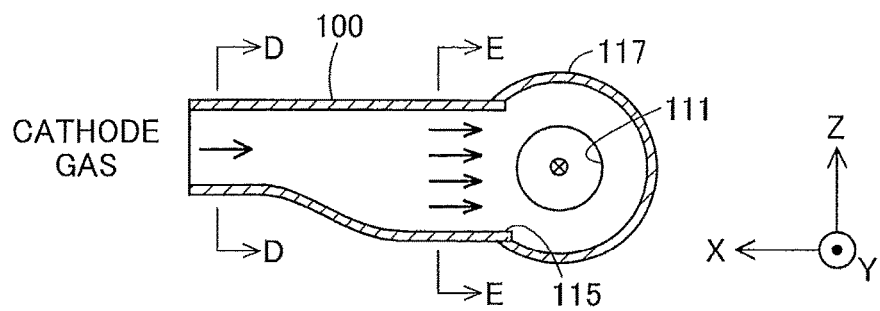
Fig.7D
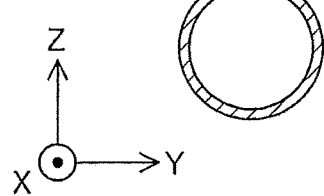
Fig.7E
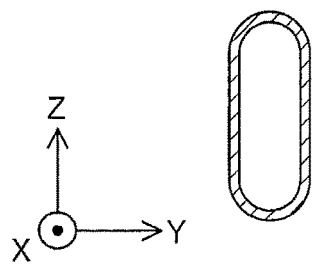

COMPARATIVE EXAMPLE

DURING OPERATION OF FC

AFTER STOP OF FC

UPSTREAM TUBE SECTION

DIRECTION OF ARRAY OF MANIFOLDS

DOWNSTREAM TUBE SECTION

MOVING DIRECTION OF VALVE PLUG

Fig.16
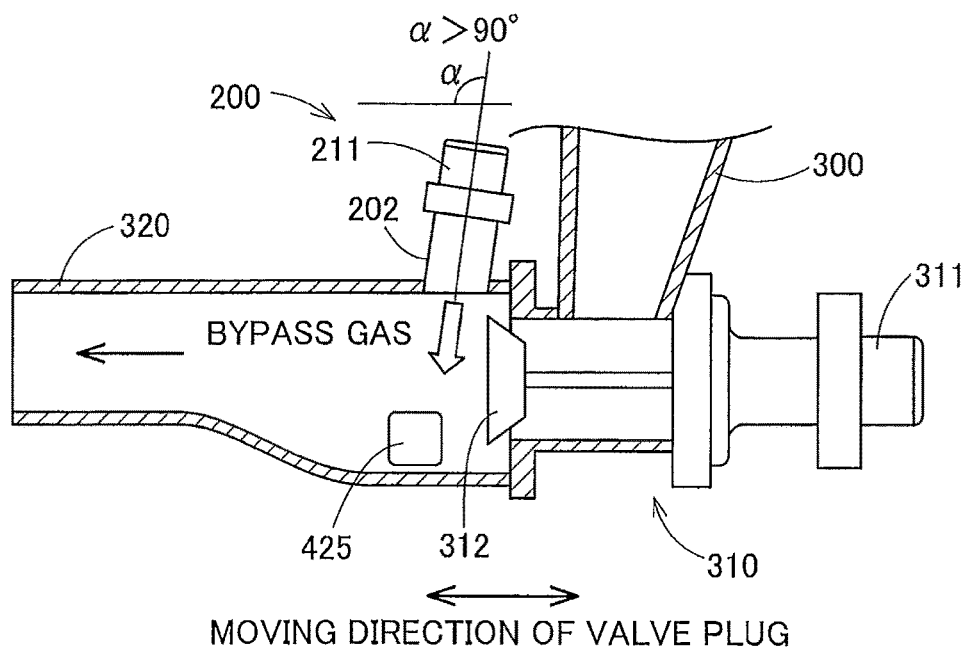
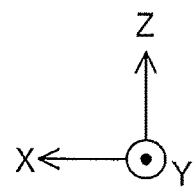

REFERENCE EXAMPLE

REFERENCE EXAMPLE

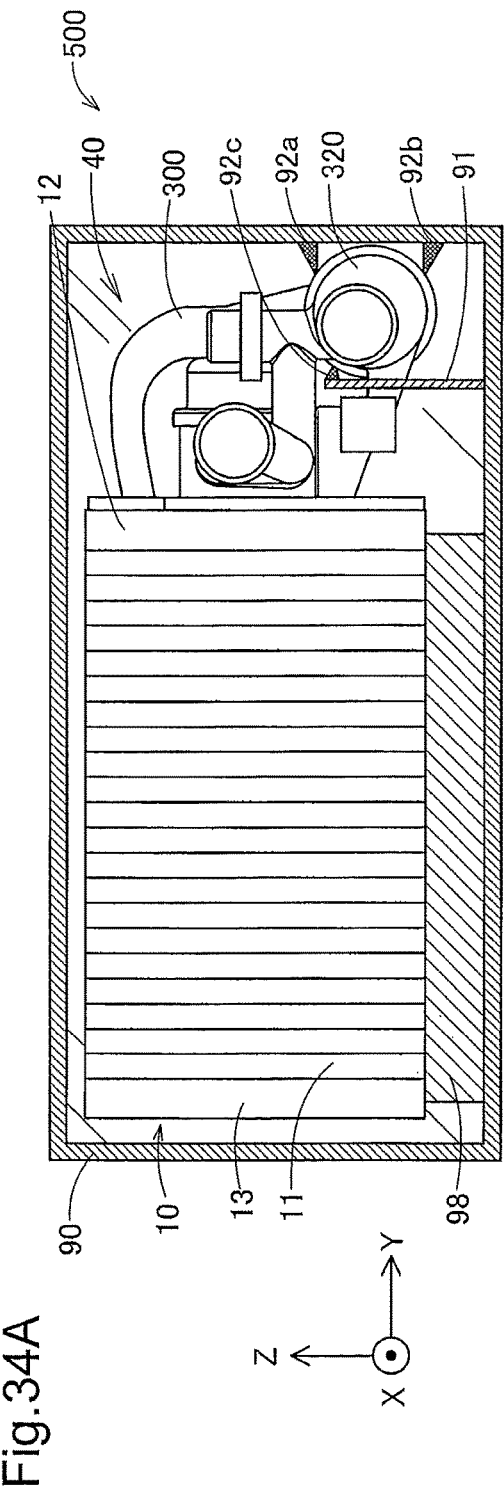
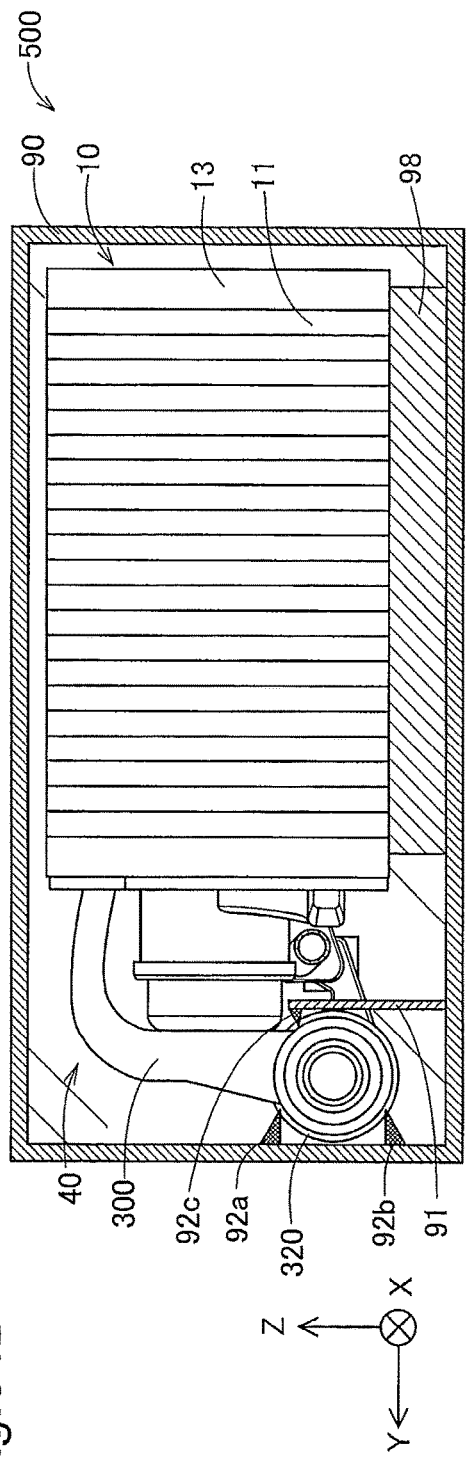
Fig.34A
Fig.34B

PIPING UNIT FOR FUEL CELL, FUEL CELL UNIT EQUIPPED WITH PIPING UNIT AND FUEL CELL SYSTEM

This is a 371 national phase application of PCT/JP2010/004550 filed 13 Jul. 2010, the contents of which are incorporated herein by reference.

FIELD OF THE INVENTION

The present invention relates to a piping unit for fuel cell, a fuel cell unit equipped with the piping unit, and a fuel cell system.

BACKGROUND OF THE INVENTION

A fuel cell system generally includes a fuel cell and tubes for reactive gases and accessories such as pumps and valves, which are to be connected to the fuel cell, and is mounted on a limited space, such as a vehicle. The technology of integrating part of the system or the whole system with the fuel cell (unitization) for size reduction has been proposed to improve the mountability of the fuel cell system (e.g., PTL1).

In the structure of unitizing part of the fuel cell system to improve the mountability of the fuel cell system, it is desirable to improve the convenience of attachment of the unitized tubes and accessories to the fuel cell. In the structure of unitizing part of the fuel cell system, it is also desirable to prevent reduction of the supply efficiencies of the reactive gases to the fuel cell, reduction of the discharge efficiency of drainage water from the fuel cell and reduction of the overall efficiency of the fuel cell system. Additionally, in the structure of utilizing part of the fuel cell system to the concentrated arrangement of the fuel cell, the tubes and the accessories, it is desirable to prevent the fuel cell from being affected by a damage of any of such tubes and accessories. There has been no sufficient measure to satisfy such requirements.

CITATION LIST

Patent Literatures

PTL1: JP 2006-107979A
PTL2: JP 2008-181783A
PTL3: JP 2006-221915A
PTL4: JP 2008-021439A

SUMMARY OF THE INVENTION

Technical Problem

The object of the invention is to provide technology of unitizing part of a fuel cell system.

Solution to Problem

In order to solve at least part of the above problem, the invention provides various aspects and embodiments described below.

[First Aspect]

A piping unit for fuel cell, which is connected with a fuel cell having a cathode gas supply manifold and a cathode gas exhaust manifold formed in one end plate, the piping unit for fuel cell comprising:

a cathode gas supply passage arranged to supply a cathode gas to the fuel cell; and a cathode gas discharge passage arranged to discharge a cathode off-gas from the fuel cell, wherein the cathode gas supply passage includes: a cathode supply valve configured to control flow of the cathode gas; upstream cathode gas piping connected with an inlet of the cathode supply valve; and downstream cathode gas piping connected with an outlet of the cathode supply valve and connected with the cathode gas supply manifold, the cathode gas discharge passage includes: a cathode exhaust valve configured to control flow of the cathode off-gas; upstream cathode off-gas piping connected with an inlet of the cathode exhaust valve and connected with the cathode gas exhaust manifold; and downstream cathode off-gas piping connected with an outlet of the cathode exhaust valve, and the cathode gas supply passage and the cathode gas discharge passage are coupled with each other via a joint and are thereby integrally attached to the fuel cell.

According to a first aspect,

The tubes and valves for discharge of the cathode off-gas as well as the tubes and valves for supply of the cathode gas are unitized to this piping unit for fuel cell and are integrally attached to the fuel cell. Such unitization of the tubes and valves for the cathode gas improves the convenience of attachment of the tubes and valves to the fuel cell. Using this piping unit for fuel cell achieves size reduction of a fuel cell system.

[Second Aspect]

The piping unit for fuel cell according to the first aspect, wherein the cathode supply gas passage includes cathode bypass piping arranged to connect the upstream cathode gas piping with the downstream cathode off-gas piping and bypass part of the cathode gas to the downstream cathode off-gas piping, and a bypass piping valve configured to control flow of the cathode gas in the cathode bypass piping, and the cathode gas supply passage and the cathode gas discharge passage are integrated with each other via the cathode bypass piping as the joint.

According to a second aspect,

This piping unit for fuel cell includes the cathode bypass piping, which improves the controllability of the cathode gas to be supplied to the fuel cell. The cathode gas supply passage and the cathode gas discharge passage are integrated via the cathode bypass piping as the joint. This enables more efficient unitization of the tubes and valves.

[Third Aspect]

The piping unit for fuel cell according to the second aspect, wherein the cathode supply valve is placed in a plane of the end plate and is located above the cathode exhaust valve in a direction of gravity, the upstream cathode gas piping is extended along outer surface of the end plate to be connected with the cathode supply valve, the downstream cathode off-gas piping is located below the upstream cathode gas piping in the direction of gravity to be more distant away from the end plate than the upstream cathode gas piping and is extended in parallel to the upstream cathode gas piping to be connected with the cathode exhaust valve, and the upstream cathode off-gas piping is extended from the cathode exhaust valve beyond the cathode supply valve upward in the direction of gravity to be connected with the cathode gas exhaust manifold.

According to a third aspect,

This piping unit for fuel cell enables the drainage water of the fuel cell to be introduced by gravity and flowed into the cathode exhaust valve and the downstream cathode off-gas piping located on the lower side in the direction of gravity. This improves the water drainage efficiency of the fuel cell. The upstream cathode off-gas piping is extended beyond the cathode supply valve upward in the direction of gravity. This enables the cathode gas supply passage to be integrated with the cathode gas discharge passage.

[Fourth Aspect]

The piping unit for fuel cell according to the third aspect, further comprising:

an anode gas discharge passage arranged to discharge an anode off-gas from the fuel cell, wherein the anode gas discharge passage includes: anode off-gas piping connected with an anode gas exhaust manifold formed in the end plate and configured to have a gas-liquid separating structure to separate water from the anode off-gas; separate gas piping arranged to introduce a gas component separated by the gas-liquid separating structure; and separate water drainage piping arranged to introduce and discharge the water separated by the gas-liquid separating structure, the separate water drainage piping has a bottom face provided to be located above a bottom face of the downstream cathode off-gas piping in the direction of gravity, and the anode gas discharge passage is located between the end plate and the downstream cathode off-gas piping and is integrated with the cathode gas discharge passage by the separate water drainage piping inclined downward in the direction of gravity to and connected with the downstream cathode off-gas piping.

According to a fourth aspect,

The cathode gas supply passage, the cathode gas discharge passage and the anode gas discharge passage are integrated together in this piping unit for fuel cell. This further facilitates attachment of the tubes and valves for the reactive gases to the fuel cell. The anode gas discharge passage is located between the end plate and the downstream cathode off-gas piping. This arrangement effectively prevents size expansion of the piping unit for fuel cell by the presence of the anode gas discharge passage. Using this piping unit for fuel cell achieves size reduction of a fuel cell system that circulates and recycles the anode off-gas.

[Fifth Aspect]

The piping unit for fuel cell according to the fourth aspect, wherein the downstream cathode off-gas piping is connected with the cathode exhaust valve at a first connecting location and is connected with the separate water drainage piping at a second connecting location, and the cathode bypass piping is inclined to and connected with the downstream cathode off-gas piping to be open toward either the first connecting location or the second connecting location.

According to a fifth aspect,

This piping unit for fuel cell can efficiently remove water at the first connecting location or at the second connecting location by the gas flowing out of the cathode bypass piping. This prevents freezing of the valves and degradation of the tubes and valves in the piping unit for fuel cell. This accordingly improves the startability of a fuel cell system using this piping unit for fuel cell in a low-temperature environment and prevents degradation of the fuel cell system.

[Sixth Aspect]

The piping unit for fuel cell according to any one of aspects 3 to 5, wherein the upstream cathode off-gas piping includes a first gas tube section inclined upward in the direction of gravity from a junction with the cathode gas exhaust manifold, and a second gas tube section extended downward in the direction of gravity from the first gas tube section.

According to a sixth aspect,

This piping unit for fuel cell enables liquid water condensed in the first gas tube section of the upstream cathode off-gas piping after operation stop of the fuel cell to be accumulated in the first gas tube section. This prevents the liquid water from flowing into the cathode exhaust valve and thereby prevents degradation and freezing of the cathode exhaust valve.

[Seventh Aspect]

The piping unit for fuel cell according to any one of aspects 3 to 6, wherein the cathode bypass piping includes an upstream tube section extended from the upstream cathode gas piping in a direction opposite to the end plate, and a downstream tube section bent from the upstream tube section and extended toward the downstream cathode off-gas piping located below the downstream tube section in the direction of gravity, and the bypass piping valve is placed inside the downstream tube section and has a valve plug configured to move along a piping direction of the downstream tube section and a valve seat located below the valve plug in the direction of gravity and configured to receive the valve plug.

According to a seventh aspect,

In this piping unit for fuel cell, the cathode bypass piping and the bypass piping valve are compactly arranged. Even when the valve plug floats due to a failure of the bypass piping valve, the valve plug is guided to its closed position by the flow of the cathode gas. This enables continuous operation of the fuel cell, regardless of the failure of the bypass piping valve.

[Eighth Aspect]

The piping unit for fuel cell according to any one of aspects 1 to 7, wherein the cathode supply valve is configured to have an inlet formed to be open to a direction along outer surface of the end plate and an outlet formed to be open to the outer surface of the end plate, the downstream cathode gas piping has a passage outer wall formed to surround outer periphery of the outlet of the cathode supply valve and extended in the direction along the outer surface of the end plate to cover the cathode gas supply manifold for the cathode gas, the passage outer wall is attached to the end plate to form an air-tight cavity between an inner wall surface of the passage outer wall and the outer surface of the end plate for coupling the outlet of the cathode supply valve with the cathode gas supply manifold, and the outer surface of the end plate is used as a guide wall surface to introduce the cathode gas.

According to an eighth aspect,

In this piping unit for fuel cell, the outer surface of the end plate is used as the passage wall surface of the cathode gas. This achieves size reduction and weight reduction of the downstream cathode gas piping. This leads to size reduction and weight reduction of the piping unit for fuel cell and size reduction and weight reduction of a fuel cell system including the piping unit for fuel cell.

[Ninth Aspect]

The piping unit for fuel cell according to the eighth aspect, wherein the cathode supply valve is a poppet valve opened and closed by moving a valve plug along an opening direction of the inlet, and the upstream cathode gas piping has a cross-sectional shape substantially fixed from an upstream end to a downstream end.

According to a ninth aspect,

In this piping unit for fuel cell, a light-weight, compact poppet valve is adopted for the cathode supply valve. This achieves further size reduction of a fuel cell system. The upstream cathode gas piping is structured to have the cross-sectional shape substantially fixed from the upstream end to the downstream end. This reduces a pressure drop of the cathode gas and improves the convenience of connection with external tubes.

[Tenth Aspect]

A fuel cell unit, comprising:

a fuel cell having a cathode gas supply manifold and a cathode gas exhaust manifold formed in one end plate;

the piping unit for fuel cell according to any one of aspects 1 to 10 to be connected with the fuel cell; and a housing provided to place the fuel cell and the piping unit for fuel cell therein, wherein the housing has a bulkhead formed between the downstream cathode off-gas piping of the piping unit for fuel cell and the end plate of the fuel cell.

According to a tenth aspect,

In this piping unit for fuel cell, the bulkhead formed in the housing effectively protects the fuel cell from drainage water leaked from the piping unit for fuel cell.

[Eleventh Aspect]

A fuel cell system, comprising:

a fuel cell having a cathode gas supply manifold and a cathode gas exhaust manifold formed in one end plate;

the piping unit for fuel cell according to the seventh aspects to be connected with the fuel cell;

a controller configured to control opening/closing of the cathode exhaust valve and the bypass piping valve of the piping unit for fuel cell, so as to regulate a flow rate of a cathode gas to be supplied to the fuel cell; and a stuck-open state detector configured to detect a stuck-open state of the bypass piping valve, wherein when the stuck-open state detector detects the stuck-open state of the bypass piping valve, the controller controls the cathode exhaust valve to be closed, so as to increase a flow rate of a gas flowing into the bypass piping valve and thereby increase an external force applied to the valve plug.

According to an eleventh aspect,

Even when the stuck-open state of the bypass piping valve occurs, the configuration of this fuel cell system can eliminate the stuck-open state by the simple operation.

The invention may be implemented by any of various applications, for example, a piping unit for fuel cell, a fuel cell unit provided by attachment of such a piping unit for fuel cell to a fuel cell, a fuel cell system including such a fuel cell unit, and a vehicle equipped with such a fuel cell system.

BRIEF DESCRIPTION OF DRAWINGS

FIGS. 7A to 7E are schematic cross sectional views illustrating structures of upstream cathode gas piping and a cathode supply valve;

FIG. 16 is a diagram illustrating the connecting locations of the cathode bypass piping and separate water drainage piping to downstream cathode off-gas piping;

FIGS. 34A and 34B are respectively a schematic left side view and a schematic right side view of the fuel cell unit of the third embodiment;

DETAILED DESCRIPTION

A. First Embodiment

Figure 1:
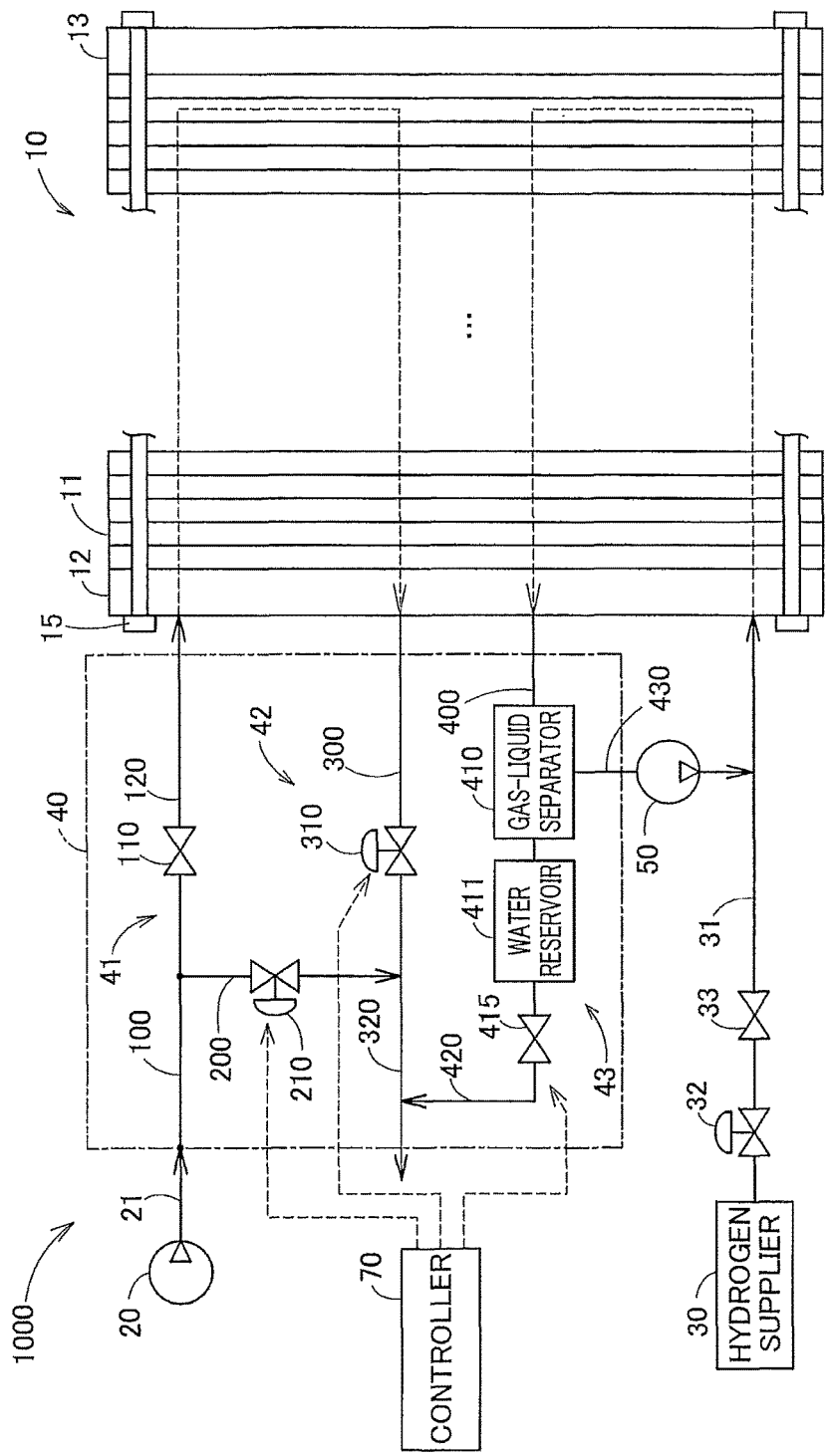
FIG. 1 is a schematic view illustrating the configuration of a fuel cell system according to a first embodiment.

FIG. 1 is a schematic view illustrating the configuration of a fuel cell system according to one embodiment of the invention. This fuel cell system 1000 is mounted on a moving body, such as a vehicle, to supply the generated electric power to a motor that generates a driving force and to various electrical components. The fuel cell system 1000 includes a fuel cell 10, an air compressor 20, an anode gas supplier 30, a piping unit 40, a hydrogen pump 50 and a controller 70. The fuel cell system 1000 also includes a coolant supplier that supplies a coolant to and circulates the coolant in the fuel cell 10, which is not specifically illustrated or described herein.

The fuel cell 10 is provided as a polymer electrolyte fuel cell that generates electricity with supplies of the air (cathode gas) and hydrogen (anode gas) as reactive gases. The fuel cell 10 is, however, not limited to the polymer electrolyte fuel cell but may be any of other various types of fuel cells. The fuel cell 10 includes a plurality of unit cells 11 stacked in series as a power generator and a first end plate 12 and a second end plate 13 located on respective ends in the stacking direction.

Each unit cell 11 has a membrane electrode assembly (not shown) with electrodes formed on respective surfaces of an electrolyte membrane having good proton conductivity in the wet state. Reactive gas supply manifolds and reactive gas exhaust manifolds (not shown) are provided in the form of through holes extended along the stacking direction on the periphery of the membrane electrode assemblies of the respective unit cells 11. Clamping members 15 for clamping the respective unit cells 11 are placed on the periphery of the membrane electrode assemblies to pass through the respective unit cells 11, the first end plate 12 and the second end plate 13 in the stacking direction.

The flows of the reactive gases in the fuel cell 10 are shown by broken-line arrows in FIG. 1. As a matter of convenience, the broken-line arrow representing the flow of the cathode gas and the broken-line arrow representing the flow of the anode gas are separately shown on the upper side of the illustration and on the lower side of the illustration, respectively. In the fuel cell 10, the manifolds described above are formed in the first end plate 12, while the manifolds are not formed in the second end plate 13. In the fuel cell 10, the reactive gas supplied from the side of the first end plate 12 accordingly flows into the membrane electrode assemblies of the respective unit cells 11 via the supply manifold and then flows toward the side of the second end plate 13. An off-gas containing the unreacted reactive gas discharged from the membrane electrode assemblies of the respective unit cells 11, on the other hand, flows from the side of the second end plate 13 toward the side of the first end plate 12 via the exhaust manifold to be discharged.

The air compressor 20 is connected with the piping unit 40 via a tube 21. The air compressor 20 outputs and supplies the high-pressure air obtained by compressing the intake air as the cathode gas to the fuel cell 10. The anode gas supplier 30 includes, for example, a hydrogen tank or a reformer serving to generate hydrogen and is connected with the anode supply manifold of the fuel cell 10 via anode gas supply piping 31 to supply the high-pressure hydrogen. A regulator 32 for controlling the hydrogen pressure and an on-off valve 33 for controlling the hydrogen flow are placed in the anode gas supply piping 31.

The piping unit 40 is provided to integrate gas tubes and valves for the reactive gases to be connected with the fuel cell 10 and thereby unitize part of the fuel cell system 1000. The presence of this piping unit 40 advantageously reduces the size of the fuel cell system 1000. The following describes the functions of the tubes and the valves unitized to the piping unit 40.

The piping unit 40 includes a cathode gas supply passage 41 arranged to supply the cathode gas to the fuel cell 10 and a cathode gas discharge passage 42 arranged to discharge cathode off-gas from the fuel cell 10. The piping unit 40 also includes an anode gas discharge passage 43 arranged to discharge anode off-gas from the fuel cell 10. The cathode gas supply passage 41 includes upstream cathode gas piping 100, a cathode supply valve 110, downstream cathode gas piping 120, cathode bypass piping 200 and a bypass piping valve 210.

The upstream cathode gas piping 100 is a line arranged to connect the tube 21 coupled with the air compressor 20, with the inlet of the cathode supply valve 110. The downstream cathode gas piping 120 is a line arranged to connect the outlet of the cathode supply valve 110 with the cathode supply manifolds formed in the first end plate 12. The cathode supply valve 110 is an on-off valve that is opened in response to supply of the cathode gas having the pressure of or above a predetermined pressure level and may be provided as, for example, a poppet valve.

The cathode bypass piping 200 is a line arranged to connect the upstream cathode gas piping 100 with downstream cathode off-gas piping 320 of the cathode gas discharge passage 42. The cathode bypass piping 200 is arranged to bypass part of the cathode gas flowing into the upstream cathode gas piping 100, to the downstream cathode off-gas piping 320. The bypass piping valve 210 is placed in the cathode bypass piping 200 to control the flow rate of the cathode gas flowing into the cathode bypass piping 200 (hereinafter referred to as "cathode bypass gas" or "bypass gas").

The cathode gas discharge passage 42 includes upstream cathode off-gas piping 300, a cathode exhaust valve 310 and the downstream cathode off-gas piping 320. The upstream cathode off-gas piping 300 is a line for the cathode off-gas arranged to connect the cathode exhaust manifolds formed in the first end plate 12 with the inlet of the cathode exhaust valve 310.

The downstream cathode off-gas piping 320 is a line arranged to discharge an off-gas containing the cathode off-gas and drainage water from the fuel cell 10 to outside of the system. The downstream cathode off-gas piping 320 is connected with the outlet of the cathode exhaust valve 310 and with the cathode bypass piping 200 and separate water drainage piping 420 of the anode gas discharge passage 43.

The cathode exhaust valve 310 serves as a valve to control the pressure of the cathode off-gas.

The anode gas discharge passage 43 includes anode off-gas piping 400, the separate water drainage piping 420 and separate off-gas piping 430.

The anode off-gas piping 400 is a line connected with the anode exhaust manifold formed in the end plate 12 and has a gas-liquid separator 410 and a water reservoir 411. The gas-liquid separator 410 serves to separate water from the inflow anode off-gas and introduces the separate water to the water reservoir 411, while introducing the remaining anode off-gas to the separate off-gas piping 430.

The separate off-gas piping 430 is connected with the hydrogen pump 50. The hydrogen pump 50 has the outlet side connected with the anode gas supply piping 31 to circulate the anode off-gas containing the unreacted hydrogen to the fuel cell 10. The water reservoir 411 is connected with the separate water drainage piping 420 via an anode drain valve 415, and the separate water drainage piping 420 is further connected with the downstream cathode off-gas piping 320. The drainage water on the anode side separated from the anode off-gas is generally accumulated in the water reservoir 411 and is discharged through the separate water drainage piping 420 to the downstream cathode off-gas piping 320 when the anode drain valve 415 is opened.

The fuel cell system 1000 includes various sensors, for example, pressure gauges and flowmeters provided to measure the pressures and the flow rates of the reactive gases and the off-gases, thermometers provided to detect the operating temperature of the fuel cell 10 and the ambient temperature, and a voltmeter and an ammeter provided to measure the amount of electricity generated by the fuel cell 10. These sensors are not specifically illustrated or described herein. These sensors send the measurements results to the controller 70.

The controller 70 is constructed by a microcomputer including a central processing unit and a main storage unit and controls the flows of the reactive gases in the fuel cell system 1000, based on the output requests from external loads and the measurement results of the sensors. More specifically, the controller 70 controls the air compressor 20 to regulate the pressure and the flow rate of the cathode gas output from the air compressor 20. The controller 70 also controls the opening of the bypass piping valve 210 to regulate the flow rate of the bypass cathode gas and thereby regulate the pressure and the flow rate of the cathode gas supplied to the fuel cell 10.

The opening/closing control of the valve generally has the higher response than the output control of the air compressor. In this fuel cell system 1000, the controller 20 performs the opening/closing control of the bypass piping valve 210, in addition to the output control of the air compressor 20. This enables quicker regulation of the pressure and the flow rate of the cathode gas.

The controller 70 may be configured to open the bypass piping valve 210 for the warm-up operation of the fuel cell 10, for example, in a low-temperature environment. In general, the decreased cathode gas supply to the fuel cell relative to the anode gas supply reduces the power generation efficiency of the fuel cell. Continuing the operation of the fuel cell with the low power generation efficiency increases the amount of heat generated by the fuel cell relative to the amount of electricity generated. In other words, in the fuel cell system 1000 of the embodiment, in the low-temperature condition of the fuel cell 10, the fuel cell 10 may be warmed up by opening the bypass piping valve 210 to decrease the cathode gas supply and causing the fuel cell 10 to continue operation with the low power generation efficiency.

During the warm-up operation with the low-efficiency power generation, it is preferable that the cathode gas supply is controlled close to a limit value that does not stop power generation of the fuel cell 10. As described above, in the fuel cell system 1000 of the embodiment, controlling the bypass piping valve 210 enables the quicker regulation of the flow rate of the cathode gas. This ensures adequate control of the cathode gas for the warm-up operation.

It is generally known that decreasing the cathode gas supply to the fuel cell relative to the anode gas supply increases the amount of hydrogen moving from the anode side to the cathode side in each of the unit cells. This results in increasing the amount of hydrogen contained in the cathode off-gas. In the fuel cell system 1000 of the embodiment, however, the warm-up operation with opening the bypass piping valve 210 uses the bypass gas to diffuse hydrogen contained in the cathode off-gas and dilute hydrogen and lower the concentration of hydrogen in the cathode off-gas.

The controller 70 also controls the opening of the cathode exhaust valve 310 to regulate the pressure of the cathode gas in the fuel cell 10. The controller 70 additionally controls the regulator 32 and the on-off valve 33 placed in the anode gas supply piping 31 to regulate the flow rate and the pressure of the anode gas to be supplied to the fuel cell 10. Furthermore, the controller 70 opens the anode drain valve 415 at a predetermined timing to drain the drainage water accumulated in the water reservoir 411.

FIGS. 2 to 4 are schematic views illustrating the appearance of the piping unit 40. Three-dimensional arrows X, Y and Z that are orthogonal to one another are shown in FIGS. 2 to 4 for the purpose of correlation. The piping unit 40 is mounted at a predetermined location (described later) on the outer surface of the first end plate 12 of the fuel cell 10. In the fuel cell system 1000, the fuel cell 10 is located in a predetermined orientation (described later). The piping unit 40 is accordingly arranged and used in the predetermined orientation in the fuel cell system 1000.

The three-dimensional arrows X, Y and Z in the respective illustrations are shown on the basis of the orientation of the piping unit 40 used in the fuel cell system 1000. More specifically, the arrow Z represents the direction opposite to the direction of gravity (height direction). The arrow Y represents the direction going from the second end plate 13 to the first end plate 12 along the stacking direction of the fuel cell 10. The arrow X represents the leftward direction viewed from the opposite direction to the arrow Y with setting the arrow Z to the vertically upward direction.

In the description herein, a surface of the piping unit 40 viewed from the opposite direction to the arrow Y is called "front face", and a surface opposite to the front face is called "back face". A surface of the piping unit 40 viewed from the direction of the arrow X is called "right side face", and a surface opposite to the right side face is called "left side face". A surface of the piping unit 40 viewed from the opposite direction to the arrow Z (direction of gravity) is called "top face", and a surface opposite to the top face is called "bottom face".

Figure 2A:
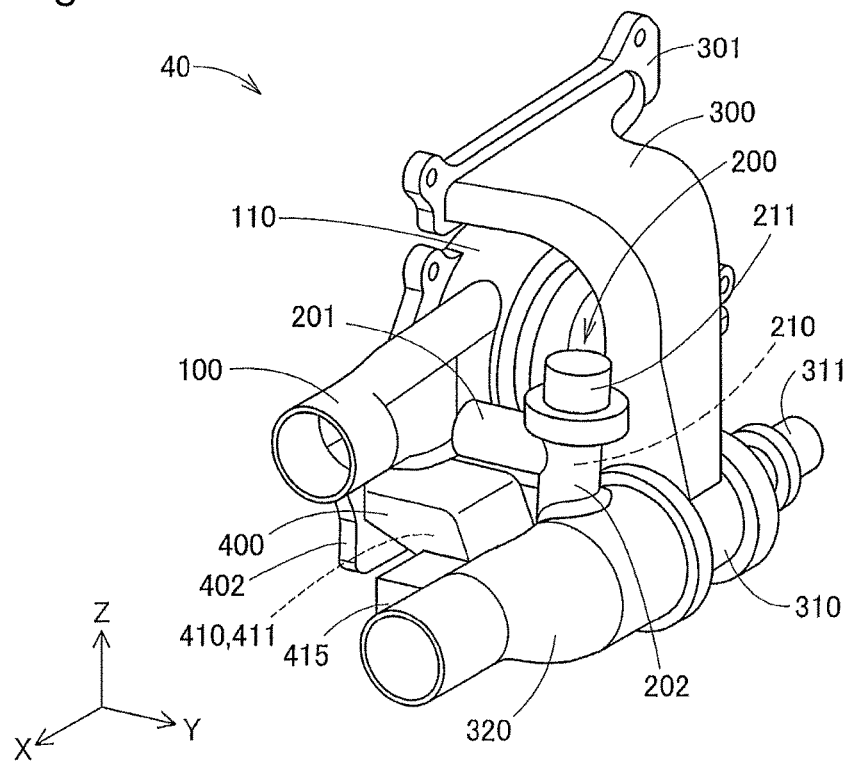
FIGS. 2A and 2B are schematic perspective views illustrating the front side and the back side of a piping unit.
Figure 2B:
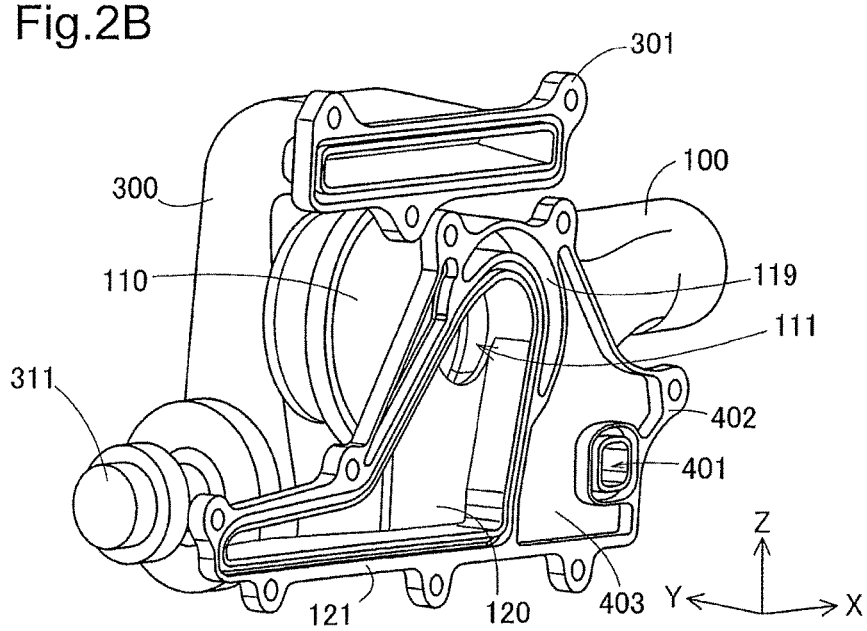
Figure 3A:
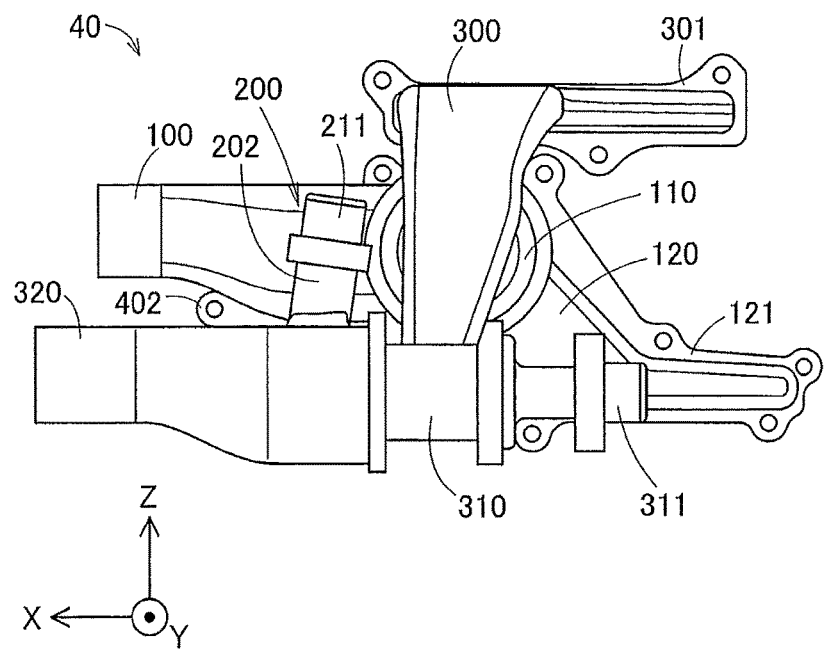
FIGS. 3A and 3B are schematic views illustrating the front face and the top face of the piping unit.
Figure 3B:
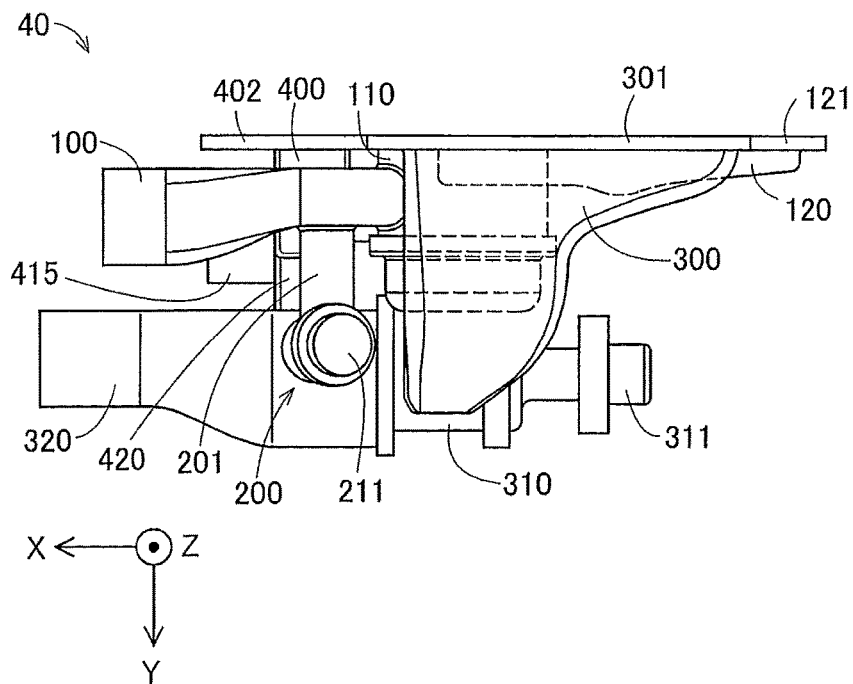
Figure 4A:
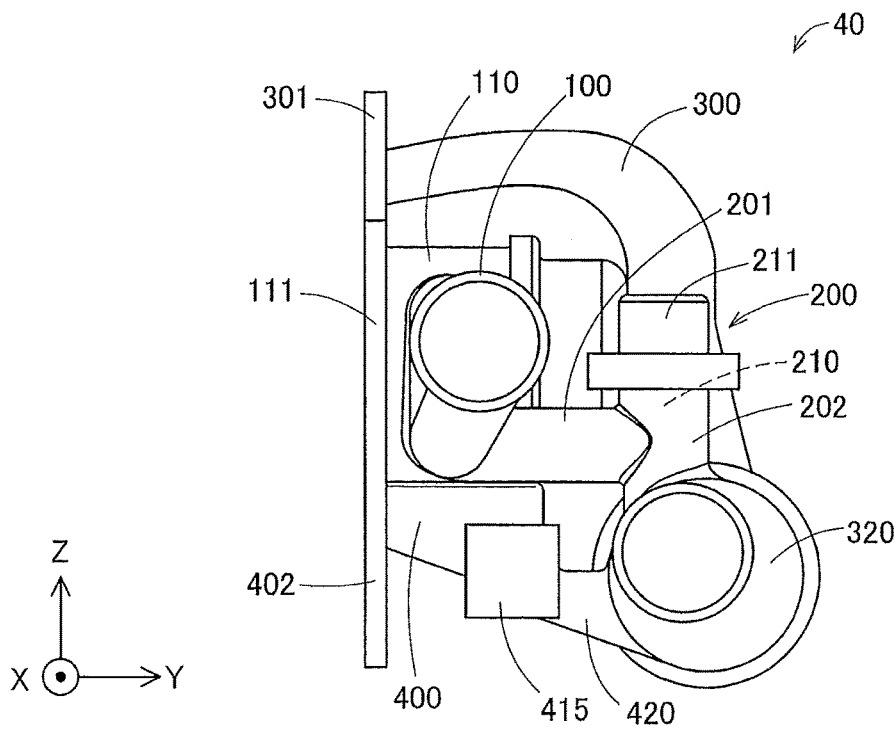
FIGS. 4A and 4B are schematic views illustrating the left side face and the right side face of the piping unit.
Figure 4B:
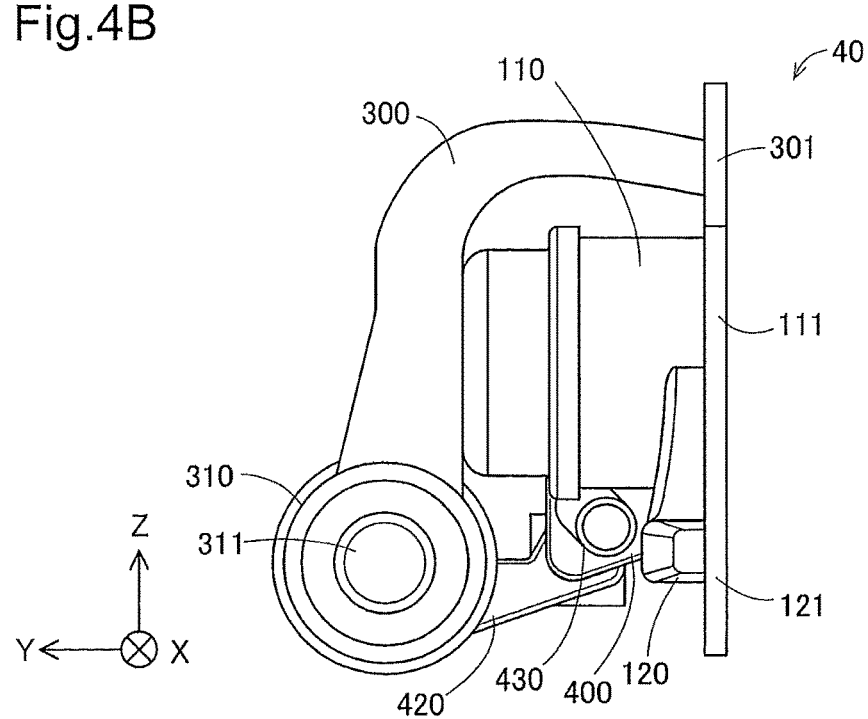

FIG. 2A is a schematic perspective view illustrating the front side of the piping unit 40, and FIG. 2B is a schematic perspective view illustrating the back side of the piping unit 40. FIG. 3A is a schematic view illustrating the front face of the piping unit 40, and FIG. 3B is a schematic view illustrating the top face of the piping unit 40. FIG. 4A is a schematic view illustrating the left side face of the piping unit 40, and FIG. 4B is a schematic view illustrating the right side face of the piping unit 40.

The cathode supply valve 110 has a casing in an approximately cylindrical shape with the direction along the arrow Y set to the height direction and is located on the approximate center of the piping unit 40. The upstream cathode gas piping 100 is arranged as a line extended along the direction of the arrow X and is connected with the cylindrical side face of the casing of the cathode supply valve 110. An outlet 111 open to the back side of the piping unit 40 is formed in the cylindrical bottom face on the back side of the cathode supply valve 110. The downstream cathode gas piping 120 is located on the circumference of the outlet 111.

The downstream cathode gas piping 120 is open to the back side of the piping unit 40 (in the opposite direction to the arrow Y). An outer wall defining this opening is formed to surround the circumference of the outlet 111 of the cathode supply valve 110 and gradually widen downward in the direction of gravity. The flow of the cathode gas in the downstream cathode gas piping 120 will be described later. A flange 121 is formed around the circumference of the opening of the downstream cathode gas piping 120 to fix the piping unit 40 to the first end plate 12. A thin-walled portion 119 is formed on the back side of the flange 121. The thin-walled portion 119 will be described later.

The downstream cathode off-gas piping 320 is arranged as a line extended in parallel to the upstream cathode gas piping 100 at a position on the side in the direction of the arrow Y from the upstream cathode gas piping 100 and below the upstream cathode gas piping 100 in the direction of gravity. The cathode exhaust valve 310 has a casing in an approximately cylindrical shape with the direction along the arrow X set to the height direction and is connected in series with the downstream cathode off-gas piping 320 at a position below the cathode supply valve 110. A motor 311 for driving the valve plug of the cathode supply valve 110 is placed subsequent to the serial arrangement of the downstream cathode off-gas piping 320 and the casing of the cathode exhaust valve 310.

The upstream cathode off-gas piping 300 is arranged as a line extended upward in the direction of gravity along the outer surface of the cathode supply valve 110 from the cylindrical side face of the casing of the cathode exhaust valve 310. More specifically, the upstream cathode off-gas piping 300 has the downstream side extended upward in the direction of gravity along the cylindrical top face of the casing of the cathode supply valve 110 and the upstream side extended toward the back side along the cylindrical side face of the casing of the cathode supply valve 110. An upstream end of the upstream cathode off-gas piping 300 is open to the back side, and a flange 301 is formed around the circumference of the opening to be connected with the first end plate 12.

The cathode bypass piping 200 is located at a position adjoining to the cathode supply valve 110 and the upstream cathode off-gas piping 300. The cathode bypass piping 200 is structured by a curved tube and includes an upstream tube section 201 extended toward the front side from the upstream cathode gas piping 100 and a downstream tube section 202 extended in the direction of gravity from the upstream tube section 201 to be connected with the downstream cathode off-gas piping 320. The bypass piping valve 210 is placed inside the downstream tube section 202 as described later in detail. A motor 211 for driving the valve plug of the bypass piping valve 210 is located above the downstream tube section 202.

The anode off-gas piping 400 is arranged below the upstream cathode off-gas piping 300 and the cathode bypass piping 200. The anode off-gas piping 400 has an opening 401 to be connected with the anode exhaust manifold. The opening 401 is open to the back side, and a flange 402 is formed around the circumference of the opening 401 to be connected with the first end plate 12. A thin-walled portion 403 is formed on the back side of the flange 402.

In the piping unit 40 of the embodiment, the flange 402 for the anode off-gas piping 400 is integrated with the flange 121 for the downstream cathode gas piping 120. This structure enables the cathode gas supply passage 41 and the anode gas discharge passage 43 to be integrally attached to the fuel cell 10. These flanges 121 and 402 are formed to cover over the outer surface of the first end plate 12. The flanges 121 and 402 accordingly serve as the heat insulator to prevent heat dissipation to outside of the fuel cell 10. The thin-walled portion 403 formed on the back side of the flange 402 is closed air-tightly by the outer surface of the first end plate 12 and thereby serves as the heat-insulating layer to prevent heat dissipation to outside of the fuel cell 10.

The gas-liquid separator 410 and the water reservoir 411 are placed inside the anode off-gas piping 400. The detailed structure will be described later. The separate water drainage piping 420 is located between the anode off-gas piping 400 and the downstream cathode off-gas piping 320. The anode drain valve 415 for coupling the water reservoir 411 located inside the anode off-gas piping 400 with the separate water drainage piping 420 is placed across the left side faces of the anode off-gas piping 400 and the separate water drainage piping 420. The separate off-gas piping 430 is connected with the right side face of the anode off-gas piping 400. The separate off-gas piping 430 is extended in the opposite direction to the arrow X below the cathode supply valve 110.

As described above, this piping unit 40 is mounted at a predetermined position on the outer surface of the first end plate 12 of the fuel cell 10. The following describes a concrete mounting position.

Figure 5:
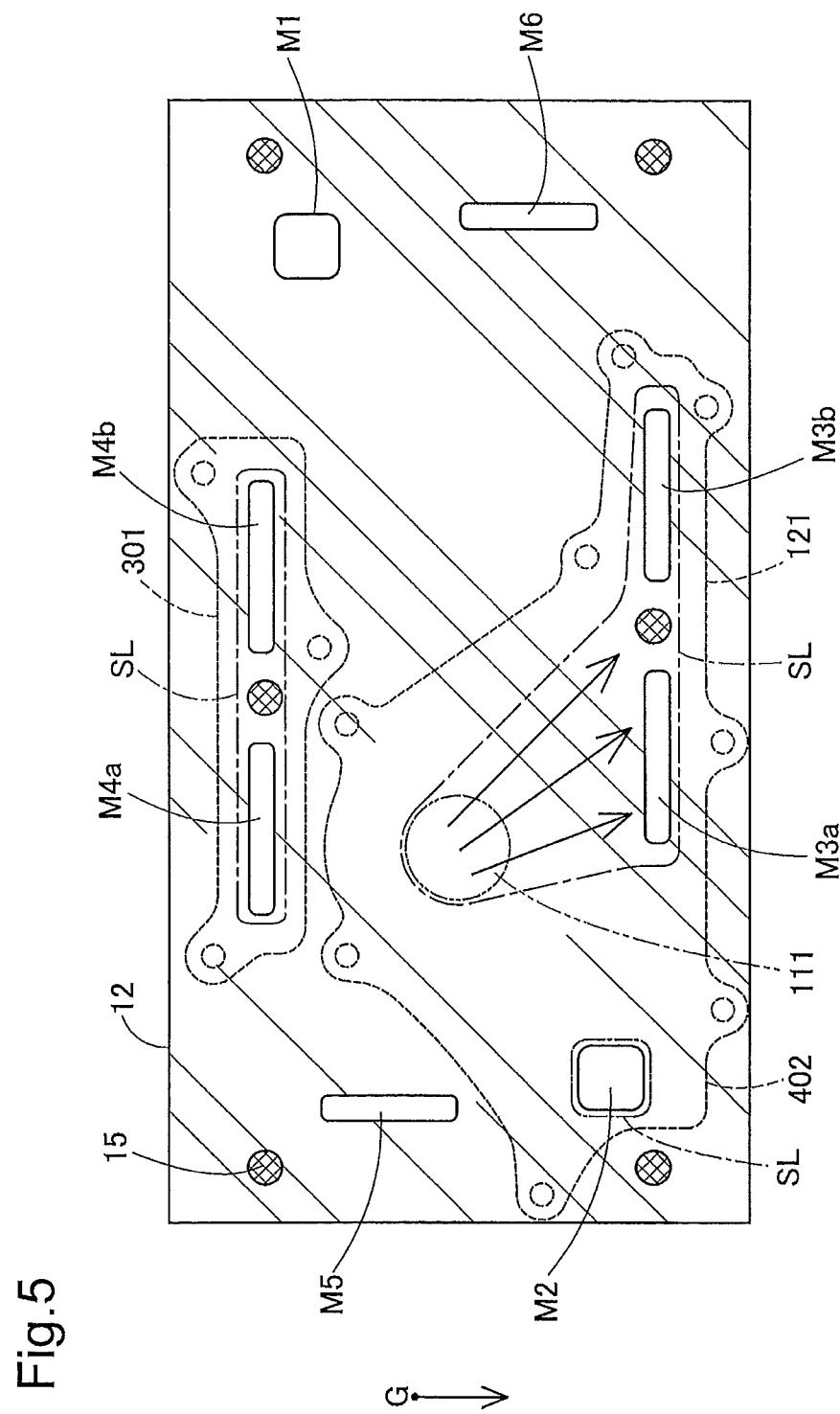
FIG. 5 illustrates a mounting position of the piping unit to the fuel cell.

FIG. 5 illustrates a mounting position of the piping unit 40 to the fuel cell 10. In FIG. 5, the outer surface of the first end plate 12 of the fuel cell 10 is shown, and the outer peripheries of the respective flanges 121, 402 and 301 in the attached state of the piping unit 40 are shown by the broken lines. In FIG. 5, a seal line SL formed between the piping unit 40 and the first end plate 12 in the attached state of the piping unit 40 is also shown by the one-dot chain line. Additionally, in FIG. 5, the position of the outlet 111 of the cathode supply valve 110 is shown by the two-dot chain line, and the flow of the cathode gas flowing out of the outlet 111 is shown by the arrows.

The first end plate 12 is provided by a plate member in an approximately rectangular shape. In the fuel cell system 1000, the fuel cell 10 is arranged such that the longitudinal direction of the first end plate 12 and the stacking direction of the fuel cell 10 are horizontal. In FIG. 5, the direction of gravity in the arrangement of the fuel cell 10 in the fuel cell system 1000 is shown by an arrow G.

The first end plate 12 has an anode supply manifold M1 and an anode exhaust manifold M2 and two cathode supply manifolds M3$a$ and M3$b$ and two cathode exhaust manifolds M4$a$ and M4$b$. The respective manifolds M1, M2, M3$a$, M3$b$, M4$a$ and M4$b$ are arranged along the long sides of the first end plate 12. More specifically, the two cathode supply manifolds M3$a$ and M3$b$ are provided to be arranged along one long side of the first end plate 12, while the two cathode exhaust manifolds M4$a$ and M4$b$ are provided to be arranged along the other long side of the first end plate 12.

The anode supply manifold M1 is arranged on the same side as the cathode exhaust manifolds M4a and M4b, while the anode exhaust manifold M2 is arranged on the same side as the cathode supply manifolds M3a and M3b. The anode supply manifold M1 and the anode exhaust manifold M2 are formed to be arranged diagonally to each other across a center area of the first end plate 12.

Additionally, a coolant supply manifold M5 and a coolant discharge manifold M6 are formed to be opposed to each other across the center area of the first end plate 12 and to be arranged along two short sides of the first end plate 12. The clamping members 15 for clamping the fuel cell 10 are attached to the first end plate 12 to pass through in the thickness direction. The clamping members 15 are set at the four corners of the first end plate 12 and at the positions between the first cathode supply manifold M3a and the second cathode supply manifold M3b and between the first cathode exhaust manifold M4a and the second cathode exhaust manifold M4b.

In the fuel cell system 1000 of this embodiment, the fuel cell 10 is arranged such that the cathode supply manifolds M3a and M3b are located on the upper side in the direction of gravity and the cathode exhaust manifolds M4a and M4b are located on the lower side in the direction of gravity. Such arrangement of the fuel cell 10 causes the cathode gas to flow from the lower side to the upper side along the direction of gravity on the cathode side of each of the unit cells 11. In the polymer electrolyte fuel cell, it is generally desirable to maintain the electrolyte membrane in the wet state during operation. This flow of the cathode gas in the fuel cell 10 applies a force against the gravity on the water contained in the electrolyte membrane of each unit cell 11 and thereby prevents the water from being moved by gravity. Such arrangement of the fuel cell 10 accordingly improves the water retention ability of the electrolyte membrane during operation of the fuel cell 10.

In the attached state of the piping unit 40 to the first end plate 12, the cathode supply valve 110 is located between the cathode supply manifolds M3a and M3b and the cathode exhaust manifolds M4a and M4b. The outlet 111 of the cathode supply valve 110 is open to the outer surface of the first end plate 12. The two cathode supply manifolds M3a and M3b are arranged in a lower end area in the direction of gravity of the opening of the downstream cathode gas piping 120. The anode exhaust manifold M2 is coupled with the opening 401 of the anode off-gas piping 400. The two cathode exhaust manifolds M4a and M4b are arranged in the opening on the upstream end of the upstream cathode off-gas piping 300.

Seal materials (not shown) are set around the circumferences of the openings of the respective pipings 120, 300 and 400, so that the seal line SL is formed in the attached state of the piping unit 40 to the first end plate 12. The seal line SL formed by the downstream cathode gas piping 120 is arranged to surround the area of the outlet 111 of the cathode supply valve 110 and the cathode supply manifolds M3a and M3b.

The opening of the downstream cathode gas piping 120 is closed by the outer surface of the first end plate 12, so that the downstream cathode gas piping 120 defines a cavity for coupling the outlet 111 of the cathode supply valve 110 with the two supply manifolds M3a and M3b. The cathode gas flows through the cavity along the outer surface of the first end plate 12 and flows into the cathode supply manifolds M3a and M3b. In other words, the piping unit 40 uses the outer surface of the first end plate 12 as the guide wall for introducing the cathode gas from the outlet 111 of the cathode supply valve 110 to the supply manifolds M3a and M3b.

As described above, the flow of the cathode gas in the direction opposite to the direction of gravity in the fuel cell 10 improves the water retention ability of the electrolyte membrane in each unit cell 11. On the interruption of the cathode gas supply, for example, after the operation stop of the fuel cell 10, the water on the cathode side of each unit cell 11 may flow back to the supply manifolds M3a and M3b by gravity.

In the piping unit 40 of the embodiment, however, the cathode supply valve 110 is located above the first and second supply manifolds M3a and M3b. This arrangement effectively prevents the water in the fuel cell 10 from flowing into the cathode supply valve 110 after the operation stop. This accordingly prevents freezing of the cathode supply valve 110 or degradation of the cathode supply valve 110 in the low-temperature environment due to the backflow of the water.

As described above, the piping unit 40 of the embodiment is structured by integrating a plurality of tubes and valves for the supply and exhaust of the reactive gases and is integrally attached to the fuel cell 10. The piping unit 40 has the respective components 41 to 43 compactly arranged and is thereby integrated with the fuel cell 10 to be located in the fuel cell system 1000. This achieves size reduction of the fuel cell system 1000. In the piping unit 40 of the embodiment, in order to improve the power generation efficiency of the fuel cell 10 and prevent degradation of the fuel cell 10, the respective components 41 to 43 are structured as described below.

Figure 6A:
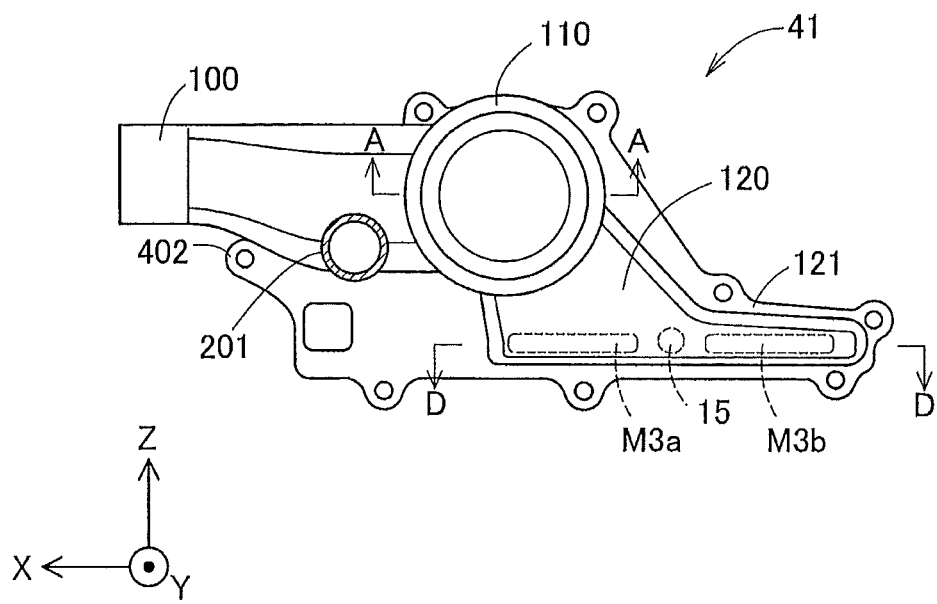
FIGS. 6A and 6B are respectively a schematic front view and a schematic top view illustrating the structure of a cathode gas supply passage.
Figure 6B:
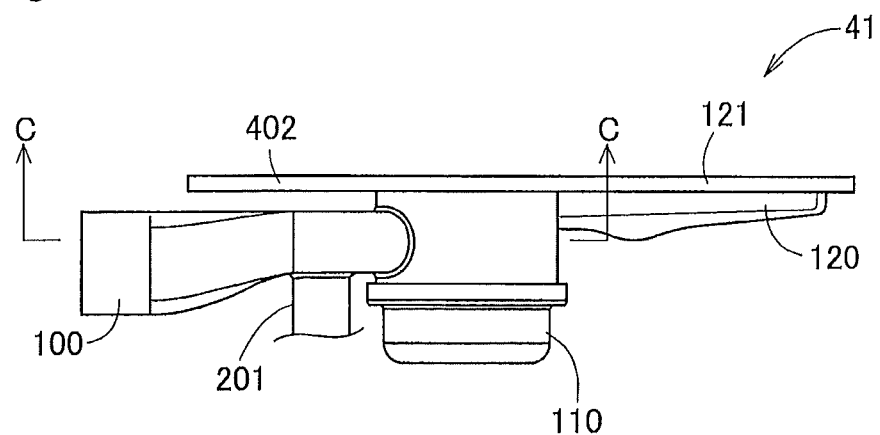

FIGS. 6 to 8 illustrate the more detailed structure of the cathode gas supply passage 41 in the piping unit 40. FIG. 6A is a schematic front view illustrating the cathode gas supply passage 41. FIG. 6B is a schematic top view illustrating the cathode gas supply passage 41. The three-dimensional arrows X, Y and Z similar to those of FIGS. 2 to 4 are shown in FIGS. 6A and 6B. In FIG. 6A, the positions of the cathode supply manifolds M3a and M3b and the clamping member 15 in the downstream cathode gas piping 120 in the attached state of the piping unit 40 to the fuel cell 10 are shown by the broken lines. The illustration of the cathode bypass piping 200 except part of its upstream tube section 201 is omitted from FIGS. 6A and 6B. The flange 402 for the anode off-gas piping 400 integrated with the flange 121 is illustrated in FIGS. 6A and 6B.

FIG. 7A is a schematic cross sectional view of the cathode supply valve 110, taken on a line A-A in FIG. 6A. The cathode supply valve 110 is a poppet valve and includes a valve plug 112, a diaphragm 113, a pressing mechanism 114, a casing 117 and a casing cap 118. The main body of the casing 117 is formed in an approximately cylindrical shape and has the outlet 111 formed on the center of the bottom face as an approximately circular opening and the flange 121 formed around the circumference of the outlet 111. An inlet 115 is formed in the side face of the main body of the casing 117 as an approximately rectangular opening to be connected with the upstream cathode gas piping 110. The top face of the casing 117 is fully open and is closed by attachment of the casing cap 118. An open end of the casing cap 118 has a portion bent outward in an approximately L shape to cover and caulk the open end of the casing 117.

The diaphragm 113 is an approximately disc-shaped thin film having elasticity in the thickness direction and is held between the casing 117 and the casing cap 118 by clamping its peripheral end between the casing 117 and the open end of the casing cap 118. The internal cavity of the cathode supply valve 110 is divided into two, i.e., the casing 117-side internal cavity and the casing cap 118-side internal cavity by the diaphragm 113. The casing 117-side internal cavity is sealed air-tightly from the casing cap 118-side internal cavity by the diaphragm 113. The casing cap 118-side internal cavity communicates with the outside to be held in the atmospheric pressure.

The valve plug 112 is attached to the casing 117-side face of the diaphragm 113 to close the outlet 111. The pressing mechanism 114 is attached to the casing cap 118-side face of the diaphragm 113. The pressing mechanism 114 presses the valve plug 112 against a valve seat 116 on the outer periphery of the outlet 111 via the diaphragm 113. This structure causes the cathode supply valve 110 to be in the normally closed position. When the cathode gas is supplied at a predetermined pressure through the inlet 115 into the casing 117-side internal cavity, the diaphragm 113 is bent toward the casing cap 118-side by the gas pressure. The valve plug 112 is accordingly away from the valve seat 116 on the outer periphery of the outlet 111 to open the cathode supply valve 110.

The cathode supply valve 110 is fixed to the first end plate 12 by the flange 121 formed on the outer periphery of the downstream cathode gas piping 120. As described above, the cathode supply valve 110 is opened and closed repeatedly according to the supply pressure of the cathode gas during operation of the fuel cell 10. Fixation of the cathode supply valve 110 to the first end plate 12 of the material having relatively high rigidity can reduce the vibration accompanied with the opening/closing operations of the cathode supply valve 110.

In the cathode supply valve 110 of the embodiment, the thin-walled portion 119 is formed under the valve seat 116 by thinning the wall from the contact surface of the valve seat 116 with the first end plate 12 (right side of the illustration) toward the seat surface of the valve seat 116 (left side of the illustration). The presence of the thin-walled portion 119 reduces the total weight of the cathode supply valve 110.

FIG. 7B is a schematic cross sectional view showing a cathode supply valve 110a as a reference example. The structure of FIG. 7B is about the same as the structure of FIG. 7A, except the different wall-thinning direction of a thin-walled portion 119a. In the cathode supply valve 110a of the reference example, the thin-walled portion 119a under the valve seat 116 is formed by thinning the wall in the lateral direction of the casing 117 (i.e., in the vertical direction of the illustration). In this structure, formation of the thin-walled portion 119a may cause insufficient rigidity for supporting the seat surface of the valve seat 116 against the pressing direction by the valve plug 112. This may lead to the poor sealing property between the valve seat 116 and the valve plug 112.

In the cathode supply valve 110 of the embodiment (FIG. 7A), on the other hand, the thin-walled portion 119 is formed with remaining the walls (ribs) for supporting the seat surface of the valve seat 116. This structure can reduce the total weight of the cathode supply valve 110, while preventing decrease in rigidity of the valve seat 116.

FIG. 7C is a schematic cross sectional view of the upstream cathode gas piping 100 and the cathode supply valve 110, taken on a line C-C in FIG. 6B. In FIG. 7C, the cathode supply valve 110 except the casing 117 is omitted from the illustration, and the arrows represent the flow of the cathode gas. FIGS. 7D and 7E are respectively schematic cross sectional views of the upstream cathode gas piping 100, taken on a line D-D and a line E-E in FIG. 7C. The three-way arrows X, Y and Z are shown in FIGS. 7C to 7E for the purpose of correlation to FIG. 6.

In general, the upstream flow path cross section of the upstream cathode gas piping 100 preferably has an approximately circular shape to facilitate connection with external piping and attachment of a part, such as a water-proof grommet. The upstream cathode gas piping 100 of the embodiment is accordingly formed to have an approximately circular upstream flow path cross section (FIG. 7D). The downstream flow path cross section of the upstream cathode gas piping 100, on the other hand, preferably has a shape corresponding to the opening shape of the inlet 115 of the cathode supply valve 110.

In the cathode supply valve 110, the increased opening area of the inlet 115 is preferable for preventing an increase in pressure drop of the inflow cathode gas, while the narrowed opening width of the inlet 115 in the direction along the arrow Y is preferable for size reduction of the casing 117. Additionally, in the cathode supply valve 110, the widened flow path width of the inlet 115 in the direction along the arrow Z relative to the outlet 111 is preferable for the improved flow controllability of the cathode gas flowing from the inlet 115 to the outlet 111. According to this embodiment, the inlet 115 of the cathode supply valve 110 is thereby formed as a rectangular opening with the circumferential direction of the casing 117 set to the long sides (FIG. 7A).

The upstream cathode gas piping 100 of the embodiment accordingly has an elongated downstream flow path cross section having the increased flow path width in the direction along the arrow Z corresponding to the opening shape of the inlet 115 and the decreased flow path width in the direction along the arrow Y (FIG. 7E). As just described, the upstream cathode gas piping 100 of the embodiment is structured to have the varying shape of the flow path cross section from the upstream side to the downstream side. The upstream cathode gas piping 100 preferably has the substantially fixed flow path cross section from the upstream side to the downstream side for preventing an increase in pressure drop of the cathode gas, and a gentler change in shape of the flow path cross section is preferable from the upstream side to the downstream side.

Figure 8A:
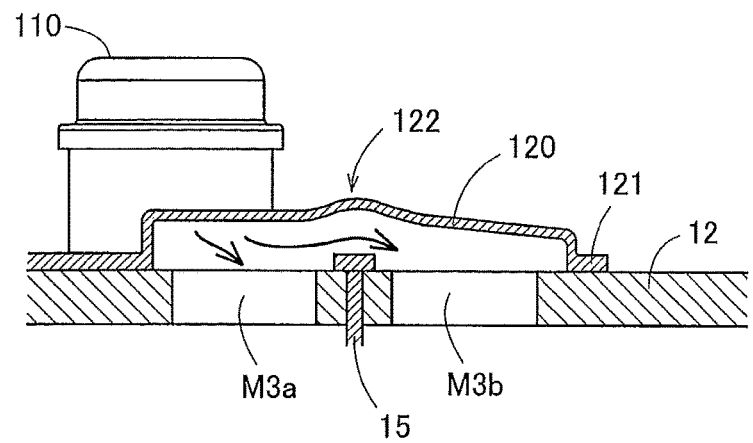
FIGS. 8A and 8B are respectively a schematic cross sectional view illustrating the cross section of downstream cathode gas piping and a diagram showing the installation area of a hydrogen pump.

FIG. 8A is a schematic cross sectional view illustrating the cross section of the downstream cathode gas piping 120, taken on a line D-D in FIG. 6A. In the state of FIG. 8A, the downstream cathode gas piping 120 is attached to the first end plate 12. The clamping member 15 is placed between the first cathode supply manifold M3a and the second cathode supply manifold M3b. In the downstream cathode gas piping 120, protrusion of the top of the clamping member 15 from the outer surface of the first end plate 12 may interfere with the flow of the cathode gas and increase the pressure drop of the cathode gas. In the downstream cathode gas piping 120 of the embodiment, however, a curved convex 122 is formed by curving outward the outer wall in a specific area covering over the top of the clamping member 15, so as to prevent the flow path cross section in the specific area from decreasing. This accordingly prevents the poor flow controllability of the cathode gas to the second supply manifold M3b.

Figure 8B:
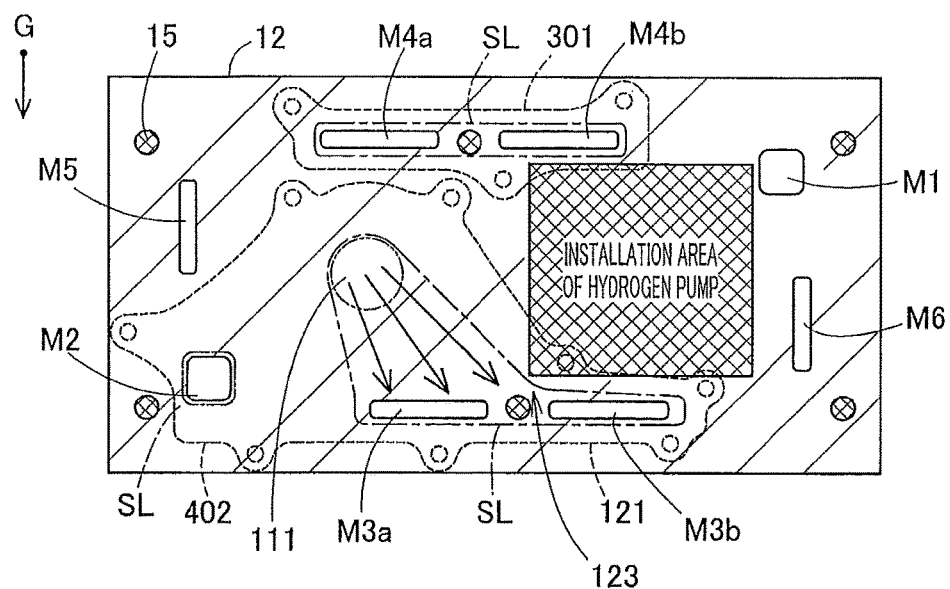

FIG. 8B is a schematic diagram showing the installation area of the hydrogen pump 50. FIG. 8B is substantially similar to FIG. 5 except the area where the hydrogen pump 50 is installed is shown by cross hatching. In the fuel cell system 1000 of the embodiment, the anode off-gas is circulated to the anode gas supply piping 31 via the hydrogen pump 50 (FIG. 1). The piping unit 40 has the separate off-gas piping 430 to introduce the anode off-gas. For the size reduction of the fuel cell system 1000, it is preferable that the hydrogen pump 50 is located between the piping unit 40 and the anode supply manifold M1. In the piping unit 40 of the embodiment, the outer wall of the downstream cathode gas piping 120 is provided as described below to allow the installation of the hydrogen pump 50 adjacent to the piping unit 40.

As described above, the outer wall of the downstream cathode gas piping 120 is formed to gradually widen from the outlet 111 of the cathode supply valve 110 toward the first cathode supply manifold M3a and the second cathode supply manifold M3b. The outer wall of the downstream cathode gas piping 120 has a bend 123 recessed to the flow path side at a location adjacent to the installation area of the hydrogen pump. The presence of this bend 123 reduces the flow path area defined by the downstream cathode gas piping 120 on the outer surface of the first end plate 12 and secures the installation area of the hydrogen pump 50.

The gas flow path in the downstream of the position where the bend 123 is formed has the reduced flow path cross section and accordingly tends to increase the pressure drop. The presence of the clamping member 15 in the downstream of the bend 123 may lead to a further increase of the pressure drop in the downstream of the bend 123. In order to improve the flow controllability of the cathode gas to the first and the second supply manifolds M3a and M3b, it is preferable that the bend 123 is located at a position closer to the second supply manifold M3b than the position of the curved convex 122. This reserves the flow path cross section in the downstream of the bend 123 and prevents an increase of the pressure drop.

Figure 9A:
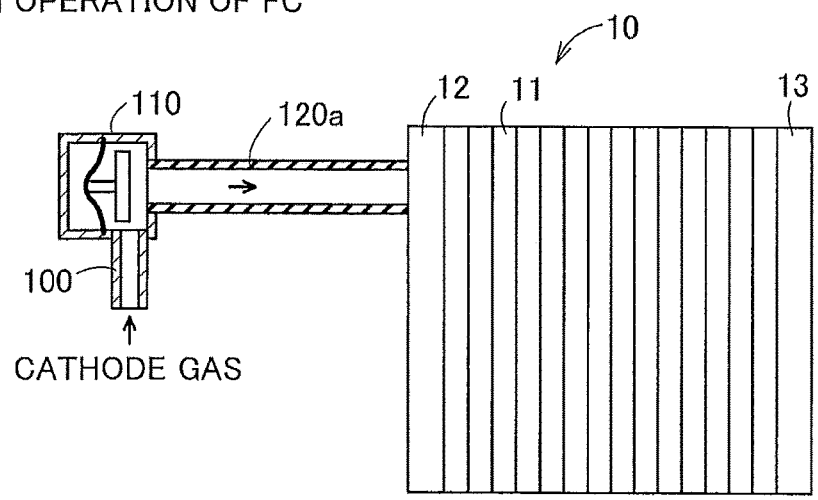
FIGS. 9A and 9B are diagrams illustrating downstream cathode gas piping as a comparative example.
Figure 9B:
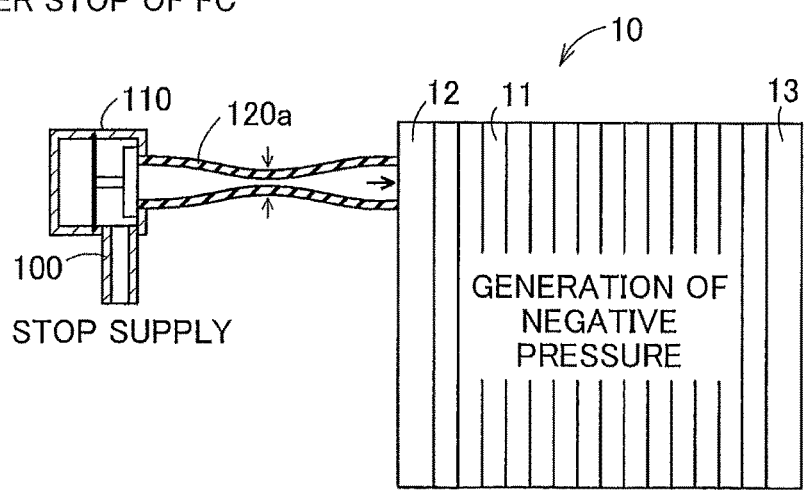

FIG. 9 is diagrams illustrating downstream cathode gas piping 120a of a comparative example. FIGS. 9A and 9B schematically illustrate the fuel cell 10, the upstream cathode gas piping 100, the cathode supply valve 110 and the downstream cathode gas piping 120a with omitting the other components of the fuel cell system from the illustration. FIG. 9A shows the state during operation of the fuel cell 10, and FIG. 9B shows the state after operation stop of the fuel cell 10. In the structure of this comparative example, the downstream cathode gas piping 120a is made of a resin tube and is arranged to connect the cathode supply valve 110 located away from the first end plate 12 with the cathode supply manifolds of the first end plate 12. The downstream cathode gas piping of this comparative example has the greater flow path volume than the flow path volume of the downstream cathode gas piping 120 of the embodiment by the distance of the cathode supply valve 110 away from the first end plate 12.

At the time of operation stop of the fuel cell 10, the supply of the cathode gas is stopped, and the cathode supply valve 110 is closed (FIG. 9B). The cathode exhaust valve 310 and the on-off valve placed in the anode gas supply piping 31 are also closed, although not being specifically illustrated. The fuel cell 10 is accordingly sealed in the remaining state of the reactive gas. Inside of the sealed fuel cell 10, part of the remaining hydrogen is leaked across the electrolyte membrane to the cathode side, and oxygen on the cathode side reacts with the leaked hydrogen and is consumed in each of the unit cells 11. After the operation stop of the fuel cell 10, the pressure of the reactive gas remaining inside the fuel cell 10 and in the downstream of the closed valve decreases with the decreasing temperature of the fuel cell 10. After the operation stop of the fuel cell 10, there may thus be negative pressure generated in the downstream of the cathode supply valve 110.

The generation of negative pressure in the downstream of the cathode supply valve 110 causes the downstream cathode gas piping 120a made of the resin tube to be deformed in the direction of contraction. At the restart of operation of the fuel cell 10, the contracted downstream cathode gas piping 120a is deformed abruptly in the direction of expansion, which may cause abnormal noise. Repetition of such contraction deformation and expansion deformation may accelerate degradation of the downstream cathode gas piping 120a. When a material having high rigidity is adopted for the downstream cathode gas piping 120a in order to avoid such deformations, on the other hand, the weight of the downstream cathode gas piping 120a may be significantly increased.

The piping unit 40 of the embodiment, however, has the relatively short distance between the outlet 111 of the cathode supply valve 110 and the cathode supply manifolds M3a and M3b and uses the outer surface of the first end plate 12 as the wall surface of the gas flow path. Even when the downstream cathode gas piping 120 is formed to have the outer wall of the increased rigidity in order to avoid deformation of the downstream cathode gas piping 120 due to the generation of negative pressure after the operation stop of the fuel cell 10, this structure causes only a relatively small weight increase. The piping unit 40 of the embodiment can thus readily prevent deformation of the downstream cathode gas piping 120 and the accompanied occurrence of abnormal noise after the operation stop of the fuel cell 10.

In the fuel cell, it is generally known that the reaction of the remaining reactive gas after the operation stop as described above may generate an unexpectedly high voltage on the cathode side and cause degradation of the electrode catalyst layer. The piping unit 40 of the embodiment, however, has the relatively small flow path volume of the downstream cathode gas piping 120 and thereby reduces the amount of the cathode gas remaining in the downstream of the cathode supply valve 110 after the operation stop. This accordingly suppresses the reaction of the remaining reactive gas in the fuel cell 10 after the operation stop and thereby prevents degradation of the catalyst layer in the fuel cell 10.

Figure 10A:
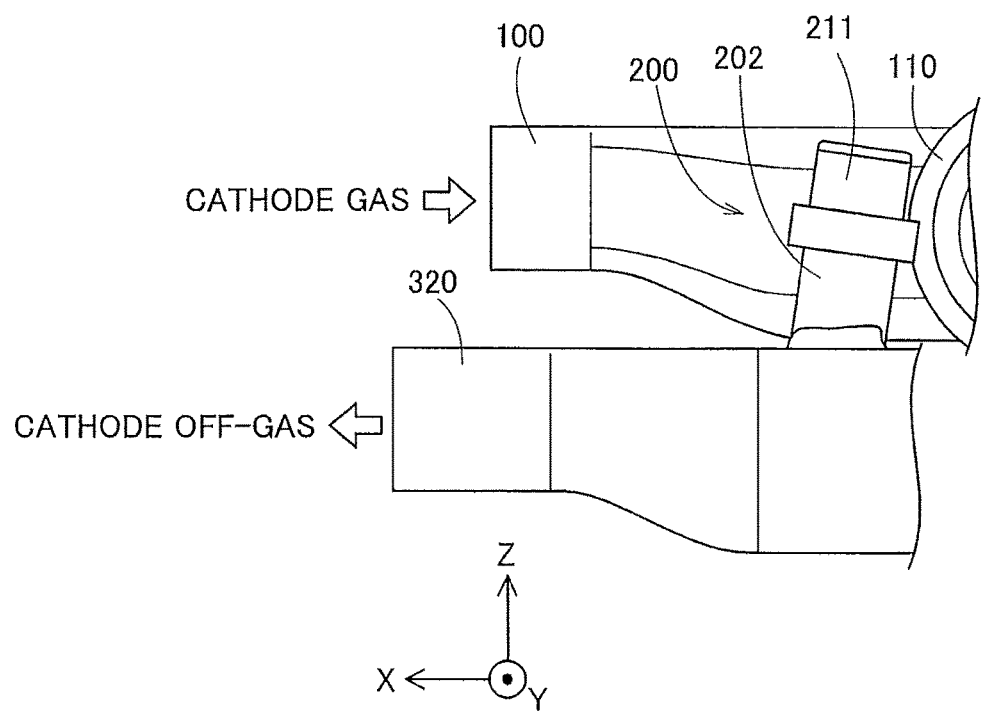
FIGS. 10A and 10B are a front view and a left side view showing the appearance of cathode bypass piping.
Figure 10B:
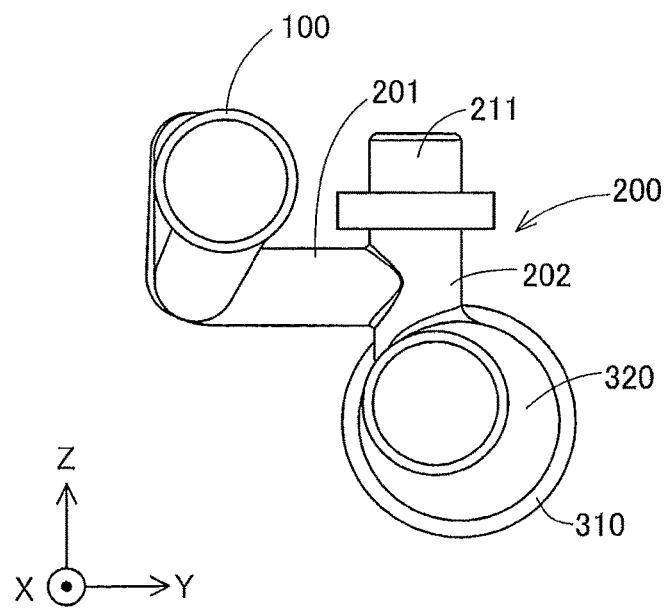
Figure 11:
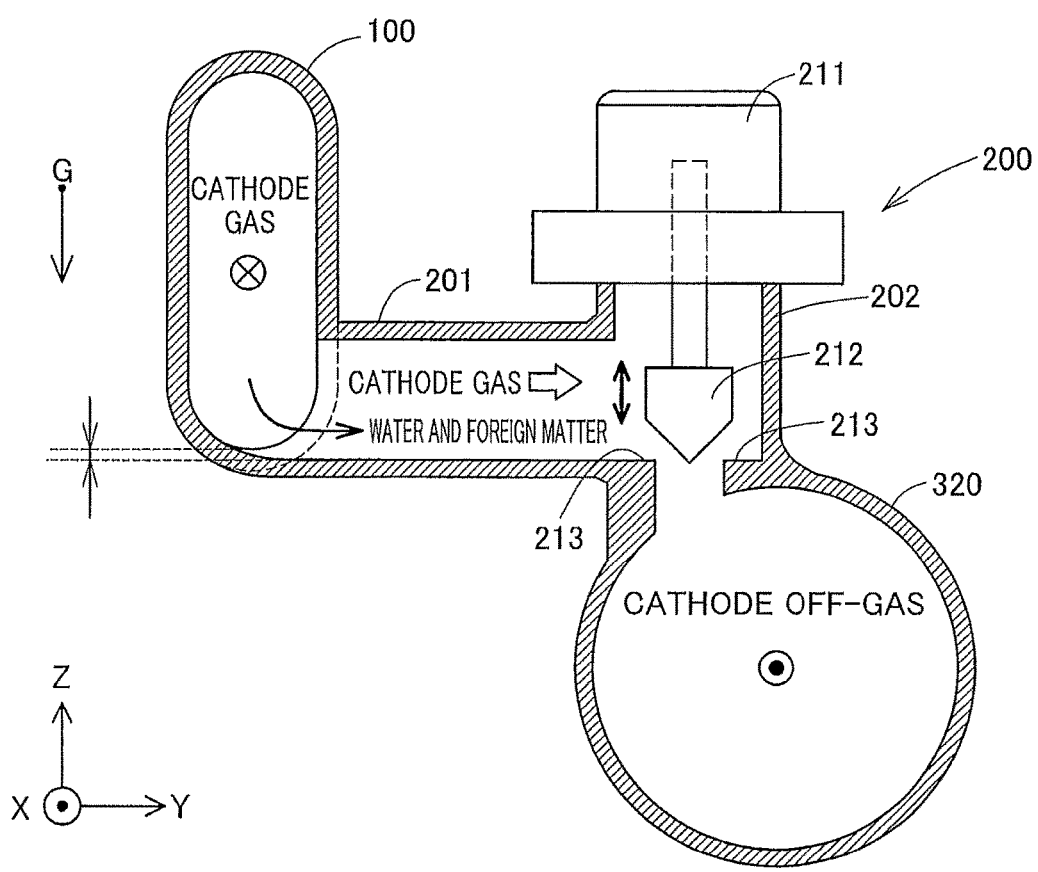
FIG. 11 is a diagram showing the internal structure of the cathode bypass piping.

FIGS. 10 and 11 are schematic views illustrating the more detailed structure of the cathode bypass piping 200. FIG. 10A is a front view showing the appearance of the cathode bypass piping 200, and FIG. 10B is a left side view showing the appearance of the cathode bypass piping 200. Part of the upstream cathode gas piping 100 and part of the downstream cathode off-gas piping 320 respectively connected with the cathode bypass piping 200 are also illustrated in FIGS. 10A and 10B. FIG. 11 is a diagram showing the internal structure of the cathode bypass piping 200. The cross sections of the upstream cathode gas piping 100 and the downstream cathode off-gas piping 320 respectively connected with the cathode bypass piping 200 are also illustrated in FIG. 11. The three-dimensional arrows X, Y and Z similar to those of FIGS. 2 to 4 are shown in FIGS. 10 and 11.

The upstream tube section 201 of the cathode bypass piping 200 is connected with the upstream cathode gas piping 100, such that the flow path bottom face of the upstream tube section 201 is located below the bottom face of the upstream cathode gas piping 100 in the direction of gravity at the location of connection with the upstream cathode gas piping 100 (FIG. 11). As described in FIG. 1, the cathode gas taken in from the outside air by the air compressor 20 flows into the upstream cathode gas piping 100. Connecting the upstream tube section 201 with the upstream cathode gas piping 100 in the above manner introduces foreign matter such as dust or rainwater contained in the cathode gas into the cathode bypass piping 200 by gravity. This structure advantageously prevents the rainwater or foreign matter contained in the cathode gas from flowing into the fuel cell 10 and thereby prevents degradation of the fuel cell 10.

The bypass piping valve 210 is placed in the downstream tube section 202. More specifically, a valve plug 212 moving along the piping direction is located inside the downstream tube section 202, and a valve seat 213 is located below the valve plug 212 in the direction of gravity to receive the valve plug 212. This means that the downstream tube section 202 serves as a valve chest of the bypass piping valve 210. The direct-driven motor 211 is installed above the downstream tube section 202 to drive the valve plug 212. A diaphragm (not shown) is placed to seal between the motor 211 and the downstream tube section 202.

As described above, the bypass piping valve 210 is structured to be closed in response to moving the valve plug 212 downward in the direction of gravity. Even when the valve plug 212 floats due to, for example, a failure of the motor 211, there is a high possibility that the valve plug 212 moves to the closed position by gravity and is seated on the valve seat 213 by the pressure of the bypass gas. This structure thus advantageously avoids excess leakage of the cathode gas due to a failure of the motor 211 and prevents the operation of the fuel cell 10 from continuing with the low power generation efficiency. The motor 211 for the bypass piping valve 210 is located above the flow path of the bypass gas in the direction of gravity. This prevents water flowing into the cathode bypass piping 200 from moving toward the motor 211 and the resulting degradation of the motor 211.

It is preferable that the downstream tube section 202 is connected at the position offset from the center of the downstream cathode off-gas piping 320, such that the center axis of the downstream tube section 202 does not cross the center axis of the downstream cathode off-gas piping 320. Such connection arrangement causes the bypass gas flowing into the downstream cathode off-gas piping 320 to flow along the inner wall surface of the downstream cathode off-gas piping 320 and tends to produce eddy current in the downstream cathode off-gas piping 320.

The generation of eddy current of the bypass gas enables efficient scavenging to remove the water from the downstream cathode off-gas piping 320. The eddy current further diffuses the hydrogen contained in the cathode off-gas during the low-efficiency operation for warm-up of the fuel cell 10 described above and the hydrogen contained in the anode off-gas discharged with the drainage water on the anode side via the separate water drainage piping 420. In other words, the eddy current enables more effective dilution of hydrogen in the downstream cathode off-gas piping 320. For scavenging in the downstream cathode off-gas piping 320, the downstream tube section 202 is connected to have an angle of inclination to the downstream cathode off-gas piping 320 (FIG. 10A) as described later in detail.

Figure 12A:
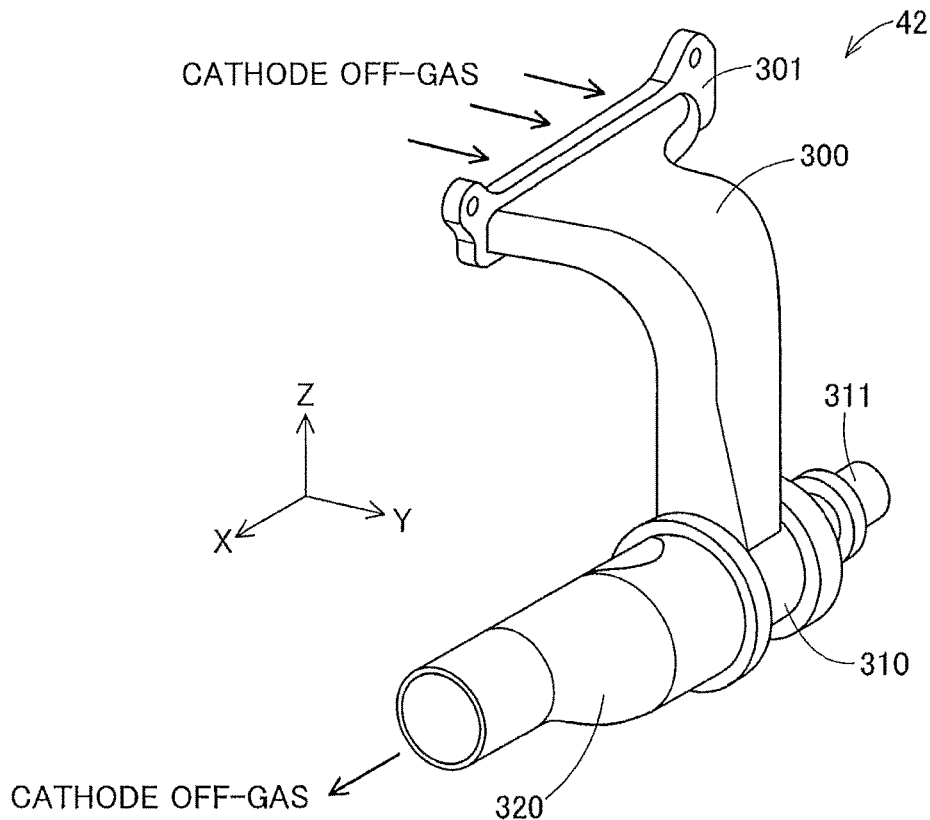
FIGS. 12A and 12B are schematic views illustrating the structure of a cathode gas discharge passage.
Figure 12B:
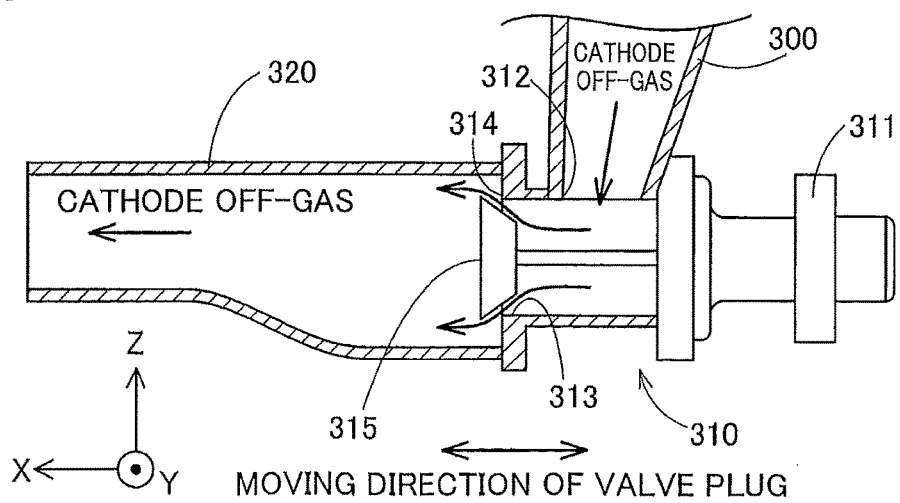

FIGS. 12 and 13 are schematic views illustrating the more detailed structure of the cathode gas discharge passage 42. FIG. 12A is a schematic perspective view illustrating the cathode gas discharge passage 42 with omitting the components of the piping unit 40 other than the cathode gas discharge passage 42 from the illustration. FIG. 12B is a schematic view illustrating the internal structure of part of the upstream cathode off-gas piping 300, the cathode exhaust valve 310 and the downstream cathode off-gas piping 320. The three-dimensional arrows X, Y and Z similar to those of FIGS. 2 to 4 are shown in FIGS. 12A and 12B.

The cathode exhaust valve 310 is a poppet valve having a valve plug 315 moving in the direction along the arrow X and has a casing in an approximately cylindrical shape. An inlet 312 is formed in the side face of the casing and is connected with the upstream cathode off-gas piping 300 arranged downward in the direction of gravity. An outlet 313 is formed in the bottom face of the casing to be open to the direction of the arrow X. A motor 311 for driving the valve plug 315 is located on the open end opposite to the outlet 313.

In the cathode exhaust valve 310, a valve seat 314 is set around the circumference of the outlet 313 outside the casing. In the cathode exhaust valve 310, the main body of the valve plug 315 is accordingly located outside the casing. The cathode exhaust valve 310 is closed when the main body of the valve plug 315 moves from the downstream cathode off-gas piping 320-side to the casing side. Even when the valve plug 315 floats due to, for example, a failure of the motor 311, this arrangement of the valve plug 315 causes the valve plug 315 to be moved to the open position by the cathode off-gas and thereby enables continued operation of the fuel cell 10.

Figure 13A:
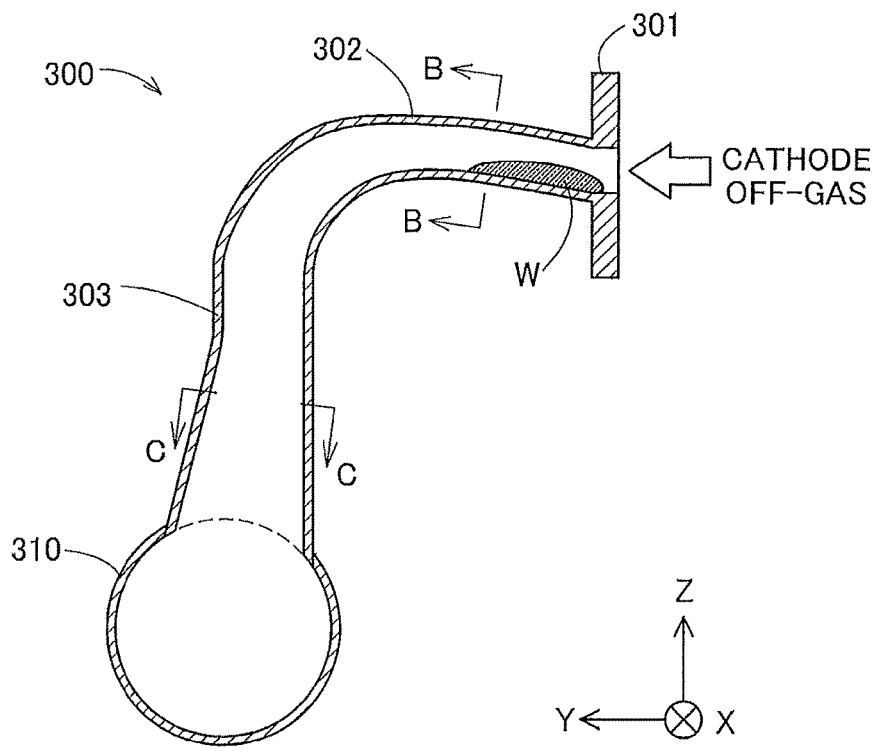
FIGS. 13A to 13C are schematic cross sectional views illustrating the structure of upstream cathode off-gas piping.
Figure 13B:
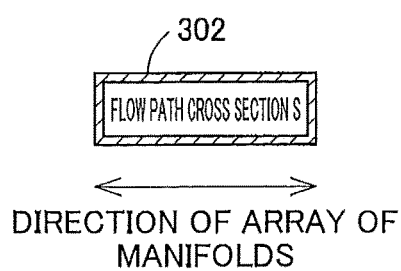
Figure 13C:
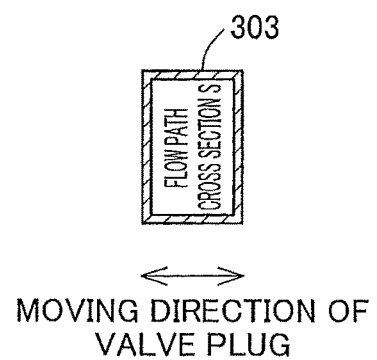

FIGS. 13A to 13C are schematic cross sectional views illustrating the structure of the upstream cathode off-gas piping 300. FIG. 13A schematically illustrates the cross section of the upstream cathode off-gas piping 300 and the casing of the cathode exhaust valve 310. The three-dimensional arrows X, Y and Z are shown in FIG. 13A for the purpose of correlation to FIG. 12. The upstream cathode off-gas piping 300 includes an upstream tube section 302 extended from the flange 301 toward the front side of the piping unit 40 (in the direction of the arrow Y) and a downstream tube section 303 bent from the upstream tube section 302 to be extended downward.

After the stop of the fuel cell 10, the water contained in the cathode off-gas may be condensed in the upstream cathode off-gas piping 300. The liquid water W condensed in the upstream cathode off-gas piping 300 flowing into the cathode exhaust valve 310 may freeze the cathode exhaust valve 310 in the low-temperature environment, such as sub-zero environment.

In the structure of the embodiment, the upstream tube section 302 of the upstream cathode off-gas piping 300 has the bottom face inclined more upward on the lower stream side. This structure enables the liquid water W condensed in the upstream tube section 302 after the operation stop of the fuel cell 10 to be accumulated on the bottom face of the upstream tube section 302 and prevents the liquid water W from flowing through the downstream tube section 303 into the cathode exhaust valve 310. The presence of the upstream tube section 302 enables the liquid water discharged from the exhaust manifolds M4a and M4b during operation of the fuel cell 10 to be tentatively accumulated on the bottom face of the upstream tube section 302. This prevents a significant amount of drainage water from flowing into the cathode exhaust valve 310 at once.

FIGS. 13B and 13C are respectively schematic cross sectional views of the upstream cathode off-gas piping 300, taken on a line B-B and a line C-C in FIG. 13A. The upstream cathode off-gas piping 300 of the embodiment has the substantially fixed flow path cross section from the upstream side to the downstream side, in order to prevent an increase in pressure drop of the cathode off-gas.

The upstream cathode off-gas piping 300 is structured to gradually change the shape of the flow path cross section from the upstream side to the downstream side. More specifically, the flow path cross section of the upstream tube section 302 is formed to have the width widening along the direction of the array of the cathode exhaust manifolds M4a and M4b. This effectively prevents an increase of the pressure drop of the cathode off-gas flowing from the manifolds M4a and M4b into the upstream cathode off-gas piping 300.

The downstream tube section 303 is formed, on the other hand, to have the shape corresponding to the opening shape of the inlet 312 of the cathode exhaust valve 310. More specifically, the flow path cross section of the downstream tube section 303 is formed to have the width narrowing in the moving direction of the valve plug 315 of the cathode exhaust valve 310 and widening in the circumferential direction of the casing of the cathode exhaust valve 310. The increased width of the opening of the inlet 312 of the cathode exhaust valve 310 in the circumferential direction of the casing prevents an increase of the pressure drop of the cathode off-gas flowing into the cathode exhaust valve 310. The decreased width of the opening of the inlet 312 in the moving direction of the valve plug 315, on the other hand, decreases the dimension of the cathode exhaust valve 310 in the direction of the arrow X and thereby achieves size reduction of the cathode exhaust valve 310.

A gentle change in shape of the flow path cross section of the upstream cathode off-gas piping 300 from the upstream side to the downstream side is preferable, in order to prevent generation of the contraction flow of the cathode off-gas. The corner of the upstream cathode off-gas piping 300 may be rounded not to interfere with attachment of another component of the piping unit 40 (for example, connector of the motor 211 of the bypass piping valve 210). The curvature may be gradually changed from the upstream side to the downstream side.

Figure 14A:
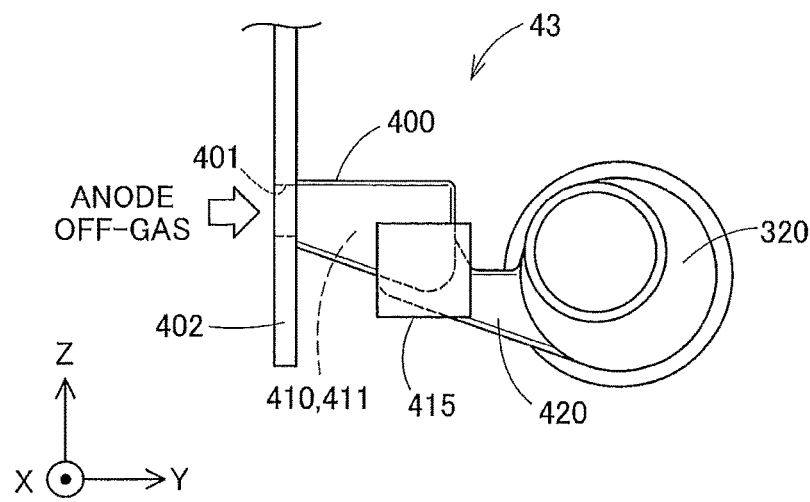
FIGS. 14A and 14B are respectively a left side view and a top view illustrating the structure of an anode gas discharge passage.
Figure 14B:
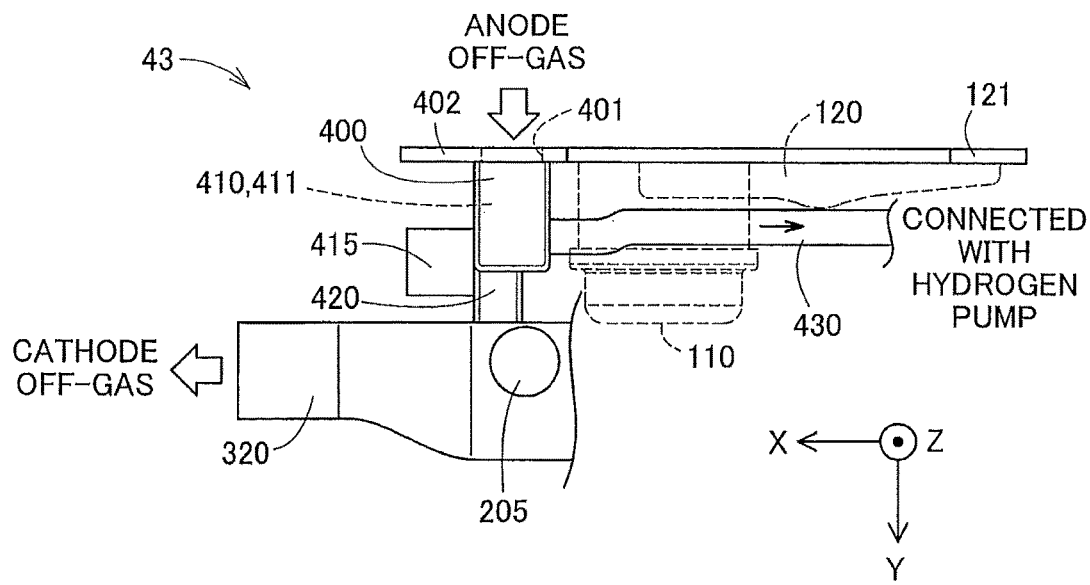

FIGS. 14A and 14B are schematic views illustrating the more detailed structure of the anode gas discharge passage 43. FIG. 14A is a schematic view illustrating the left side face of the anode gas discharge passage 43. The separate water drainage piping 420 and the downstream cathode off-gas piping 320 are illustrated in FIG. 14A. FIG. 14B is a schematic view illustrating the top face of the anode gas discharge passage 43 viewed in the direction of gravity. Part of the downstream cathode off-gas piping 320 and the flange 121 integrated with the flange 402 are also illustrated in FIG. 14B, where the cathode supply valve 110 and the downstream cathode gas piping 120 are shown by the broken lines. The downstream cathode off-gas piping 320 illustrated in FIG. 14B has a junction 205 with the cathode bypass piping 200. The three-dimensional arrows X, Y and Z similar to those of FIGS. 2 to 4 are shown in FIGS. 14A and 14B.

The anode off-gas piping 400 has an approximately hexahedral casing having the top face formed by a horizontal plane and the bottom face formed by a plane inclined more downward on the lower stream side. The gas-liquid separator 410 and the water reservoir 411 placed inside the anode off-gas piping 400 will be described later. The separate water drainage piping 420 is extended from the lower front side of the anode off-gas piping 400 in the direction of the arrow X to be connected with the downstream cathode off-gas piping 320. The separate water drainage piping 420 is arranged to have a difference in level from the anode off-gas piping 400. More specifically, the top face of the separate water drainage piping 420 is formed by a horizontal place that is located below the top face of the anode off-gas piping 400. The bottom face of the separate water drainage piping 420 is formed by an inclined plane that is located below the bottom face of the anode off-gas piping 400 and has a similar angle of inclination to that of the bottom face of the anode off-gas piping 400.

The anode drain valve 415 is located to be adjacent to the left side face of the anode off-gas piping 400 and the left side face of the separate water drainage piping 420. The water drainage mechanism of the anode drain valve 415 will be described later. The separate off-gas piping 430 is made of a tube extended in the direction opposite to the arrow X from the right side face of the anode off-gas piping 400 at the relatively downstream position of the anode off-gas piping 400. The separate off-gas piping 430 is extended close to and in parallel to the downstream cathode gas piping 120. This arrangement enables heat exchange between the cathode gas and the anode off-gas.

It is here assumed that the fuel cell 10 is not sufficiently warmed up, for example, at the start of the fuel cell system 1000. In this case, the piping unit 40 of the embodiment can transmit part of the exhaust heat of the cathode gas, which is heated up at the relatively early timing, from the downstream cathode gas piping 120 to the anode off-gas in the separate off-gas piping 430. As described above, in the fuel cell system 1000 of the embodiment, the anode off-gas in the separate off-gas piping 430 is circulated to the anode gas supply piping 31 via the hydrogen pump 50 (FIG. 1). In other words, the heat exchange between the separate off-gas piping 430 and the downstream cathode gas piping 120 in the piping unit 40 transmits the exhaust heat of the cathode gas to the fuel cell 10 via the anode off-gas and thereby increases the temperature of the fuel cell 10 with high efficiency.

In the piping unit 400 of the embodiment, the flange 121 of the downstream cathode gas piping 120 is integrated with the flange 402 of the anode off-gas piping 400. This structure enables transmission of the exhaust heat of the cathode gas to the anode off-gas via the flanges 121 and 402, thus increasing the temperature of the fuel cell 10 with the higher efficiency.

Figure 15A:
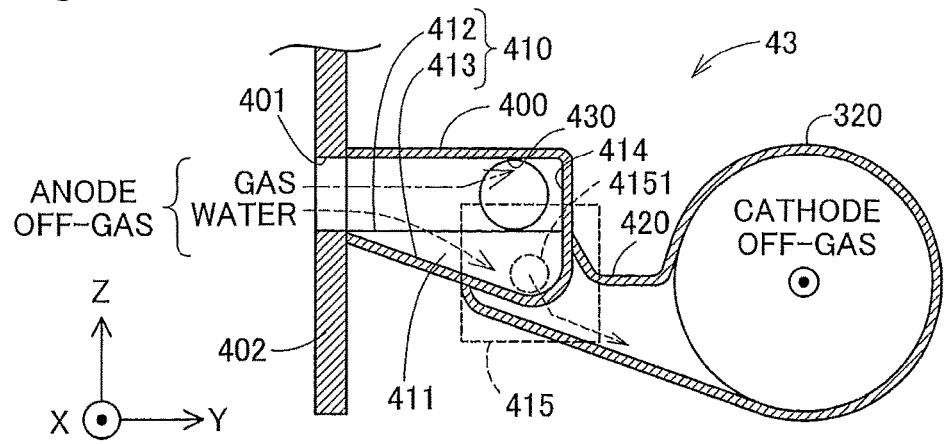
FIGS. 15A and 15B are schematic views showing the internal structure of the anode gas discharge passage.
Figure 15B:
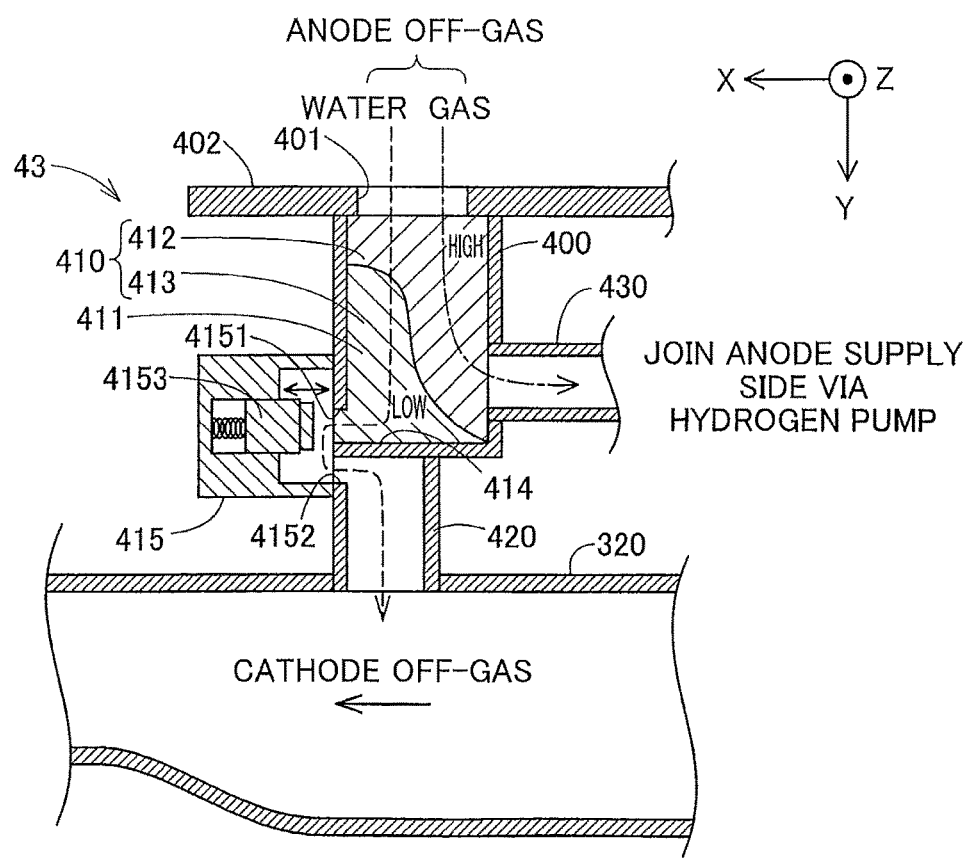

FIGS. 15A and 15B are schematic views relatively illustrating the internal structure of the anode gas discharge passage 43 shown in FIGS. 14A and 14B. The three-dimensional arrows X, Y and Z are shown in FIGS. 15A and 15B for the purpose of correlation to FIGS. 14A and 14B. The mounting position of the anode drain valve 415 and the position of its inlet 4151 are shown by the broken lines in FIG. 15A. Two floor faces 412 and 413 of the anode off-gas piping 400 are shown in a distinct manner by different hatchings in FIG. 15B.

The gas-liquid separator 410 is placed inside the casing of the anode off-gas piping 400. The gas-liquid separator 410 has the higher floor face 412 formed at a relatively higher position and the lower floor face 413 formed at a relatively lower position. The higher floor face 412 has substantially the same height as that of the bottom face of the opening 401 of the anode off-gas piping 400 and is formed as a continuous horizontal face from the opening 401 to an outlet connected with the separate off-gas piping 430. The lower floor face 413 is formed on the anode drain valve 415-side and is structured as a floor face including an inclined plane recessed from the higher floor face 412. The lower floor face 413 is provided to have the area of the inlet 4151 of the anode drain valve 415 located at its lowest position.

In FIG. 15B, the higher floor face 412 is formed in a right upper area (in the illustration) in the casing of the anode off-gas piping 400, while the lower floor face 413 is formed in a left lower area (in the illustration) in the casing of the anode off-gas piping 400. There is an approximately S-shaped boundary between the higher floor face 412 and the lower floor face 413.

The gas component contained in the anode off-gas flowing into the anode off-gas piping 400 is introduced by the higher floor face 412 into the separate off-gas piping 430 (arrow of one-dot chain line). The water contained in the anode off-gas moves straight toward the inlet opening of the anode off-gas piping 400 by inertia and is introduced from the higher floor face 412 to the lower floor face 413 by gravity (arrow of broken line). The gas-liquid separator 410 can thus separate the water from the cathode off-gas on the higher floor face 412-side to the lower floor face 413-side.

It is preferable that an inner wall surface 414 opposed to the opening 401 of the anode off-gas piping 400 is formed to be continuous with the lower floor face 413. This arrangement enables the water contained in the anode off-gas and condensed on the inner wall surface 414 to be introduced to the lower floor face 413 by gravity and thereby ensures the more effective trapping of the water contained in the anode off-gas. The inner wall surface 414 may be formed to have small asperities to accelerate the condensation of water.

The separate water drainage piping 420 and the anode off-gas piping 400 communicate with each other via the anode drain valve 415. The anode drain valve 415 is made of a solenoid valve and has a valve plug 4153 located in the casing. The inlet 4151 of the anode drain valve 415 is formed to be adjacent to the inner wall surface 414 on the left side face of the anode off-gas piping 400. The bottom face of the inlet 4151 of the anode drain valve 415 has substantially the same height as that of the lowest position of the lower floor face 413. The valve plug 4153 is driven by electromagnetic force in the direction along the arrow X to open and close the inlet 4151. An outlet 4152 of the anode drain valve 415 is formed in parallel to the inlet 4151 and is connected with the left side face of the separate water drainage piping 420.

The anode drain valve 415 is in the normally closed position. In the closed position of the anode drain valve 415, the water introduced to the lower floor face 413-side is accumulated in the area of the lower floor face 413 of the anode off-gas piping 400. In other words, in the anode off-gas piping 400, the lower floor face 413 serves as the water guide path, and the recess in the anode off-gas piping 400 formed by the lower floor face 413 serves as the water reservoir 411 described in FIG. 1.

When the controller 70 (FIG. 1) opens the anode drain valve 415 for water drainage, the water accumulated in the water reservoir 411 of the anode off-gas piping 400 flows through the anode drain valve 415 into the separate water drainage piping 420 by gravity (FIG. 15B). The gas component of the anode off-gas including, for example, hydrogen and nitrogen is discharged together with the drainage water on the anode side to the separate water drainage piping 420. The separate water drainage piping 420 has the inclined bottom face, which is connected downward with the downstream cathode off-gas piping 320 to be smoothly continuous with the bottom face of the downstream cathode off-gas piping 320. The drainage water accordingly flows from the separate water drainage piping 420 to the downstream cathode off-gas piping 320 and is discharged with the cathode off-gas.

As described above, the anode off-gas piping 400 of the embodiment has the higher floor face 412 and the lower floor face 413 to separate the flow direction of the gas component contained in the anode off-gas from the flow direction of the water contained in the anode off-gas. This enables gas-liquid separation of the anode off-gas by the compact and simple structure. In the anode off-gas piping 400 of the embodiment, the water reservoir 411 is formed by the recess (concavity) at the position away from the direction of introducing the gas component. This prevents the water in the water reservoir 411 from being introduced to the separate off-gas piping 430 by the flow of the gas component contained in the anode off-gas.

It is preferable that the flow path for the drainage water from the anode off-gas piping 400 to the downstream cathode off-gas piping 320 is formed to smoothen the flow of drainage water, in order to prevent spatter of drainage water. More specifically, the preferable arrangement of the flow path aims to minimize the difference in level between the bottom face of the anode off-gas piping 400 and the bottom face of the separate water drainage piping 420 and the difference in level between the bottom face of the separate water drainage piping 420 and the bottom face of the downstream cathode off-gas piping 320. The preferable arrangement of the flow path also aims to avoid an abrupt change of the flow rate, for example, by locating the bottom face of the anode off-gas piping 400 substantially in parallel to the bottom face of the separate water drainage piping 420.

FIG. 16 is a diagram illustrating the connecting locations of the cathode bypass piping 200 and the separate water drainage piping 420 to the downstream cathode off-gas piping 320. FIG. 16 illustrates the internal structure of the downstream cathode off-gas piping 320 and is substantially similar to FIG. 12B, except explicit illustration of the cathode bypass piping 200 and an opening 425 of the separate water drainage piping 420.

A significant amount of drainage water on the anode side flows from the separate water drainage piping 420 into the downstream cathode off-gas piping 320. A significant amount of drainage water on the cathode side flows the cathode exhaust valve 310 into the downstream cathode off-gas piping 320. When such drainage water remains in the downstream cathode off-gas piping 320 after the operation stop of the fuel cell system 1000, the cathode exhaust valve 310 or the opening 425 of the separate water drainage piping 420 may be frozen and blocked in the low-temperature environment, such as sub-zero environment. In such cases, it is difficult to reactivate the fuel cell system 1000.

In the piping unit 40 of the embodiment, the cathode bypass piping 200 and the separate water drainage piping 420 are connected to the downstream cathode off-gas piping 320 at the locations proximate to the outlet of the cathode exhaust valve 310. Such connection enables the outlet of the cathode exhaust valve 310 and the opening 425 of the separate water drainage piping 420 to be scavenged by the bypass gas flowing out of the cathode bypass piping 200, thereby reducing the remaining water content in the downstream cathode off-gas piping 320.

In the piping unit 40 of the embodiment, the connecting location of the separate water drainage piping 420 to the downstream cathode off-gas piping 320 is in the downstream of the connecting location of the cathode bypass piping 200. Additionally, in the piping unit 40 of the embodiment, the downstream tube section 202 of the cathode bypass piping 200 is connected at an inclined angle to the downstream cathode off-gas piping 320.

More specifically, the downstream tube section 202 of the cathode bypass piping 200 is connected in such a manner that an angle α between the flow direction of the off-gas (direction of the arrow X) in the downstream cathode off-gas piping 320 and the piping direction of the downstream tube section 202 is greater than 90 degrees.

Such connection arrangement of the flow paths enables the bypass gas to flow from the cathode bypass piping 200 toward the opening 425 of the separate water drainage piping 420. This ensures the more effective water removal from the opening 425 of the separate water drainage piping 420 by the bypass gas. The direction of the bypass gas flowing to the downstream cathode off-gas piping 320 is inclined to the flow direction of the off-gas in the downstream cathode off-gas piping 320. This reduces the pressure drop of the bypass gas flowing into the downstream cathode off-gas piping 320.

Figure 17A:
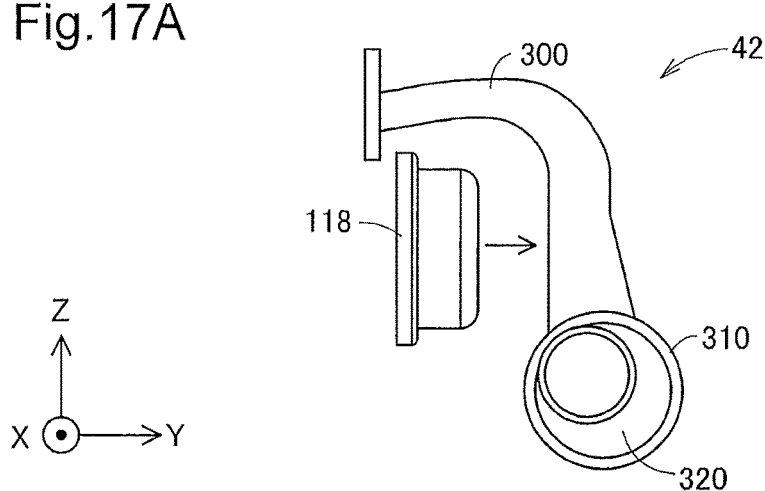
FIGS. 17A to 17C are diagrams showing an assembly process of the piping unit.
Figure 17B:
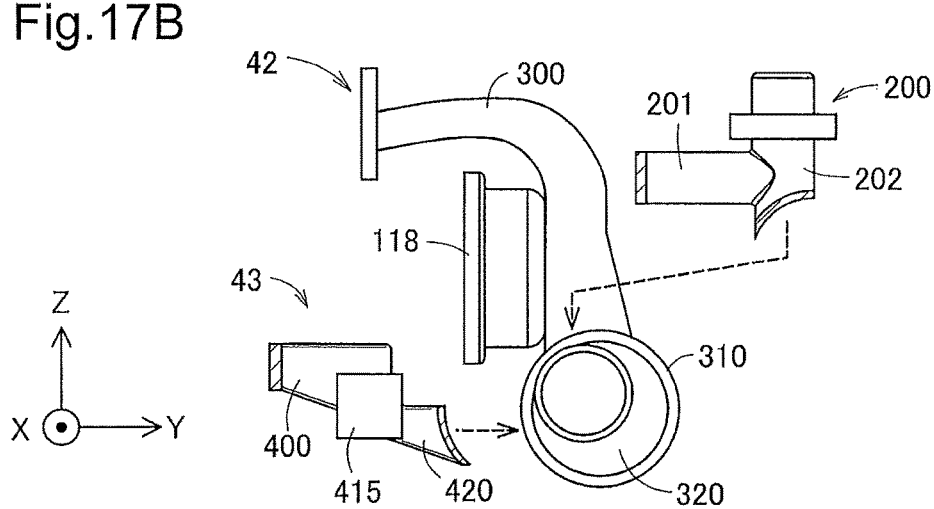
Figure 17C:
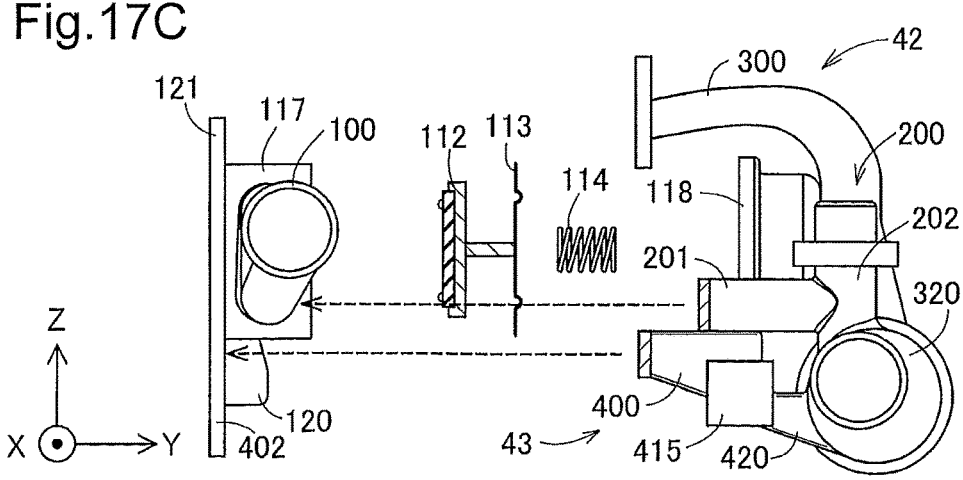

FIGS. 17A to 17C are diagrams showing an assembly process of the piping unit 40, wherein the respective components of the piping unit 40 are illustrated separately. FIGS. 17A to 17C are left side views, and the three-dimensional arrow X, Y and Z similar to those of FIGS. 2 to 4 are shown in FIGS. 17A to 17C. Margins for connection are shown by hatching in the respective components 41 to 43 in FIGS. 17B and 17C.

In a first step, the process joins the casing cap 118 of the cathode supply valve 110 to the cathode gas discharge passage 42 provided in advance (FIG. 17A). In a second step, the process further attaches the anode gas discharge passage 43 and the cathode bypass piping 200 to the cathode gas discharge passage 42 (FIG. 17B). More specifically, the process attaches the separate water drainage piping 420 and the downstream tube section 202 of the cathode bypass piping 200 at predetermined connecting locations to the downstream cathode off-gas piping 320 to be joined with the downstream cathode off-gas piping 320.

In a third step, the process provides the casing 117 of the cathode supply valve 110 with the upstream cathode gas piping 100 attached thereto and the valve plug 112, the diaphragm 113 and the pressing mechanism 114 for constructing the cathode supply valve 110 (FIG. 17C). The casing 117 of the cathode supply valve 110 has the flanges 121 and 402. The process subsequently inserts and joins the end of the upstream tube section 201 of the cathode bypass piping 200 and the end of the anode off-gas piping 400 into the openings for connection formed in the side face and the flange 402 of the upstream cathode gas piping 100.

In the piping unit 40 of the embodiment, the direction of insertion of the end of the upstream tube section 201 of the cathode bypass piping 200 is arranged to be parallel to the direction of insertion of the end of the anode off-gas piping 400. This arrangement facilitates the assembly of the piping unit 40. Seal materials such as O-rings are set on the end of the upstream tube section 201 of the cathode bypass piping 200, the end of the anode off-gas piping 400 and the respective openings for connection with the corresponding ends, although their illustration and description are omitted.

The assembly step of FIG. 17C fits the open end of the casing cap 118 fixed to the upstream cathode off-gas piping 300 in the open end of the casing 117 of the cathode supply valve 110 and joins together by caulking. The valve plug 112, the diaphragm 113 and the pressing mechanism 114 are then placed at predetermined positions in the casing 117 or in the casing cap 118.

In the piping unit 40 of the embodiment, the casing cap 118 of the cathode supply valve 310 and the upstream cathode off-gas piping 300 are accordingly joined with each other. This enhances the integrity of the cathode gas supply passage 41 with the cathode gas discharge passage 42 in the piping unit 40. In the attached state of the piping unit 40 to the fuel cell 10, the cathode supply valve 110 is located placed between the first end plate 12 and the upstream cathode off-gas piping 300. This reduces the vibration caused by the opening/closing operations of the cathode supply valve 110 during operation of the fuel cell 10.

The assembly step of FIG. 17C implements the connection of the respective pipings 200 and 400 simultaneously with the assembly of the cathode supply valve 110. The assembly step of FIG. 17C may adopt the grasp of the diaphragm 113 placed between the casing 117 and the casing cap 118 as the mark, rather than the insertion depth of the respective ends of the pipings 200 and 400 into the corresponding openings. The assembly step of FIG. 17(C) using this mark may achieve further enhancement of the sealing property of the casing 117 by the diaphragm 113.

As described above, the piping unit 40 of the embodiment is structured by unitizing the gas tubes and the valves for the reactive gases and is integrally attached to the fuel cell 10. This facilitates the attachment of the tubes and the other components to the fuel cell 10 and achieves size reduction of the fuel cell system 1000. Additionally, this reduces the pressure drop in the passages for the reactive gases to improve the supply and delivery efficiencies of the reactive gases, while enabling efficient scavenging for removal of the remaining water in the tubes.

The respective valves 110, 210, 310 and 415 are integrally secured to the first end plate 12. This structure reduces vibration or operating noise during operation of the fuel cell system 1000. This structure also reduces the reactive gases and the water remaining inside the fuel cell 10 or inside the piping unit 40 after the stop of the fuel cell 10, thus preventing degradation of the fuel cell 10 and the piping unit 40.

B. Other Structural Examples of Piping Unit

The piping unit 40 described in the first embodiment may be modified by changing the structure or the arrangement of the respective components 41 to 43 as described below.

B1. Another Structural Example 1

Figure 18:
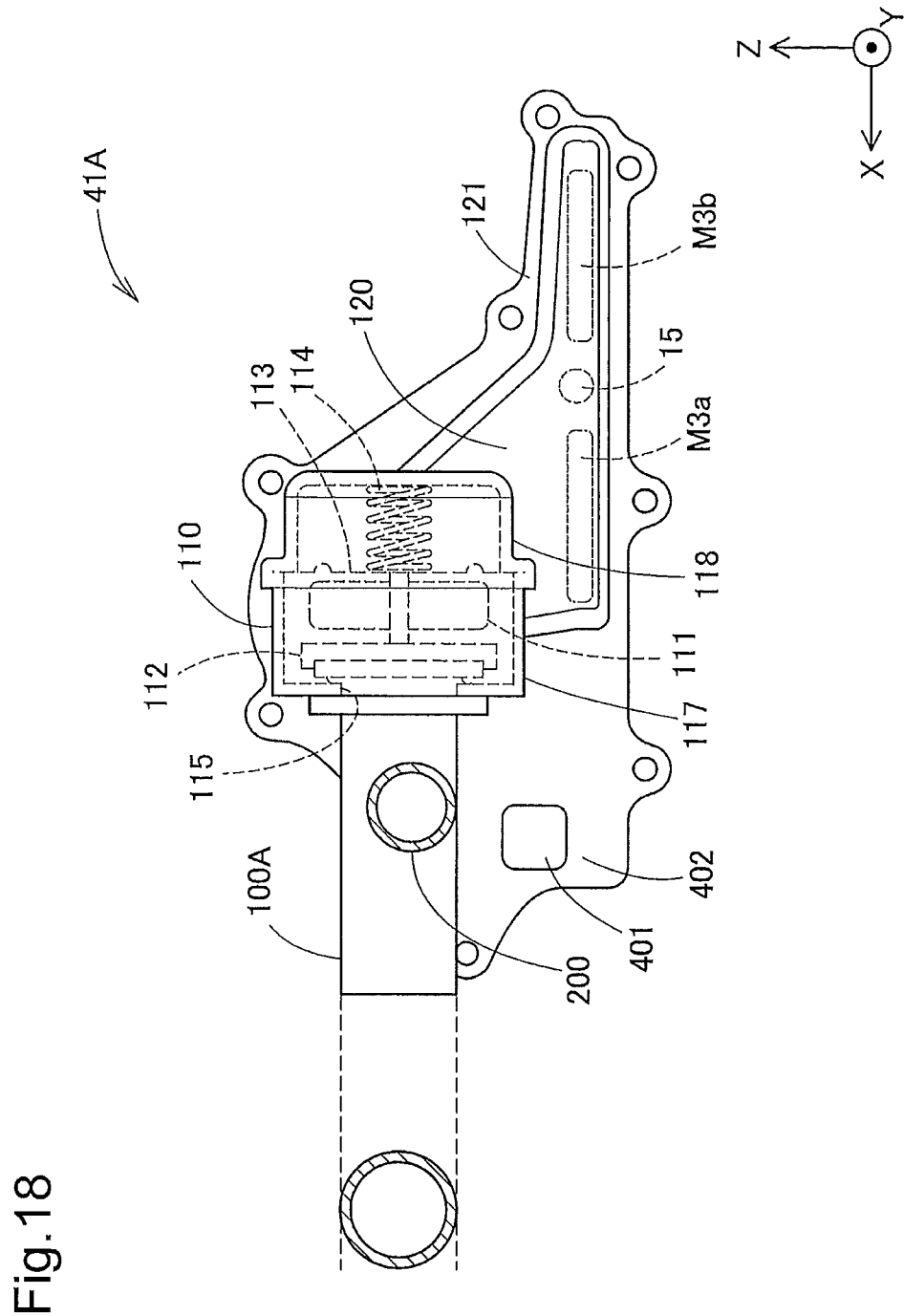
FIG. 18 is a diagram illustrating a cathode gas supply passage according to another structural example.

FIG. 18 is a diagram illustrating a cathode gas supply passage 41A according to another structural example. The structure of FIG. 18 is substantially similar to the structure of FIG. 6A, except the following differences. In the structure of FIG. 18, the cathode supply valve 110 is arranged in a different orientation. The upstream cathode gas piping 100 is replaced with upstream cathode gas piping 100A of a different cross-sectional shape, which is also shown in FIG. 18. The internal structure of the cathode supply valve 110 is shown by the broken line in FIG. 18. The structure of the other components 42 and 43 in the piping unit 40 is identical with that of the first embodiment described above.

The cathode supply valve 110 of this structural example is a poppet valve like that described in the first embodiment. In this structural example, however, the approximately circular opening formed in the bottom face of the casing is provided as the inlet 115, while the approximately rectangular opening formed in the side face of the casing is provided as the outlet 111. The upstream cathode gas piping 100A is made of a tube in an approximately cylindrical shape.

In the structure of the first embodiment, the cross-sectional shape of the upstream cathode gas piping 100 is changed from the upstream side to the downstream side corresponding to the opening shape of the inlet 115 of the cathode supply valve 110 (FIGS. 7C to 7E). In the structural example of FIG. 18, on the other hand, the inlet 115 of the cathode supply valve 110 is formed by the opening in the approximately circular shape, so that the upstream cathode gas piping 100A is formed to have the approximately circular cross-sectional shape from the upstream side to the downstream side.

This structural example thus effectively prevents an increase in pressure drop of the cathode gas with a change of the cross-sectional shape of the upstream cathode gas piping 100A. The upstream cathode gas piping 100A of this structural example can omit the specific tube section, which is provided in the upstream cathode gas piping 100 of the first embodiment to gently change the cross-sectional shape for reduction of the pressure drop. In other words, this structural example allows the shorter tube length of the upstream cathode gas piping 100A and thereby achieves further size reduction of the piping unit 40. The wider opening shape of the outlet 111 of the cathode supply valve 110 improves the flow controllability of the cathode gas.

B2. Another Structural Example 2

Figure 19:
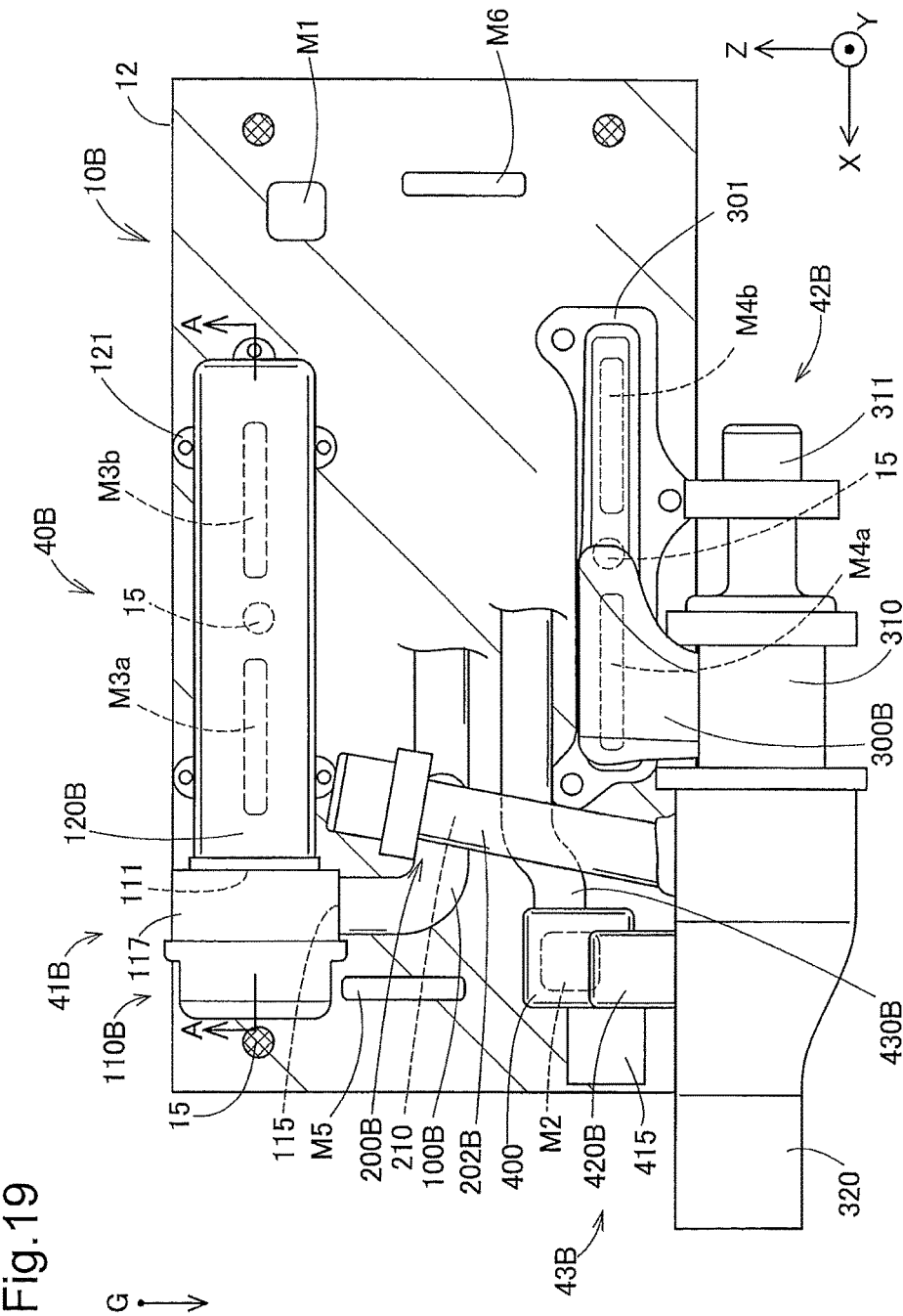
FIG. 19 is a diagram illustrating a piping unit according to another structural example.

FIG. 19 is a diagram illustrating a piping unit 40B according to another structural example and is more specifically a schematic front view showing the attached state of the piping unit 40B to a fuel cell 10B. The three-dimensional arrows X, Y and Z similar to those of FIGS. 2 to 4 and the arrow G representing the direction of gravity are also shown in FIG. 19.

The fuel cell 10B, which the piping unit 40B of this structural example is attached to, is similar to the fuel cell 10 of the first embodiment, except that the positions of the cathode supply manifolds M3a and M3b (shown by the broken lines) and the positions of the cathode exhaust manifolds M4a and M4b (shown by the broken lines) are reversed. More specifically, in the fuel cell 10B, the cathode supply manifolds M3a and M3b are located on the upper side in the direction of gravity, while the cathode exhaust manifolds M4a and M4b are located on the lower side in the direction of gravity.

In the piping unit 40B of this structural example, the location of the cathode supply valve 110B is different from the location of the cathode supply valve 110 in the first embodiment. In the piping unit 40B, the structures of the respective components 41B to 43B are changed with the change in location of the cathode supply valve 110B. More specifically, the respective components 41B to 43B have the following structures.

The piping unit 40B includes a cathode gas supply passage 41B, a cathode gas discharge passage 42B and an anode gas discharge passage 43B. The cathode gas supply passage 41B includes upstream cathode gas piping 100B, a cathode supply valve 110B, downstream cathode gas piping 120B and cathode bypass piping 200B.

The cathode supply valve 110B is a poppet valve like the cathode supply valve 110 described in the first embodiment and has an inlet 115 formed on the side face of the casing 117 and an outlet 111 formed on the center of the bottom face of the casing 117. The inlet 115 and the outlet 111 are provided as approximately circular openings of substantially the same size and are formed to have their virtual central axes orthogonal to each other.

The cathode supply valve 110B is located at substantially the same height as that of the two cathode supply manifolds M3a and M3b in the plane of the first end plate 12. In other words, the cathode supply valve 110B is located at the position adjacent to the two supply manifolds M3a and M3b in the direction of the arrow X when viewed from the stacking direction of the fuel cell 10B. The cathode supply valve 110B is arranged to have the outlet 111 open to the direction opposite to the arrow X and the inlet 115 open to the direction of gravity.

The downstream cathode gas piping 120B is made of a vessel in an approximately cuboid shape and has the left side face to be connected with the outlet 111 of the cathode supply valve 110B and the back face with a full opening to be connected with the two supply manifolds M3a and M3b. A flange 121 for attachment to the first end plate 12 is formed around the circumference of the full opening of the downstream cathode gas piping 120B. The flow of the cathode gas in the downstream cathode gas piping 120B will be described later.

The upstream cathode gas piping 100B is made of a tube having the flow path cross section in an approximately circular shape. The upstream cathode gas piping 100B is extended in the direction of gravity from the inlet 115 of the cathode supply valve 110B and is then bent to be extended in the direction opposite to the arrow X. The cathode bypass piping 200B is connected to the upstream cathode gas piping 100B.

The cathode bypass piping 200B has the similar structure to that of the cathode bypass piping 200 described in the first embodiment, except the different tube length of a downstream tube section 202B. The downstream tube section 202B of the cathode bypass piping 200B is connected with the downstream cathode off-gas piping 320. This accordingly integrates the cathode gas supply passage 41B with the cathode gas discharge passage 42B.

The cathode gas discharge passage 42B has the similar structure to that of the cathode gas discharge passage 42 described in the first embodiment, except that the upstream cathode off-gas piping 300 is replaced with upstream cathode off-gas piping 300B of the shorter tube length that is attached at a different location. The cathode exhaust valve 310 and the downstream cathode off-gas piping 320 of the cathode gas discharge passage 42B are arranged along the long side of the first end plate 12 below the cathode exhaust manifolds M4a and M4b. Like the upstream cathode off-gas piping 300 of the first embodiment, the upstream cathode off-gas piping 300B is extended in the direction of the arrow Y from the joint with the exhaust manifolds M4a and M4b and is bent in the direction of gravity to be connected with the cathode exhaust valve 310.

The anode gas discharge passage 43B has the similar structure to that of the anode gas discharge passage 43 described in the first embodiment, except that separate water drainage piping 420B and separate off-gas piping 430B are formed in different shapes according to the arrangements of the other components 41B and 42B. The separate off-gas piping 430B starts from the right side face of the anode off-gas piping 400, runs between the downstream tube section 202 of the cathode bypass piping 200B and the first end plate 12 and is extended along the upstream cathode gas piping 100B in the direction opposite to the arrow X. The separate water drainage piping 420B is extended downward in the direction of gravity and is connected with the downstream cathode off-gas piping 320. This arrangement enables the anode gas discharge passage 43B to be integrated with the cathode gas discharge passage 42B.

As described above, the cathode gas supply passage 41B is located above the cathode gas discharge passage 42B. Unlike the piping unit 40 of the first embodiment, there is no junction between the cathode supply valve 110B and the upstream cathode off-gas piping 300B. In the piping unit 40B, the flow controllability of the cathode gas is improved by changing the location of the cathode supply valve 110B from that of the first embodiment as described below.

Figure 20A:
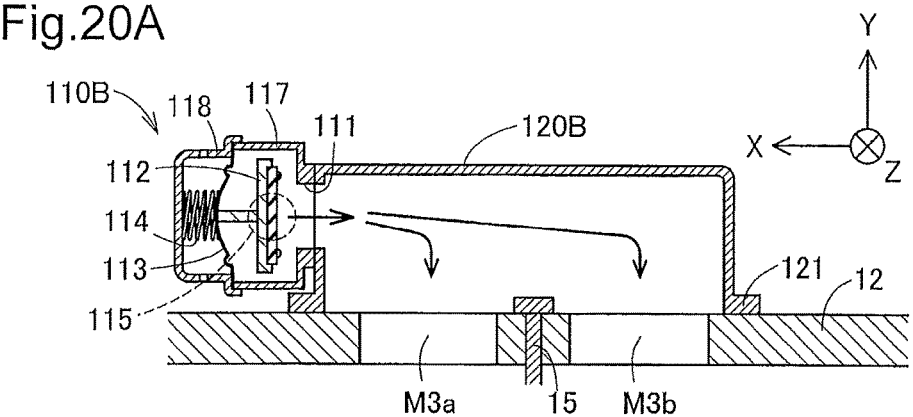
FIGS. 20A to 20C are diagrams illustrating the flow of a cathode gas in downstream cathode gas pipings according to other structural examples.

FIG. 20A is a schematic cross sectional view, taken on a line A-A in FIG. 19 and is more specifically a diagram illustrating the flow of the cathode gas in the downstream cathode gas piping 120B. The arrows representing the flow of the cathode gas are shown in FIG. 20A, with the three-dimensional arrows X, Y and Z for the purpose of correlation to FIG. 19. The cathode gas flowing out of the outlet 111 of the cathode supply valve 110B flows along the direction opposite to the arrow X and is separated into the two supply manifolds M3a and M3b.

Figure 20B:
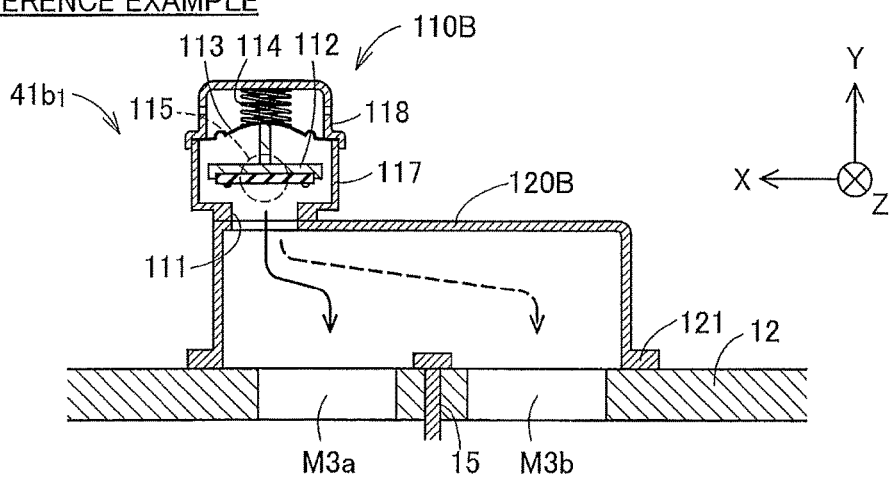
Figure 20C:
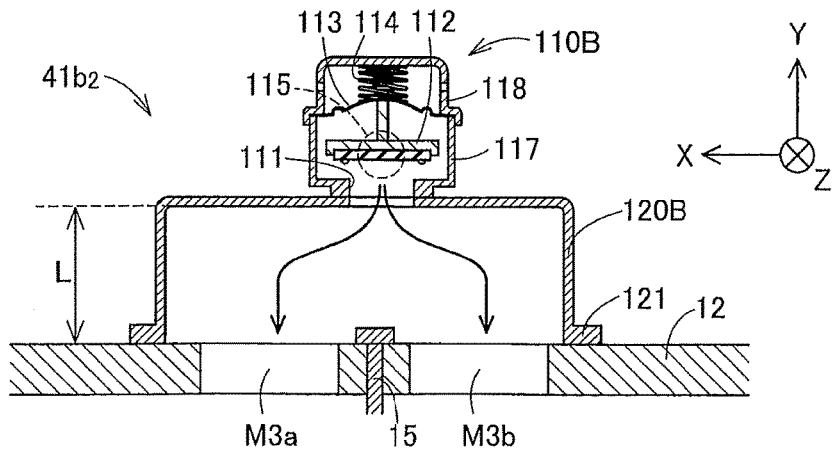

FIGS. 20B and 20C are diagrams respectively illustrating cathode gas supply passages 41b1 and 41b2 as reference examples, which are similar to the structure of FIG. 20A except the orientation and the location of the cathode supply valve 110B. The piping units of the respective reference examples shown in FIGS. 20B and 20C have the same components as those described in FIG. 19, except the cathode gas supply passages $41b_1$ and $41b_2$.

In the cathode gas supply passage 41b1 of FIG. 20B, the cathode supply valve 110B is located at the position closer to the first supply manifold M3a in such an orientation that the outlet 111 is open to the supply manifolds M3a and M3b. In the cathode gas supply passage 41b2 of FIG. 20C, the cathode supply valve 110B is located at the position substantially equidistant from the first and the second supply manifolds M3a and M3b in the similar orientation to that of FIG. 20B.

In the structure of FIG. 20B, the outlet 111 of the cathode supply valve 110B is open at the position closer to the first supply manifold M3a. This structure tends to increase the flow rate of the cathode gas flowing through the first supply manifold M3a. In other words, this structure causes the poor flow controllability of the cathode gas to the first and the second supply manifolds M3a and M3b. In the structure of FIG. 20C, on the other hand, the first and the second supply manifolds M3a and M3b are located to be substantially equidistant from the outlet 111 of the cathode supply valve 110B. This structure improves the flow controllability of the cathode gas, compared with the structure of FIG. 20B.

In both of the structures of FIGS. 20B and 20C, the outlet 111 of the cathode supply valve 110B is open to the outer surface of the first end plate 12. In such structures, a longer length L between the outlet 111 and the outer surface of the first end plate 12 is desirable to reduce the pressure drop of the cathode gas flowing out of the outlet 111. In the structures of FIGS. 20B and 20C, in order to reduce the pressure drop of the cathode gas, the cathode supply valve 110B is protruded in the stacking direction of the fuel cell 10B, in addition to the distance L. This may result in undesirable size expansion of the piping unit.

In the structure of FIG. 20A, however, the cathode supply valve 110B is located on the side face of the downstream cathode gas piping 120B. This structure ensures a sufficient flow path length between the outlet 111 of the cathode supply valve 110B and the opposed inner wall surface of the downstream cathode gas piping 120B to separate the flow of the cathode gas into the respective manifolds M3a and M3b. This structure also effectively prevents an increase of the pressure drop due to an abrupt change in the flow direction of the cathode gas in the downstream cathode gas piping 120B. Additionally, this structure can avoid protrusion of the cathode supply valve 110B in the stacking direction of the fuel cell 10B. This structure accordingly achieves size reduction of the piping unit, while improving the flow controllability and the pressure drop of the cathode gas in the downstream cathode gas piping 120B.

B3. Another Structural Example 3

Figure 21:
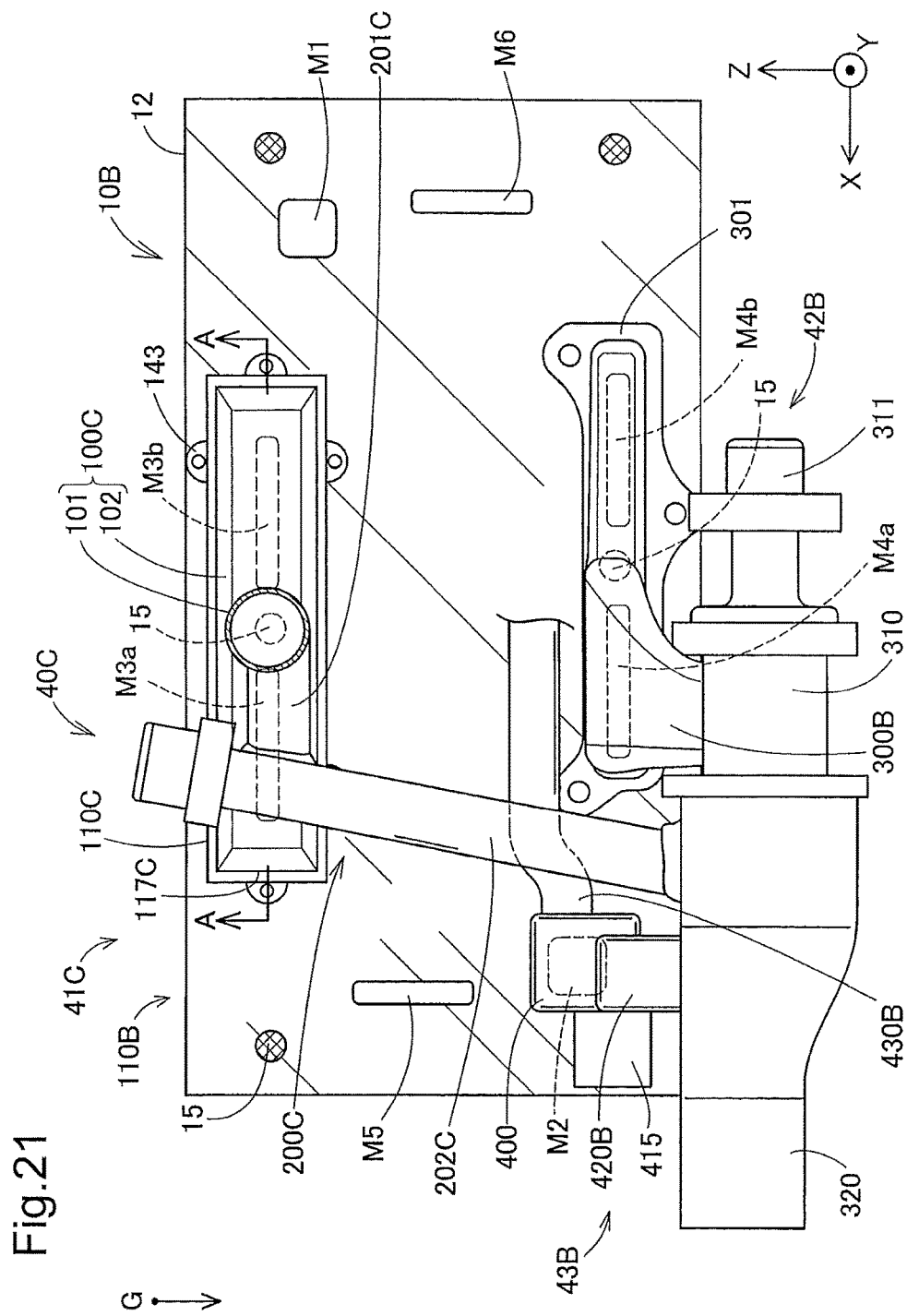
FIG. 21 is a diagram illustrating a piping unit according to another structural example.

FIG. 21 is a diagram illustrating a piping unit 40C according to another structural example and is more specifically a schematic front view showing the attached state of the piping unit 40C to the fuel cell 10B. The structure of FIG. 21 is substantially similar to the structure of FIG. 19, except the different structure of a cathode gas supply passage 41C. In this structural example, a cathode supply valve 110C of the cathode gas supply passage 41C includes reed valves located at the positions of formation of the cathode supply manifolds M3a and M3b. The structure of the cathode supply valve 110C will be described later.

The upstream cathode gas piping 100C is arranged to be extended from the cathode supply valve 110C along the stacking direction of the fuel cell 10B. Cathode bypass piping 200C has an upstream tube section 201C extended in the direction opposite to the arrow X to be connected with the side face of the upstream cathode gas piping 100C. The cathode bypass piping 200C also has a downstream tube section 202C extended from the height of the upstream cathode gas piping 100C downward in the direction of gravity at an inclined angle to be connected with the downstream cathode off-gas piping 320.

Figure 22A:
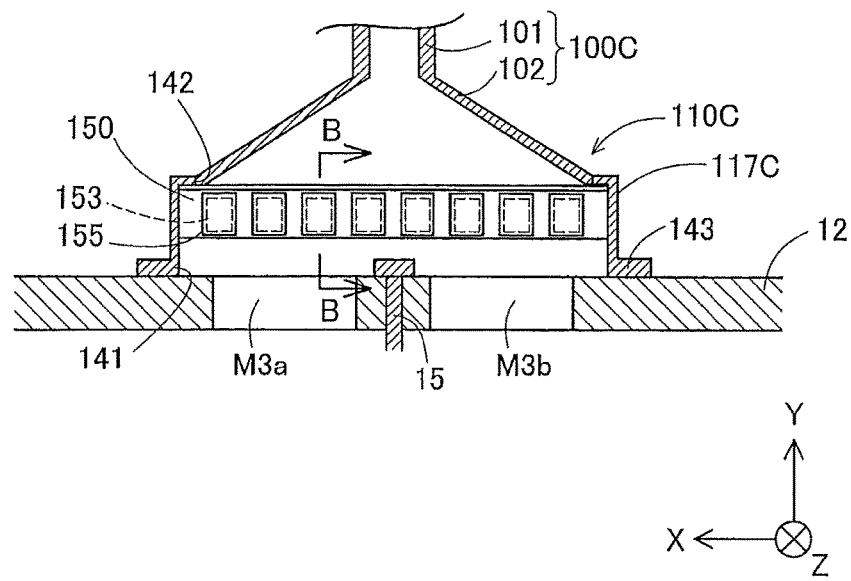
FIGS. 22A to 22C are schematic views illustrating the structure of a cathode supply valve according to another structural example.
Figure 22B:
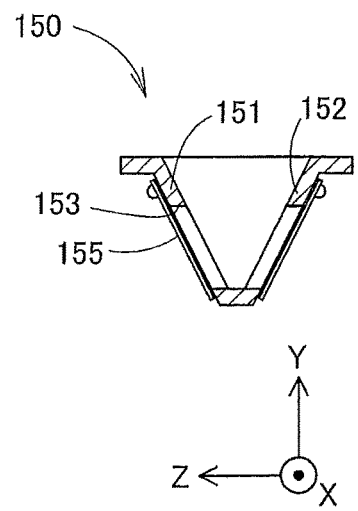
Figure 22C:
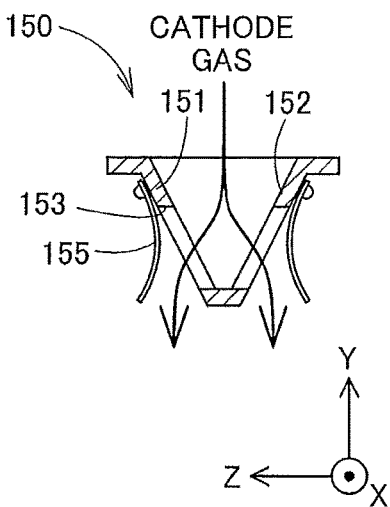

FIGS. 22A to 22C are schematic views illustrating the structure of the cathode supply valve 110C. FIG. 22A is a schematic cross sectional view, taken on a line A-A in FIG. 21. FIGS. 22B and 22C are schematic cross sectional views, taken on a line B-B in FIG. 22A. FIG. 22B shows a reed valve 155 in the closed position, and FIG. 22C shows the reed valve 155 in the open position. The three-dimensional arrows X, Y and Z are shown in FIGS. 22A to 22C for the purpose of correlation to FIG. 21.

The cathode supply valve 110C includes a casing 117C, a valve seat plate 150 and reed valves 155. The casing 117C is a cylindrical body in an approximately cuboid shape and has a first opening 141 and a second opening 142 opposed to each other. The first and the second supply manifolds M3a and M3b are connected to the first opening 141. A flange 143 for fixation to the first end plate 12 is formed around the circumference of the first opening 141. In this structural example, the casing 117C of the cathode supply valve 110C accordingly serves as the downstream cathode gas piping.

The upstream cathode gas piping 100C is connected to the second opening 142. The upstream cathode gas piping 100C includes a cylindrical tube section 101 in an approximately cylindrical shape extended along the stacking direction of the fuel cell 10B and a connecting tube section 102 having a tapered downstream end. The cathode gas supplied via the cylindrical tube section 101 flows through the connecting tube section 102 to be fully diffused in the casing 117C of the cathode supply valve 110C.

The valve seat plate 150 is placed in the casing 117C to divide the inner cavity of the casing 117C into an upstream side and a downstream side. The valve seat plate 150 is bent toward the supply manifolds M3a and M3b to have an approximate V shape when viewed from the direction along the arrow X (FIG. 22B). The valve seat plate 150 accordingly has two plate surfaces 151 and 152 in an approximately rectangular shape respectively inclined in opposite directions.

Each of the two plate surfaces 151 and 152 has a plurality of through windows 153 arranged at substantially equidistant intervals along the array direction of the two supply manifolds M3a and M3b. The reed valve 155 made of a film-like elastic member is mounted on each through window 153 to close the through window 153 from the downstream-side face. The reed valve 155 has only an upstream side fixed to the valve seat plate 150. When the cathode gas flows into the casing 117 at a pressure level that deflects the reed valve 155, this structure enables the other unfixed peripheral sides of the reed valve 155 to be away from the wall surface of the valve seat plate 150 and thereby open the through window 153 (FIG. 22C).

As described above, in this structural example, the cathode gas is supplied in the flow direction along the stacking direction of the fuel cell 10B into the supply manifolds M3a and M3b. This structure effectively reduces the pressure drop of the cathode gas in the cathode gas supply passage 41C. Formation of the plurality of through windows 153 in the valve seat plate 150 along the array direction of the supply manifolds M3a and M3b improves the flow controllability of the cathode gas.

B4. Another Structural Example 4

Figure 23A:
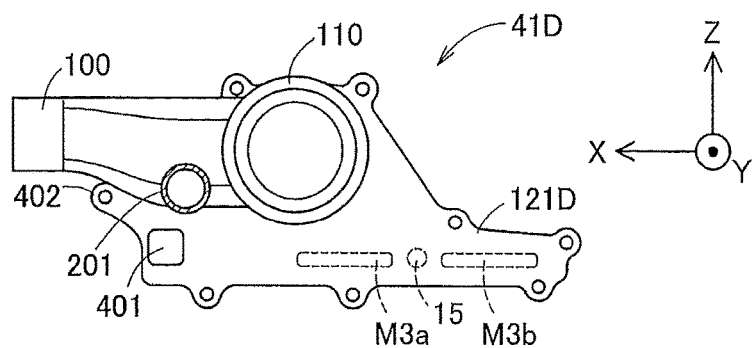
FIGS. 23A to 23C are diagrams illustrating a piping unit according to another structural example.

FIG. 23A is a diagram illustrating a piping unit according to another structural example. More specifically, FIG. 23A is a schematic front view illustrating a cathode gas supply passage 41D provided in the piping unit of this structural example. The structure of FIG. 23A is substantially similar to the structure of FIG. 6A, except omission of the downstream cathode gas piping 120. The cathode bypass piping 200 included in the cathode gas supply passage 41D has the similar structure to that of the first embodiment, although only its upstream tube section 201 is illustrated here. The cathode gas discharge passage 42 and the anode gas discharge passage 43 included in the piping unit of this structural example have the similar structures to those of the first embodiment and are thus not specifically illustrated or described here.

The cathode gas supply passage 41D of this structural example does not have the downstream cathode gas piping 120 as described above. A flat plate-like flange 121D having the similar outer peripheral shape to that of the flange 121 of the first embodiment is formed around the outer periphery of the cathode supply valve 110. In this structure, using a first end plate 12D described below for the fuel cell 10 enables formation of the flow path for the cathode gas between the outlet 111 of the cathode supply valve 110 and the supply manifolds M3a and M3b.

Figure 23B:
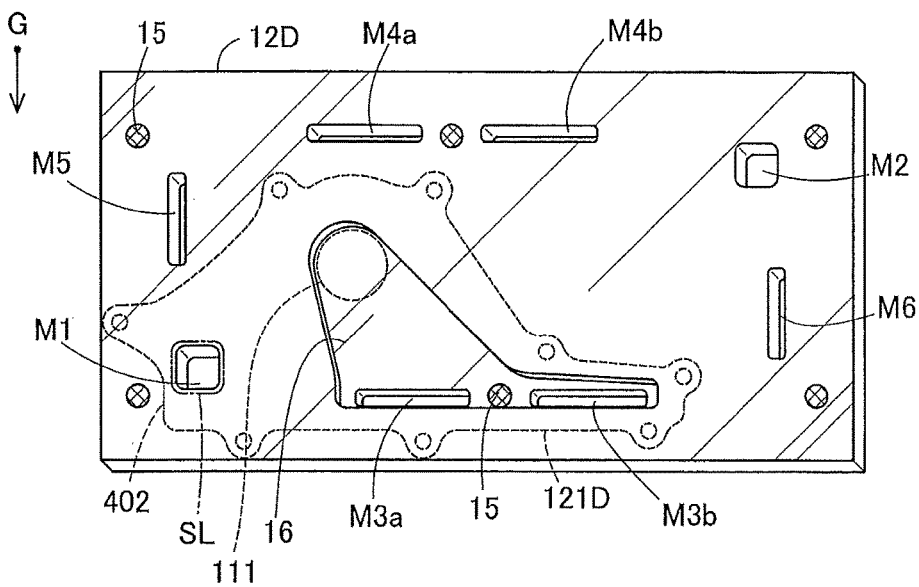

FIG. 23B is a schematic view illustrating the structure of the first end plate 12D, which the piping unit of this structural example is attached to. This first endplate 12D is substantially similar to the first end plate 12 (FIG. 5) described in the first embodiment, except the presence of a thin-walled recess 16 formed on its outer surface. The area where the outlet 111 of the cathode supply valve 110 is located and the area where the flanges 121D and 402 are located are shown by the broken lines in FIG. 23B.

Figure 23C:
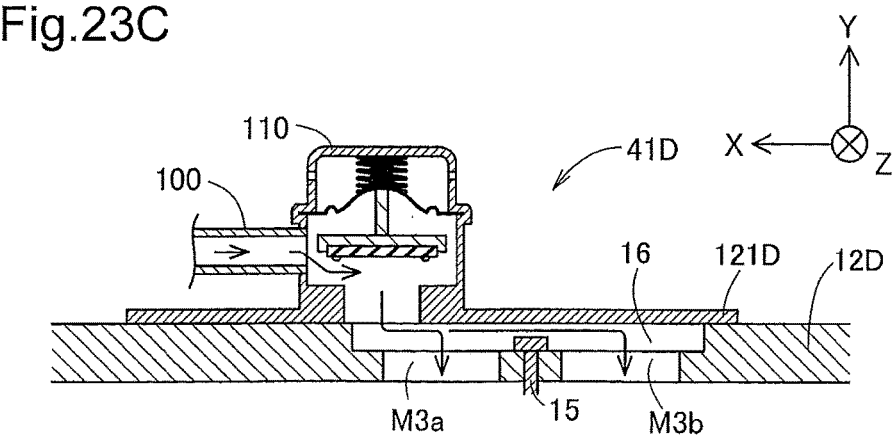

The recess 16 has an opening shape similar to the opening shape of the downstream cathode gas piping 120 described in the first embodiment. The location of the recess 16 is similar to the location of the downstream cathode gas piping 120 (shown by the broken line in FIG. 5) in the first end plate 12 described in the first embodiment. The two supply manifolds M3a and M3b and the clamping member 15 located between these manifolds M3a and M3b are located in the recess FIG. 23C is a schematic cross sectional view showing the attached state of the cathode gas supply passage 41D to the first end plate 12D. The three-dimensional arrows X, Y and Z are shown in FIG. 23C for the correlation to FIG. 23A. In the attached state of the cathode gas supply passage 41D to the first end plate 12D, the recess 16 is closed by the cathode supply valve 110 and the flange 121D. The outlet 111 of the cathode supply valve 110 is open to the recess 16. The cathode gas accordingly flows through the recess 16 as the gas flow path into the supply manifolds M3a and M3b.

As described above, in this structural example, the recess 16 formed in the first end plate 12D serves as the downstream cathode gas flow path.

This further simplifies the structure of the piping unit. In the piping unit of this structural example, like the downstream cathode gas piping 120 of the first embodiment, the outer surface of the first end plate 12D may be regarded as the guide wall surface to introduce the cathode gas. It is here assumed that the positions of the supply manifolds M3a and M3b are shifted by the design change of the fuel cell 10. Even in such cases, this structural example changes the flow path for the cathode gas by changing the shape of the recess 16 in the first end plate 12D. This structural example does not require any substantial change in structure of the piping unit accompanied with the change in positions of the supply manifolds M3a and M3b.

B4. Another Structural Example 5

Figure 24A:
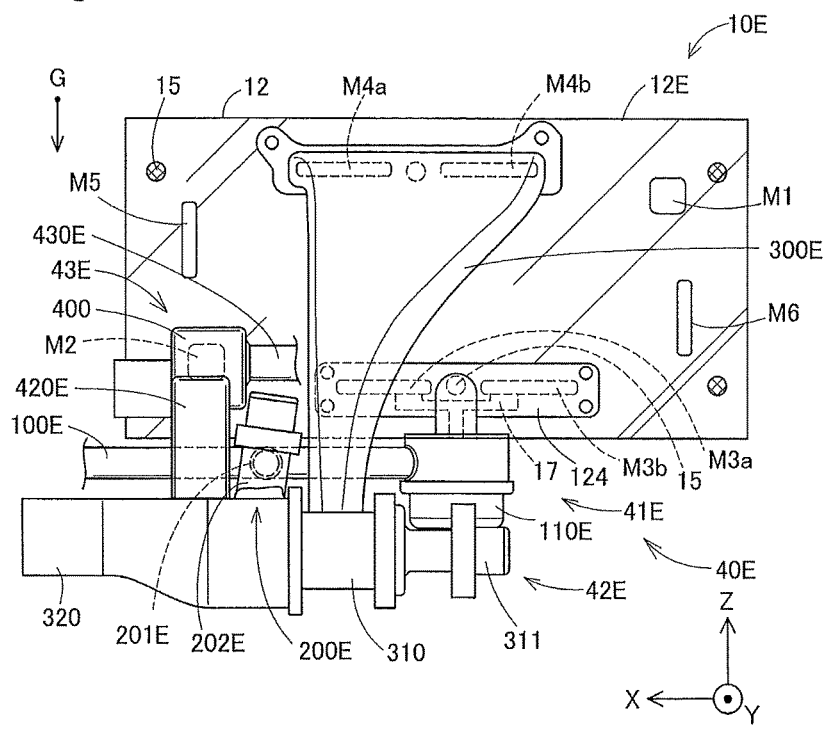
FIGS. 24A and 24B are diagrams illustrating a piping unit according to another structural example.
Figure 24B:
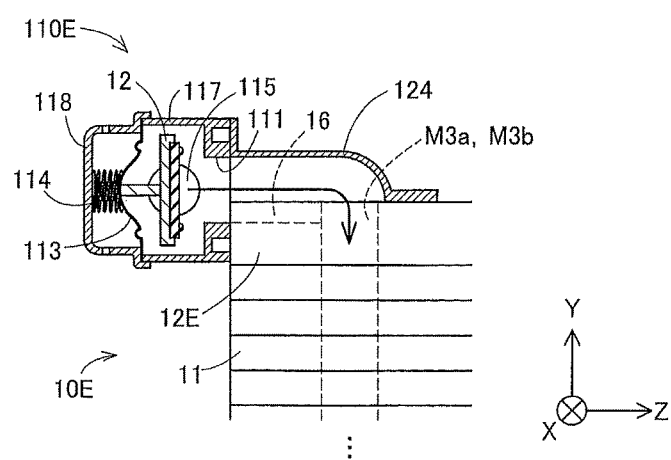

FIGS. 24A and 24B are diagrams illustrating a piping unit 40E according to another structural example. FIG. 24A is a schematic front view illustrating the piping unit 40E attached to a fuel cell 10E. The respective internally-arranged components are shown by the broken lines in FIG. 24A. The three-dimensional arrows X, Y and Z similar to those of FIGS. 2 to 4 and the arrow G representing the direction of gravity are also shown in FIG. 24A.

The fuel cell 10E of this structural example is similar to that described in the first embodiment, except that a flow channel 17 for the cathode gas is formed on the outer surface of a first end plate 12E. In the fuel cell 10E, the cathode supply manifolds M3a and M3b are located below the cathode exhaust manifolds M4a and M4b in the direction of gravity. The flow channel 17 formed in the first end plate 12E is extended upward in the direction of gravity from the center of the lower end face in the direction of gravity of the first end plate 12E and is branched into two before the clamping member 15 to be linked with the two supply manifolds M3a and M3b.

The piping unit 40E includes a cathode gas supply passage 41E, a cathode gas discharge passage 42E and an anode gas discharge passage 43E. The cathode gas supply passage 41E includes upstream cathode gas piping 100E, a cathode supply valve 110E, a flow channel closing member 124 and cathode bypass piping 200E. The cathode supply valve 110E is located at a different position from the position of the first embodiment and is set on the lower peripheral end face in the direction of gravity of the first end plate 12E.

FIG. 24B is a schematic view illustrating the cathode supply valve 110E and the flow channel closing member 124 in the attached state to the fuel cell 10E when viewed from the direction of the arrow X. The internal structures of the cathode supply valve 110E and the flow channel closing member 124 are schematically shown in FIG. 24B. The supply manifolds M3a and M3b and the flow channel 17 of the first end plate 12E are shown by the broken lines. The other components in the piping unit 40E are omitted from the illustration of FIG. 24B.

The cathode supply valve 110E is a poppet valve like the cathode supply valve 110 described in the first embodiment and has an inlet 115 formed on the side face of the casing 117 and an outlet 111 formed on the center of the bottom face of the casing 117. The inlet 115 and the outlet 111 are formed as approximately circular openings of substantially the same size and are formed to have their virtual central axes orthogonal to each other. The cathode supply valve 110E is arranged to have the inlet 115 open to the direction of the arrow X and the outlet 111 coupled with the lower end of the flow channel 17 of the first end plate 12E.

The flow channel closing member 124 is provided to cover over and close the outlet 111 of the cathode supply valve 110E, the opening of the flow channel 17 and the supply manifolds M3a and M3b. A flange is formed on the outer periphery of the flow channel closing member 124 to be fixed to the outlet 111-side bottom face of the cathode supply valve 110E and the outer surface of the first end plate 12E. The flow channel closing member 124 accordingly serves as the member for fixed connection of the cathode supply valve 110E. Attachment of the flow channel closing member 124 causes the cathode gas flowing out of the outlet 111 of the cathode supply valve 110E to flow through the flow cavity defined by the flow channel closing member 124 and the flow channel 17 into the supply manifolds M3a and M3b.

The upstream cathode gas piping 100E is made of a tube having the flow path cross section in an approximately circular shape. The upstream cathode gas piping 100E is extended in the direction of the arrow X from the inlet 115 of the cathode supply valve 110E and has the side face connected with an upstream tube section 201E of the cathode bypass piping 200E. The cathode bypass piping 200E has the similar structure to that of the cathode bypass piping 200 described in the first embodiment, except the upstream tube section 201 and the downstream tube section 202 of different tube lengths. The cathode gas supply passage 41E and the cathode gas discharge passage 42E are integrated with each other via the cathode bypass piping 200E.

The cathode gas discharge passage 42E has the similar structure to that of the cathode gas discharge passage 42 described in the first embodiment, except upstream cathode off-gas piping 300E of different tube length. The cathode exhaust valve 310 and the downstream cathode off-gas piping 320 of the cathode gas discharge passage 42E are located below the cathode supply valve 110E and the upstream cathode gas piping 100E in the direction of gravity to be more distant away from the first end plate 12E than the cathode supply valve 110E and the downstream cathode gas piping 120E and is arranged in parallel to the upstream cathode gas piping 100E. Like the upstream cathode off-gas piping 300, the upstream cathode off-gas piping 300E is extended in the direction of the arrow Y from the joint with the exhaust manifolds M4a and M4b and is bent in the direction of gravity to be connected with the cathode exhaust valve 310.

The anode gas discharge passage 43E has the similar structure to that of the anode gas discharge passage 43 described in the first embodiment, except that separate water drainage piping 420E and separate off-gas piping 430E are formed in different shapes according to the arrangements of the other components 41E and 42E. The separate off-gas piping 430E starts from the right side face of the anode off-gas piping 400, runs between the upstream cathode off-gas piping 300E and the first end plate 12E and is extended in the direction opposite to the arrow X. The separate water drainage piping 420E is extended downward in the direction of gravity and is connected with the downstream cathode off-gas piping 320. The anode gas discharge passage 43E and the cathode gas discharge passage 42E are integrated with each other via the separate water drainage piping 420E.

As described above, the cathode supply valve 110E may not be located in the plane of the first end plate 12E but may be located and fixed on the outer peripheral end face of the first end plate 12E. In this structure, the cathode gas can be supplied through the flow channel 17 for the cathode gas formed on the outer surface of the first end plate 12E into the supply manifolds M3a and M3b.

B6. Another Structural Example 6

Figure 25A:
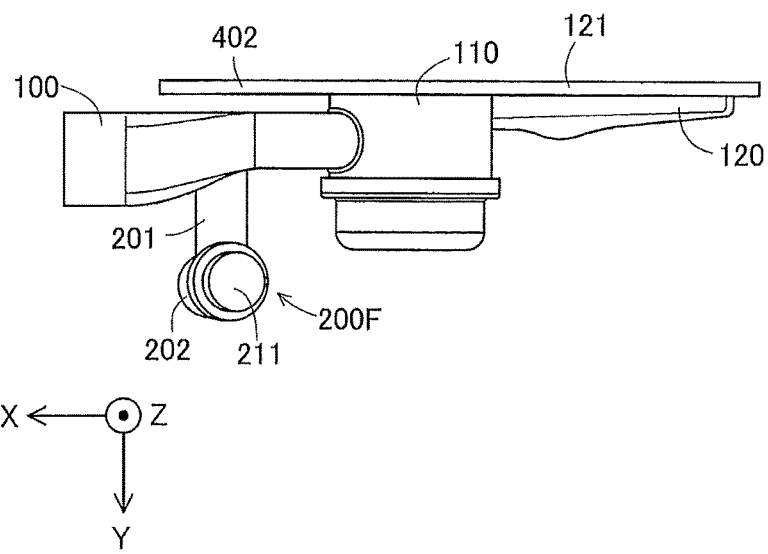
FIGS. 25A and 25B are diagrams illustrating cathode bypass piping according to another structural example.

FIG. 25A is a diagram illustrating cathode bypass piping 200F according to another structural example. FIG. 25A illustrates the whole cathode bypass piping 200F. The structure of FIG. 25A is substantially similar to the structure of FIG. 6B, except the connecting location of its upstream tube section 201 to the upstream cathode gas piping 100. The other structure of this structural example except the connecting location of the cathode bypass piping 200F is similar to that of the first embodiment and is thus not specifically illustrated or described here. In this structural example, the upstream tube section 201 of the cathode bypass piping 200F is connected from the direction opposite to the arrow Y at the location where the flow path width of the upstream cathode gas piping 100 in the direction of the arrow Y tends to decrease.

Figure 25B:
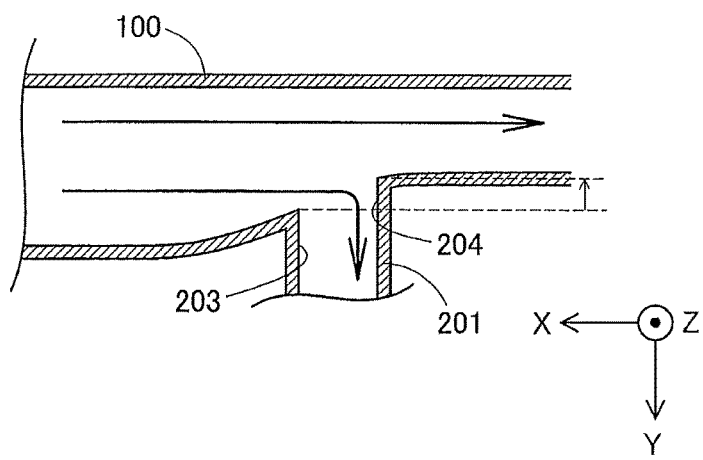

FIG. 25B schematically illustrates the cross section at the junction between the upstream cathode gas piping 100 and the upstream tube section 201 of the cathode bypass piping 200F. The three-dimensional arrows X, Y and Z are shown in FIG. 25B for correlation to FIG. 25A, and the arrows representing the flow of the cathode gas are also shown in FIG. 25B.

In this structural example, an inner wall surface 204 of the upstream tube section 201 is protruded inward of the piping when the upstream cathode gas piping 100 is viewed from the direction opposite to the arrow X. In other words, the inner wall surface 204 of the upstream tube section 201 is protruded in the direction of interfering with the flow of the cathode gas in the upstream cathode gas piping 100, so as to increase the amount of gas flow introduced into the cathode bypass piping 200F. This also reduces the pressure drop of the bypass gas flowing into the upstream tube section 201 and thereby achieves further size reduction of the bypass piping valve 210 by the reduced pressure drop of the bypass gas.

As described above, it is preferable that the connecting location and the connecting orientation of the cathode bypass piping 200F are determined to increase the amount of gas flow from the upstream cathode gas piping 100 into the cathode bypass piping 200F in the opened position of the bypass piping valve 210. In another possible example of the connecting orientation of the cathode bypass piping 200, the upstream tube section 201 may be inclined and connected to the upstream cathode gas piping 100.

B7. Another Structural Example 7

Figure 26:
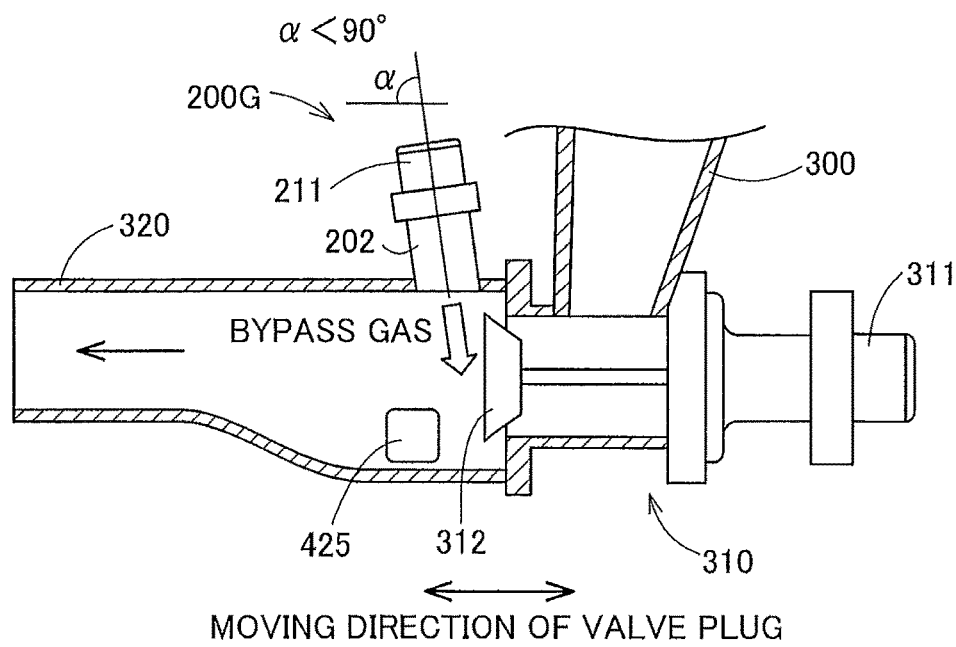
FIG. 26 is a diagram illustrating cathode bypass piping according to another structural example.

FIG. 26 is a diagram illustrating cathode bypass piping 200G according to another structural example. The structure of FIG. 26 is substantially similar to the structure of FIG. 12B, except that a downstream tube section 202 of the cathode bypass piping 200G is connected with the downstream cathode off-gas piping 320 at a different angle from that of the first embodiment. The other structure of this structural example except the connecting angle of the cathode bypass piping 200G is similar to that of the first embodiment and is thus not specifically illustrated or described here.

In this structural example, the downstream tube section 202 of the cathode bypass piping 200G is connected in such a manner that the angle α between the flow direction of the off-gas (direction of the arrow X) in the downstream cathode off-gas piping 320 and the piping direction of the downstream tube section 202 is smaller than 90 degrees. Such connection causes the downstream tube section 202 to be open to the cathode exhaust valve 310 and thereby improves the scavenging efficiency for removal of the water from the cathode exhaust valve 310 by the bypass gas.

In this structural example, there is a possibility that the bypass gas flows against the flow of the cathode off-gas and increases the pressure drop of the cathode off-gas. The structure of the first embodiment is preferred to prevent an increase in pressure drop of the cathode off-gas. In this structural example, the connecting location of the downstream tube section 202 may be on the downstream side (left side of the illustration) from the illustrated connecting location. This improves the scavenging efficiency at the junction between the separate water drainage piping 420 and the downstream cathode off-gas piping 320 by the bypass gas.

B8. Another Structural Example 8

Figure 27:
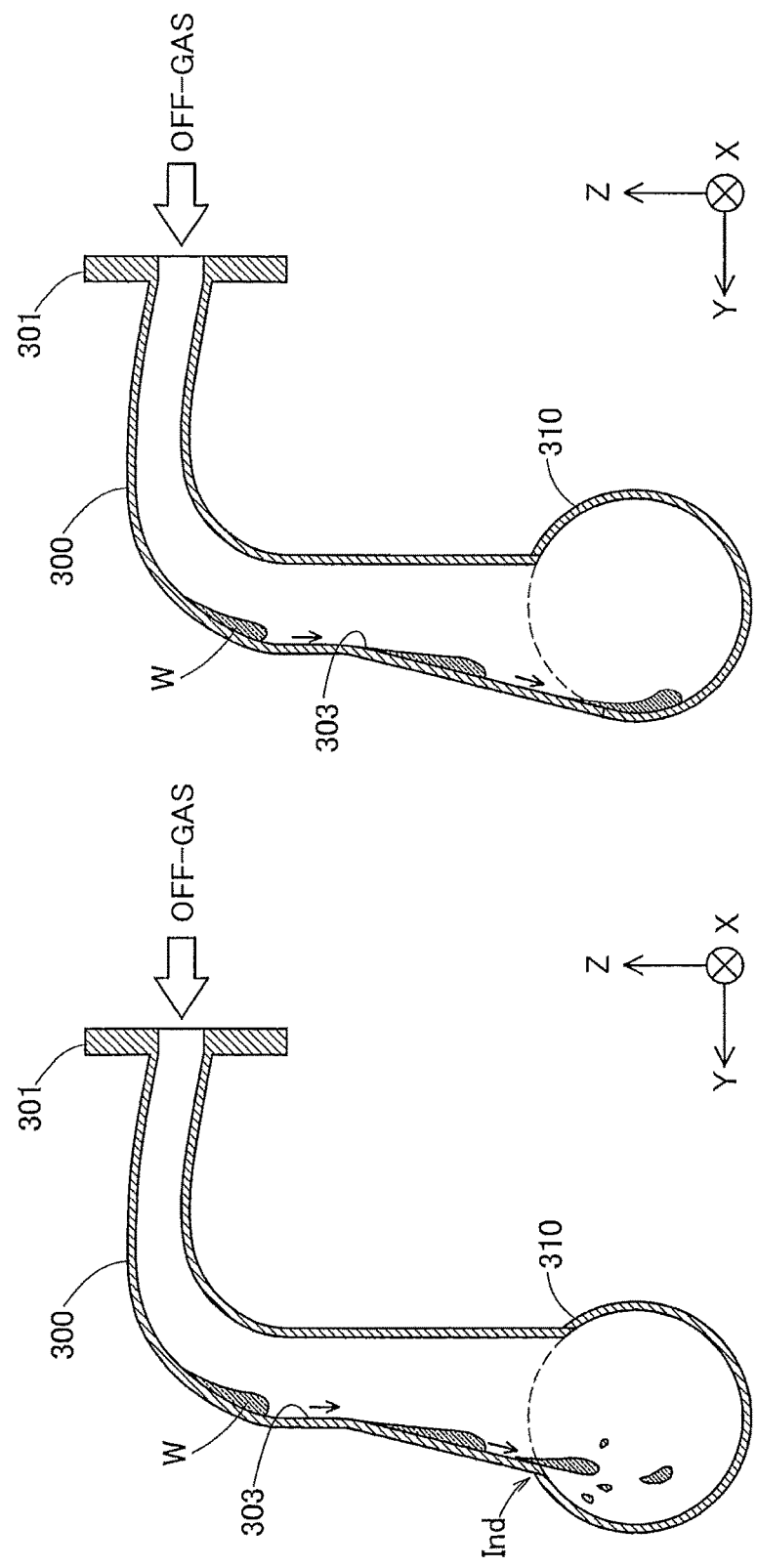
FIGS. 27A and 27B are diagrams illustrating another structural example of connection between upstream cathode off-gas piping and a cathode exhaust valve.

FIGS. 27A and 27B are diagrams illustrating another structural example of connection between the upstream cathode off-gas piping 300 and the cathode exhaust valve 310. FIG. 27A is a schematic view illustrating the structure of the first embodiment and is substantially similar to FIG. 13A except the difference in illustration of liquid water W accumulated on the inner wall surface. FIG. 27A illustrates the track of movement of the liquid water W condensed and accumulated on the inner wall surface of the upstream cathode off-gas piping 300.

The cathode off-gas contains a significant amount of water. When the flow direction of the cathode off-gas is curved as in the upstream cathode off-gas piping 300, it is highly possible that water collides against and is condensed on the inner wall surface 303 outside the curve. The liquid water W condensed and accumulated on the inner wall surface 303 moves along the inner wall surface 303 toward the cathode exhaust valve 310 by gravity and by the flow of the cathode off-gas.

When there is a bend Ind formed between the inner wall surface 303 and the inner wall surface of the casing of the cathode exhaust valve 310, the drop of liquid water W at the bend Ind may be blown off and spattered by the flow of the cathode off-gas. Accumulation of the spattering water on a specific location having difficulty in water removal by scavenging causes freezing and degradation of the cathode exhaust valve 310. The upstream cathode off-gas piping 300 may thus be connected with the cathode exhaust valve 310 as described below.

FIG. 27B is a schematic view illustrating another structural example of the upstream cathode off-gas piping 300 and the cathode exhaust valve 310. The structure of FIG. 27B is substantially similar to the structure of FIG. 27A, except the connecting location of the upstream cathode off-gas piping 300 to the casing of the cathode exhaust valve 310 and the track of movement of the liquid water W.

In this structural example, the position of the cathode supply valve 310 is shifted in the direction opposite to the arrow Y, so that the inner wall surface 303 of the upstream cathode off-gas piping 300 is smoothly continuous with the inner wall surface of the casing of the cathode supply valve 310. This enables the liquid water W condensed and accumulated on the inner wall surface 303 to smoothly move from the inner wall surface 303 to the inner wall surface of the casing of the cathode supply valve 310, thus reducing the possibility of spattering as described above. The position of the cathode supply valve 310 is shifted in the structure of FIG. 27B, but the inclination angle of the inner wall surface 303 may be changed to avoid formation of the bend Ind.

B9. Another Structural Example 9

Figure 28:
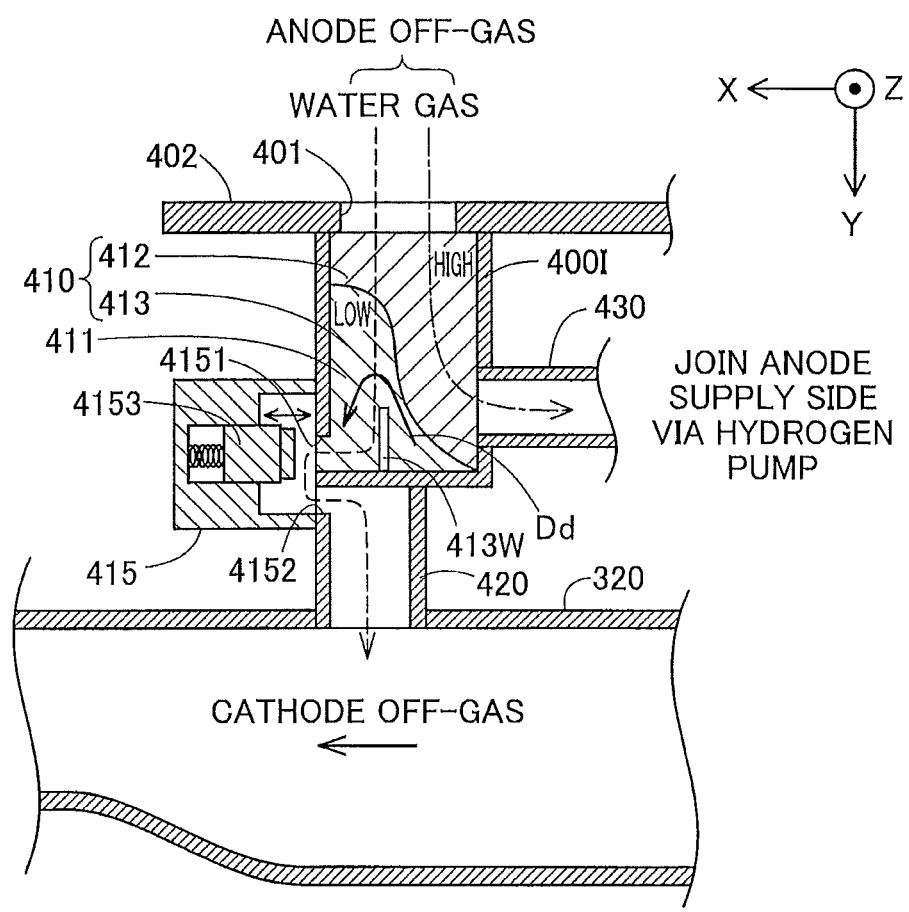
FIG. 28 is a schematic view illustrating anode off-gas piping according to another structural example.

FIG. 28 is a schematic view illustrating anode off-gas piping 4001 according to another structural example. The structure of FIG. 28 is substantially similar to the structure of FIG. 15B, except a bulkhead 413w additionally formed on the lower floor face 413 and addition of an arrow Dd representing the direction of inclination of the low floor face 413. The other structure of this structural example except the anode off-gas piping 4001 is similar to that of the first embodiment and is thus not specifically illustrated or described here.

The bulkhead 413w is a partition wall located at a position opposed to the inlet 4151 of the anode drain valve 415. This bulkhead 413w serves as the guide wall to introduce the water contained in the anode off-gas toward the anode drain valve 415. The bulkhead 413w also serves as the barrier to prevent the water accumulated in the water reservoir 411 from being taken to the separate off-gas piping 430 by the gas component of the cathode off-gas.

As described above, formation of the bulkhead 413w in the gas-liquid separator 410 ensures the more effective separation of water from the anode off-gas. It is preferable that the lower floor face 413 is inclined to be lowered in the direction of the arrow Dd, in order to introduce the water accumulated on the separate off-gas piping 430-side of the bulkhead 413w to the inlet 4151 of the anode drain valve 415.

B10. Another Structural Example 10

Figure 29:
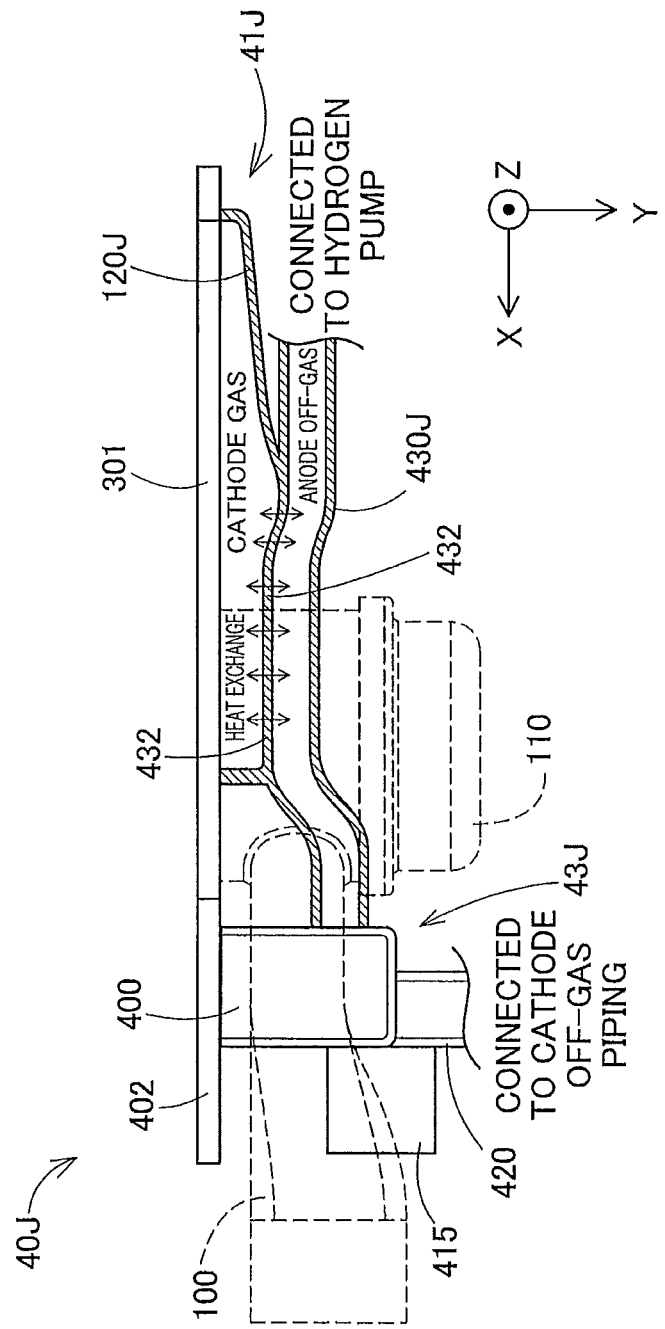
FIG. 29 is a diagram illustrating downstream cathode gas piping and separate off-gas piping according to another structural example.

FIG. 29 is a diagram illustrating downstream cathode gas piping 120J and separate off-gas piping 430J according to another structural example. A cathode gas supply passage 41J and an anode gas discharge passage 43J are shown in FIG. 29. For convenience of illustration, in FIG. 29, the internal structures of the downstream cathode gas piping 120J and the separate off-gas piping 430J are shown by the schematic cross sectional views, while the upstream cathode gas piping 100 and the cathode supply valve 110 are shown by the broken lines. The structure of a piping unit 40J of this structural example other than that described below is substantially similar to the structure of the piping unit 40 of the first embodiment.

In this structural example, the downstream cathode gas piping 120J is integrated with the separate off-gas piping 430J, and the flow path for the cathode gas and the flow path for the anode off-gas are adjacent to each other across a common bulkhead 432. This structure ensures the more efficient heat exchange between the anode off-gas and the cathode gas and thereby heats up the fuel cell 10 with higher efficiency as described above with reference to FIG. 14B.

C. Second Embodiment

Figure 30:
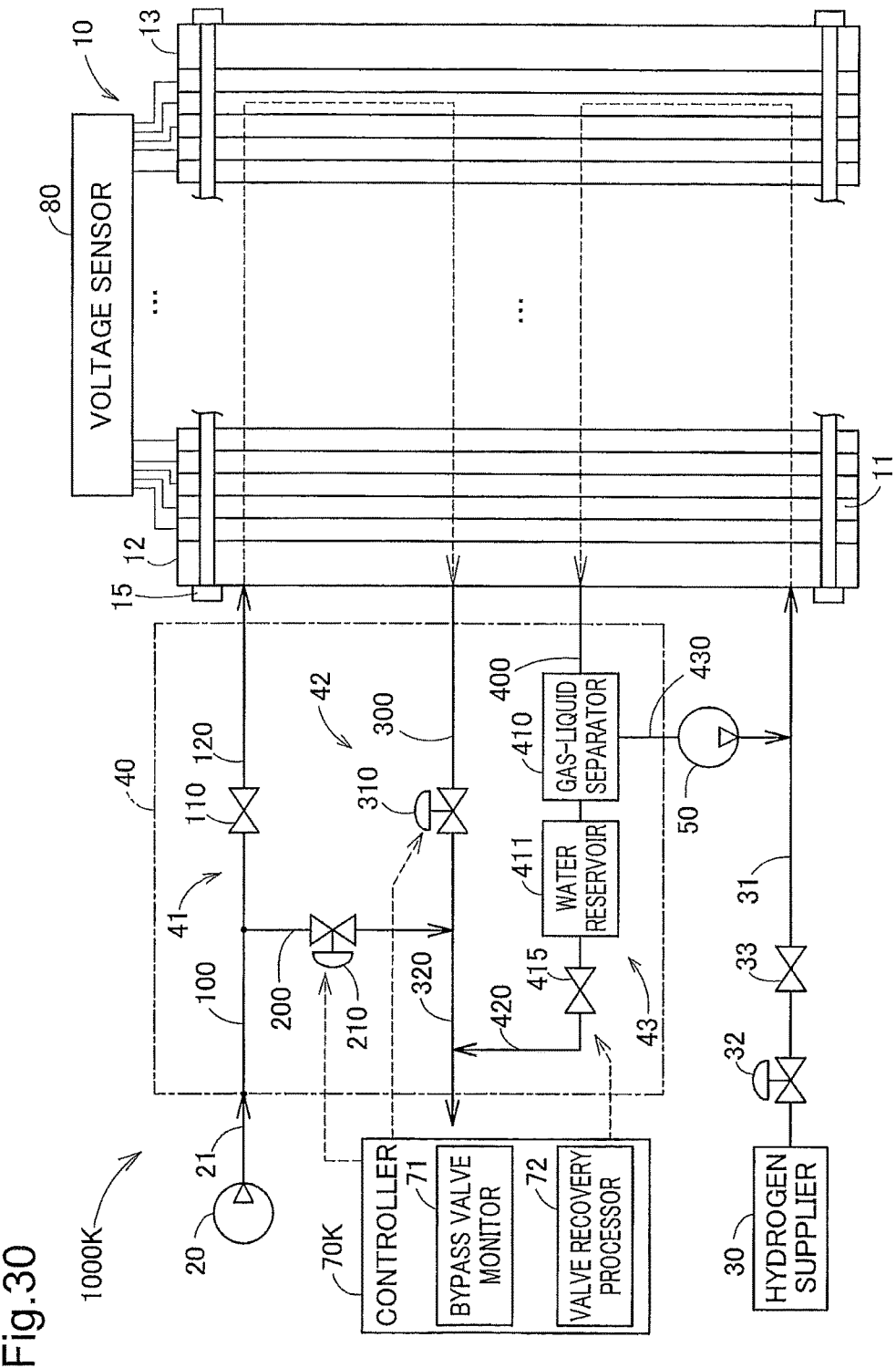
FIG. 30 is a schematic block diagram illustrating the configuration of a fuel cell system according to a second embodiment.

FIG. 30 is a schematic block diagram illustrating the configuration of a fuel cell system 1000K according to a second embodiment of the invention. The configuration of FIG. 30 is substantially similar to the configuration of FIG. 1, except that the controller 70 is replaced with a controller 70K and that a voltage sensor 80 is connected to the fuel cell 10. The controller 70K includes a bypass valve monitor 71 and a valve recovery processor 72. The voltage sensor 80 measures the voltage generated by each of the unit cells 11 of the fuel cell 10 and sends the measured voltage to the controller 70K. The fuel cell system 1000K of this embodiment includes the fuel cell 10 with the piping unit 40 attached thereto as described in the first embodiment. Like the controller 70 of the first embodiment, the controller 70K controls opening/closing of the respective valves 210, 310 and 415 of the piping unit 40, so as to regulate the output of the fuel cell 10.

In the fuel cell system 1000K, the flow rate of the cathode gas supplied to the fuel cell 10 can be more linearly regulated by controlling the opening of the bypass piping valve 210. There is, however a possibility that foreign matter taken in with the cathode gas by the air compressor 20 may enter the cathode bypass piping 200 (FIG. 11). When such foreign matter is stuck between the valve plug 212 and the valve seat 213, the bypass piping valve 210 may fall in "stuck-open state" that prevents a change to the fully closed position. In the bypass piping valve 210, the stuck-open state may occur due to a clearance between the valve plug 212 and the valve seat 213 by off-axis of the valve plug 212, in addition to the presence of foreign matter.

In the stuck-open state of the bypass piping valve 210, part of the cathode gas taken in by the air compressor 20 is continuously leaked to the cathode bypass piping 200. Such leakage decreases the cathode gas supply and reduces the power generation efficiency of the fuel cell 10. In order to prevent reduction of the power generation efficiency of the fuel cell 10, it is desirable to quickly detect the stuck-open state of the bypass piping valve 210 and perform required operation for recovery. In the fuel cell system 1000K of this embodiment, the controller 70K accordingly performs a bypass valve monitoring process described below.

Figure 31:
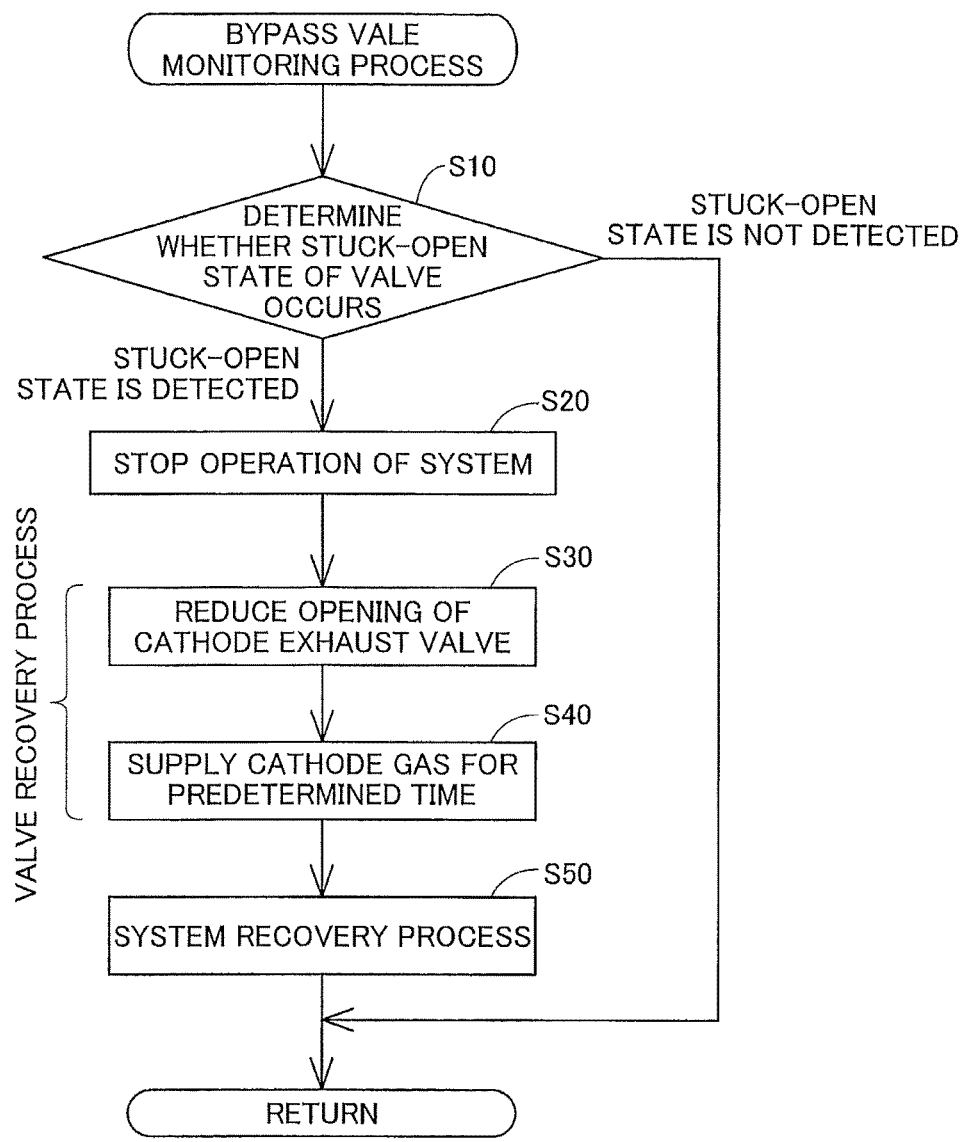
FIG. 31 shows a procedure of bypass valve monitoring process.

FIG. 31 is a flowchart showing a procedure of bypass valve monitoring process performed by the controller 70K. The controller 70K performs this process at regular intervals at the start of and during operation of the fuel cell system 1000K. At step S10, the bypass valve monitor 71 of the controller 70K detects whether the stuck-open state of the bypass piping valve 210 occurs. The following describes the concrete procedure of such detection.

The controller 70K controls the opening of the cathode exhaust valve 310 according to a target value of output voltage of the fuel cell 10 (target voltage value Vt) during output control of the fuel cell 10. More specifically, the opening of the cathode exhaust valve 310 is reduced more at the higher target voltage value Vt to increase the pressure of the cathode gas in the fuel cell 10.

As described above, in the stuck-open state of the bypass piping valve 210, there is leakage of the cathode gas from the cathode bypass piping 200. It is thus difficult to achieve the target voltage value Vt by simply controlling the opening of the cathode exhaust valve 310. The bypass valve monitor 71 of the embodiment accordingly detects reduction of the power generation efficiency of the fuel cell 10 and determines that the stuck-open state of the bypass piping valve 210 occurs in response to detection of the reduction. More specifically, the bypass valve monitor 71 uses a map provided in advance to detect reduction of the power generation efficiency of the fuel cell 10 and determines whether the stuck-open state of the bypass piping valve 210 occurs.

Figure 32:
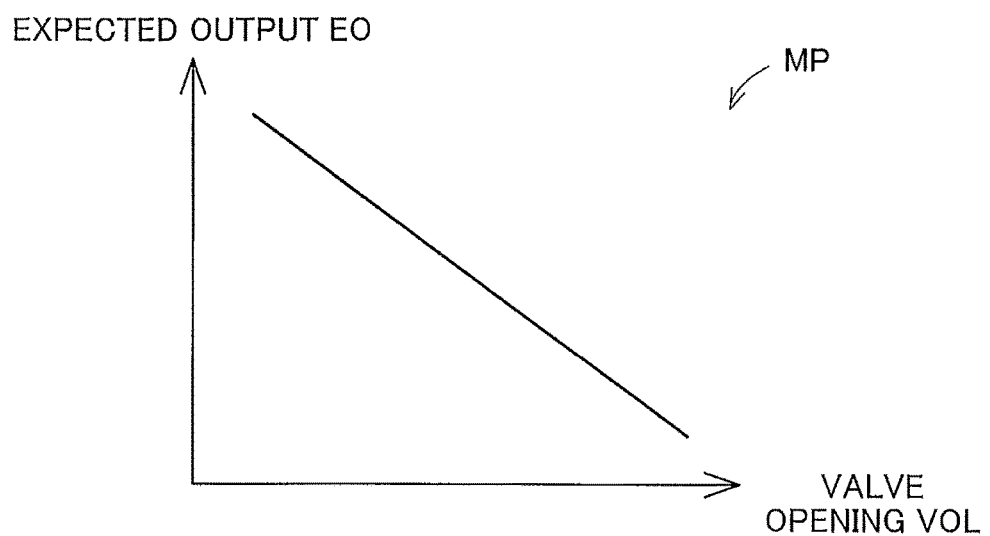
FIG. 32 illustrates one example of a map used by a bypass valve monitor.

FIG. 32 illustrates one example of the map used by the bypass valve monitor 71 for the detection at step S10. This stuck-open state detection map MP has opening VOL of the cathode exhaust valve 310 as abscissa and expected output EO as ordinate. The "expected output EO" herein means an output voltage value expected to be output from the fuel cell 10 at each opening VOL of the cathode exhaust valve 310. The expected output EU is set in advance, for example, based on the experimental results.

The bypass valve monitor 71 refers to this stuck-open state detection map MP to read the expected output EO at a current opening command of the cathode exhaust valve 310. The bypass valve monitor 71 then obtains an output voltage value Vm of the fuel cell 10 based on the measurement value of the voltage sensor 80 attached to the fuel cell 10 and compares the output voltage value Vin with the expected output EO read from the map MP. More specifically, the bypass valve monitor 71 calculates the difference between the output voltage value Vm and the expected output EO and determines that the stuck-open state of the bypass piping valve 210 occurs when the output voltage value Vm is significantly lower than the expected output EO, i.e., when the difference is greater than a predetermined threshold value.

The output voltage of the fuel cell 10 is affected by various factors other than the opening of the cathode exhaust valve 310. For example, the output voltage changes with variations in flow rate and pressure of hydrogen supplied to the fuel cell 10. The detection of step S10 may accordingly detect reduction of the power generation efficiency of the fuel cell 10 by taking into account such factors other than the opening of the cathode exhaust valve 310. More specifically, similar maps to the stuck-open state detection map MP are provided with respect to different hydrogen supply flow rates and hydrogen supply pressures. The bypass valve monitor 71 selects an adequate map to be used for the detection corresponding to the hydrogen supply flow rate and the hydrogen supply pressure.

When it is determined at step S10 that the stuck-open state of the bypass piping valve 210 does not occur, the controller 70K terminates this bypass valve monitoring process and continues the ordinary system operation (FIG. 31). When it is determined at step S10 that the stuck-open state of the bypass piping valve 210 occurs, on the other hand, the controller 70K stops operation of the fuel cell system 1000K and causes the valve recovery processor 72 to perform a recovery process for eliminating the stuck-open state (step S20). The controller 70K may inquire the user of the fuel cell system 1000K about the approval or the rejection of the recovery process before stopping operation of the fuel cell 1000K.

At step S30, the valve recovery processor 72 controls the cathode exhaust valve 310 to reduce the opening. Alternatively the valve recovery processor 72 may control the cathode exhaust valve 310 to the closed position. At step S40, the valve recovery processor 72 outputs the cathode gas at a predetermined pressure to the air compressor 20 for a predetermined time. The processing of steps S30 and S40 increases the pressure and the flow rate of the cathode gas flowing into the cathode bypass piping 200. The flow of the cathode gas blows off the foreign matter as the cause of the stuck-open state and gives an external force to the valve plug 212 as the trigger to correct its off-axis condition, thus eliminating the stuck-open state.

At step S50, the controller 70K performs a recovery process to restart the operation of the fuel cell system 1000K stopped at step S20. More specifically, the openings of the respective valves 210 and 310 and the output of the air compressor 20 may be returned to the original conditions prior to the operation stop at step S20. Alternatively, the openings of the respective valves 210 and 310 and the output of the air compressor 20 may be returned to the initial state immediately after activation of the fuel cell system 1000K.

As described above, in the fuel cell system 1000K of this embodiment, when the bypass valve monitor 71 detects the stuck-open state of the bypass piping valve 210, the valve recovery processor 72 performs the processing to eliminate the stuck-open state. This prevents reduction of the power generation efficiency of the fuel cell 10 due to the stuck-open state of the bypass piping valve 210 and thereby prevents the decreasing efficiency of the fuel cell system 1000K.

The piping unit 40 described in the first embodiment is adopted in the fuel cell system 1000K of the embodiment as described previously. The piping unit 40 is small-sized with the short tube lengths of the upstream cathode gas piping 100 and the cathode bypass piping 200. This enables the pressure and the flow rate of the bypass gas in the cathode bypass piping 200 to be promptly changed by regulating the pressure and the flow rate of the cathode gas at steps S30 and S40. Compared with a fuel cell system of the similar system configuration without the piping unit 40, the system configuration of this embodiment performs the processing more effectively to eliminate the stuck-open state of the bypass piping valve 210.

D. Third Embodiment

Figure 33:
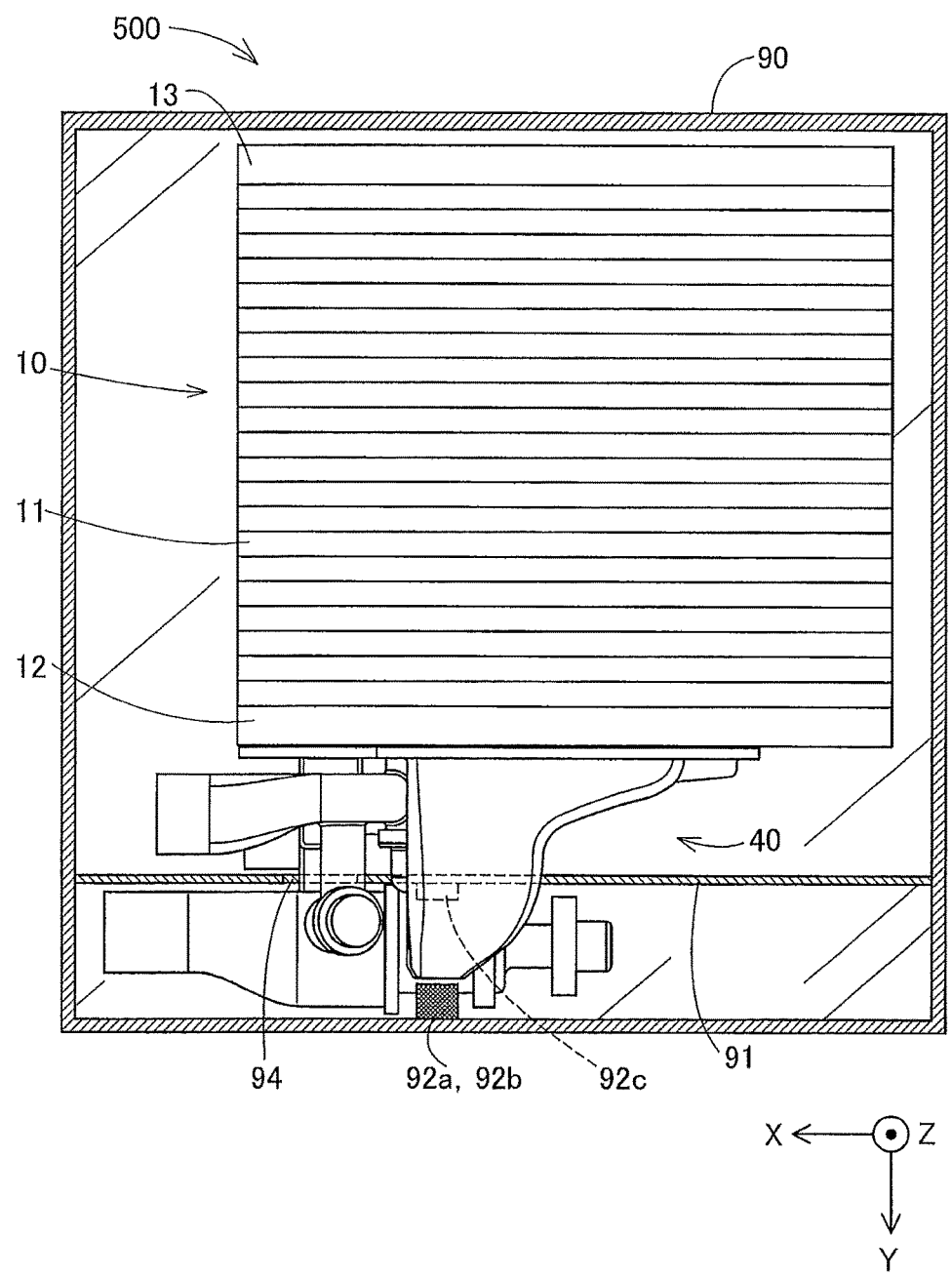
FIG. 33 is a schematic top view illustrating the structure of a fuel cell unit according to a third embodiment.
Figure 35:
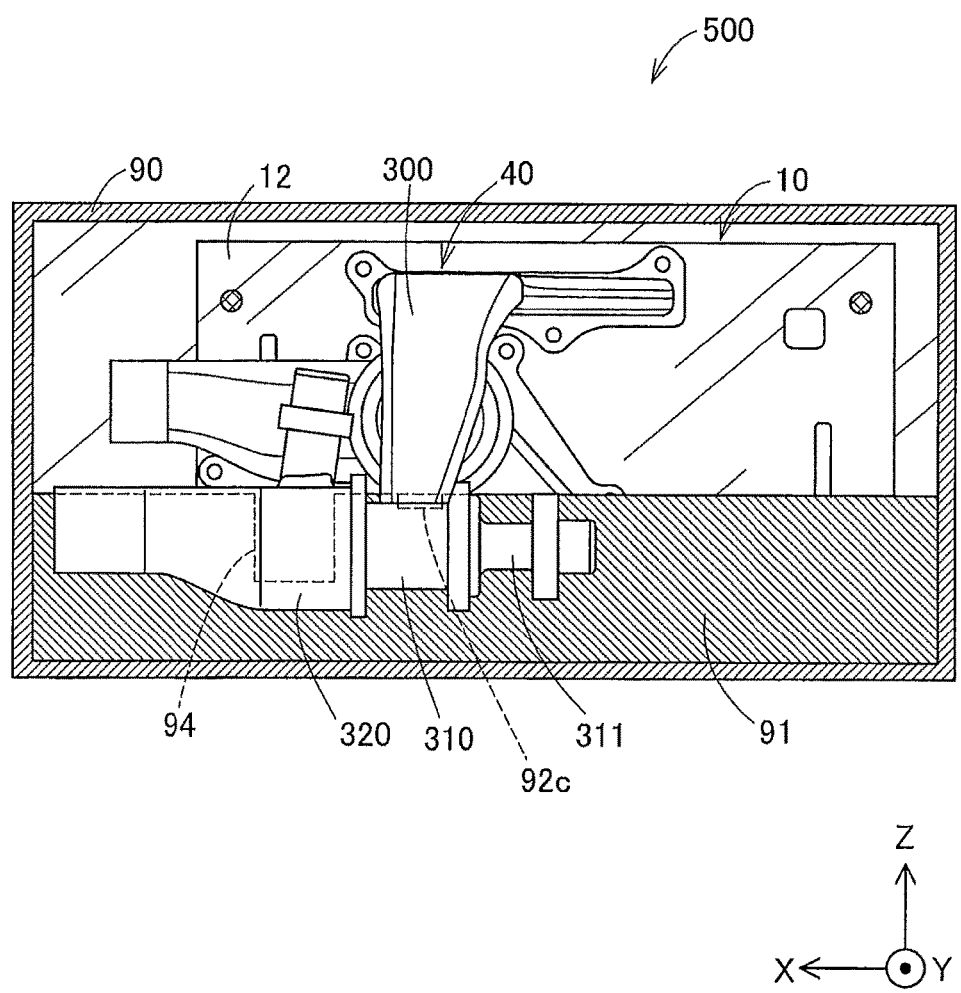
FIG. 35 is a schematic front view illustrating the structure of the fuel cell unit of the third embodiment.

FIGS. 33 to 35 are schematic views illustrating the structure of a fuel cell unit 500 according to a third embodiment of the invention. The three-dimensional arrows X, Y and Z similar to those of FIGS. 2 to 4 are shown in FIGS. 33 to 35. FIG. 33 is a schematic top view of the fuel cell unit 500 with the internal structure of a casing 90. FIGS. 34A and 34B are respectively a schematic left side view and a schematic right side view of the fuel cell unit 500 with the internal structure of the casing 90. FIG. 35 is a schematic front view of the fuel cell unit 500 with the internal structure of the casing 90.

Pipings and wirings connected with the fuel cell unit 500 are omitted from the illustration of FIGS. 33 to 35. The casing 90 of the fuel cell unit 500 has inlets and openings to pull the pipings and wirings into the casing 90, which are also omitted from the illustration of FIGS. 33 to 35.

The fuel cell unit 500 includes a fuel cell 10, a piping unit 40 and the casing 90. The structures of the fuel cell 10 and the piping unit 40 are identical with those described in the first embodiment and are thus not specifically described here. The casing 90 is a housing in an approximately cuboid shape to accommodate the fuel cell 10 with the piping unit 40 attached thereto.

The fuel cell 10 and the piping unit 40 are integrally placed in the casing 90. This prevents degradation of the fuel cell 10 and the piping unit 40 by external dust or water. This also prevents leakage of the operating noise of opening/closing operations of the respective valves 110, 210, 310 and 415 of the piping unit 40 during the operation of the fuel cell 10. The casing 90 may be made of, for example, iron or stainless steel.

The casing 90 has a base 98 located on its bottom, and the fuel cell 10 is mounted on the base 98 in the orientation described in the first embodiment. A waterproof wall 91 is placed inside the casing 90. The waterproof wall 91 is a partition wall located at the position between the cathode exhaust valve 310 with the downstream cathode off-gas piping 320 and the upstream anode off-gas piping 400 with the separate off-gas piping 430. More specifically, the waterproof wall 91 is the partition wall stood on the bottom face of the casing 90 to be extended in the direction of the arrow X and connect between the left and right side walls of the casing 90. The waterproof wall 91 has a recess 94 of the decreasing height to allow the separate water drainage piping 420 to pass through. The waterproof wall 91 other than the recess 94 has the height substantially equal to the height of the junction between the upstream cathode off-gas piping 300 and the cathode exhaust valve 310.

Protrusions 92a to 92c with pointing ends are formed on the inner wall surface of the casing 90 and on the wall surface of the waterproof wall 91. The first and the second protrusions 92a and 92b are located on the front inner wall surface of the casing 90, and the third protrusion 92c is located on the upper edge of the waterproof wall 91. The first protrusion 92a is arranged to have its downward-pointing end close to the connection between the upstream cathode off-gas piping 300 and the cathode supply valve 310.

The second protrusion 92b is arranged vertically below the first protrusion 92a to have its end close to the lower face of the casing of the cathode exhaust valve 310. The third protrusion 92c is arranged to have its end close to the connection between the upstream cathode off-gas piping 300 and the cathode supply valve 310. It is preferable that the first to the third protrusions 92a to 92c are made of a material having the higher rigidity than the material of the parts of the piping unit 40 proximate to the respective pointing ends.

Figure 36A:
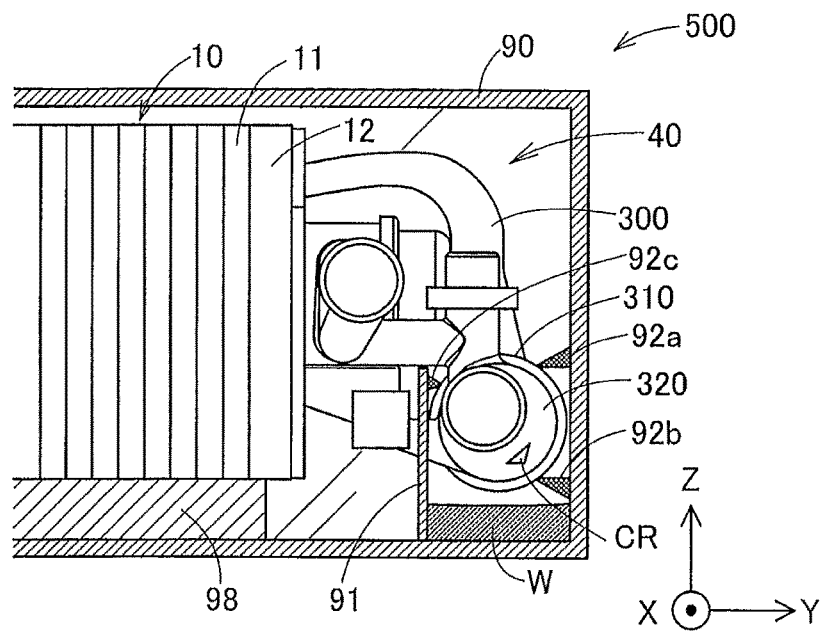
FIGS. 36A and 36B are diagrams illustrating the functions of a waterproof wall and first to third protrusions.

FIG. 36A is a diagram illustrating the functions of the waterproof wall 91. FIG. 36A is a schematic left side view similar to FIG. 34A but illustrates only the piping unit 40-side of the fuel cell unit 500. In the illustrated state of FIG. 36A, a crack CR occurs on the lower portion of the side face of the downstream cathode gas piping 320 to cause leakage of drainage water from the downstream cathode gas piping 320.

As described above, in the fuel cell unit 500, even when a crack CR occurs on the wall face of the downstream cathode off-gas piping 320 to cause leakage of drainage water, the waterproof wall 91 blocks the flow of leaked drainage water W into the fuel cell 10. In other words, the waterproof wall 91 forms a water reservoir for the leaked drainage water W in the casing 90. In the fuel cell unit 500, this structure effectively prevents degradation and electrical leakage of the fuel cell 10 due to damage of the piping unit 40.

Figure 36B:
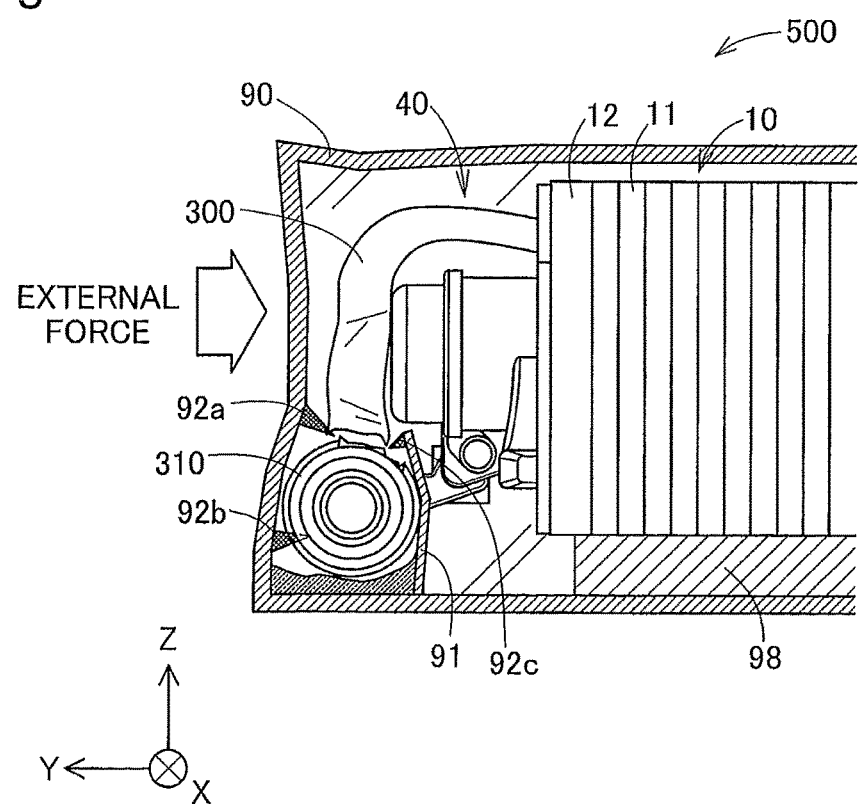

FIG. 36B is a diagram illustrating the functions of the first to the third protrusions 92a to 92c. FIG. 36B is a schematic right side view similar to FIG. 34B but illustrates only the piping unit 40-side of the fuel cell unit 500. In the illustrated state of FIG. 36B, an external force is applied to the front face of the fuel cell unit 500, for example, by collision of an external object so as to crush the front face of the fuel cell unit 500.

In this case, the respective pointing ends of the first to the third protrusions 92a to 92c stick into the respective proximate parts of the piping unit 40 to daringly cause a crack in the piping unit 40. More specifically, the pointing ends of the first and the third protrusions 92a and 92c respectively stick into the connection between the upstream cathode off-gas piping 300 and the cathode exhaust valve 310, while the second protrusion 92b sticks into the lower face of the casing of the cathode exhaust valve 310.

Sticking the first and the third protrusions 92a and 92c disengages the cathode exhaust valve 310 from the upstream cathode off-gas piping 300. In this state, the first and the third protrusions 92a and 92c serve as pressure members to prevent the cathode exhaust valve 310 from jumping over the waterproof wall 91 to the side of the fuel cell 10. The second protrusion 92b serves as a holder member to prevent the drop-off of the cathode exhaust valve 310. Additionally, the first and the third protrusions 92a and 92c serve as brim members to prevent the drainage water from spattering over the waterproof wall 91 to the side of the fuel cell 10.

In the event of disengagement of the cathode exhaust valve 310, it is preferable that the downstream cathode off-gas piping 320 likely to contain a significant amount of drainage water is dropped off in the water reservoir formed by the waterproof wall 91. For this purpose, it is desirable to break the cathode bypass piping 200 and disconnect the downstream cathode off-gas piping 320 from the upstream cathode bypass piping 100. In order to prevent leakage and spatter of drainage water, it is desirable to break the upstream portion of the cathode bypass piping 200, which is relatively unlikely to contain water, in the upstream of the bypass piping valve 210.

In this piping unit 40, the rigidity of the material used for the wall surface of the cathode bypass piping 200 is arranged to decrease from the downstream side toward the upstream side of the bypass piping valve 210. More specifically, the cathode bypass piping 200 is arranged to have the less thickness of the piping wall surface in the upstream of the bypass piping valve 210 than the thickness of the piping wall surface in the downstream of the bypass piping valve 210 (FIG. 11). This increases the possibility that the cathode bypass piping 200 is broken in the upstream of the bypass piping valve 210.

Materials of different rigidities may be used for the upstream portion and the downstream portion of the cathode bypass piping 200 in the upstream and in the downstream of the bypass piping valve 210. The upstream tube section 201 of the cathode bypass piping 200 may be formed to have a thin-walled portion to induce the breakage.

When the piping unit 40 is broken by the first to the third protrusions 92a to 92c as described above, drainage water leaks through the breakage and is accumulated in the water reservoir described in FIG. 36A. Even when the fuel cell unit 500 is crushed, this prevents the drainage water in the piping unit 40 from leaking into the fuel cell 10. According to this embodiment, in the case of an accident, the first to the third protrusions 92a to 92c form the water drain to discharge the drainage water into the water reservoir.

As described above, in the fuel cell unit 500 of the embodiment, even when drainage water is leaked from the piping unit 40, the waterproof wall 91 of the casing 90 protects the fuel cell 10 from the leaked drainage water. Even when the fuel cell unit 500 is crushed by an accident, the first to the third protrusions 92a to 92c specify the locations of cracks in the piping unit 40 and cause the drainage water from leaking through such cracks into the water reservoir. The fuel cell unit 500 of the embodiment can thus prevent the leaked drainage water W from moving to the fuel cell 10.

E. Modifications

The invention is not limited to the above embodiments or various other structural examples, but a multiplicity of variations and modifications may be made to the embodiments and various other structural examples without departing from the scope of the invention. For example, the structure described in the first embodiment may be combined adequately with a plurality of structures described in the other structural examples. Some examples of possible modification are described below.

E1. Modification 1

In the first embodiment described above, the cathode gas supply passage 41 is coupled with the cathode gas discharge passage 42 by the cathode bypass piping 200 and at the junction between the casing cap 118 of the cathode supply valve 110 and the upstream cathode off-gas piping 300. The cathode gas supply passage 41 and the cathode gas discharge passage 42 may be coupled with each other via another joint. For example, a support rod may be provided to be connected with the upstream cathode gas piping 100 and the downstream cathode off-gas piping 120. In another example, the flange 121 may be integrated with the flange 301. In yet another example, the outer wall surfaces of the upstream cathode gas piping 100 and the downstream cathode off-gas piping 120 may be in contact with each other and joined with each other.

E2. Modification 2

In the first embodiment described above, the piping unit 40 has the cathode bypass piping 200. The cathode bypass piping 200 may, however, be omitted. In the first embodiment described above, the piping unit 40 has the anode gas discharge passage 43. The anode gas discharge passage 43 may, however, be omitted.

E3. Modification 3

In the above embodiment, the fuel cell 10 has the anode manifolds M1 and M2, the cathode manifolds M3a, M3b, M4a and M4b and the coolant manifolds M5 and M6. The arrangement and the number of manifolds for the reactive gases and the coolant of the fuel cell 10 are, however, not limited to the above embodiment but may be modified in various ways. The orientation of the fuel cell 10 is not limited to the direction described in the above embodiment.

E4. Modification 4

In the above embodiment, the anode gas discharge passage 43 is attached to the downstream cathode off-gas piping 320 and is then mounted on and joined with the flange 402 (FIGS. 17A and 17B). The anode gas discharge passage 43 may, however, be mounted on the flange 402 and then be attached to and joined with the downstream cathode off-gas piping 320.

E5. Modification 5

In the above embodiment, the cathode bypass piping 200 includes the upstream tube section 201 extended from the upstream cathode gas piping 110 in the direction opposite to the first end plate 12 (direction of the arrow Y) and the downstream tube section 202 bent from the upstream tube section 201 and extended to the downstream cathode off-gas piping 320 located below the downstream tube section 202 in the direction of gravity. The cathode bypass piping 200 may not, however, be made of such a bent tube but may be made of, for example, a linear tube. The cathode piping valve 210 may be a butterfly valve, instead of the poppet valve.

E6. Modification 6

In the above embodiment, the upstream cathode off-gas piping 300 includes the upstream tube section 302 extended from the flange 301 in the direction of the arrow Y and has the bottom face inclined more upward on the lower stream side. The upstream tube section 302 may not, however, have the bottom face inclined more upward on the lower stream side.

E7. Modification 7

In the second embodiment described above, the bypass valve monitor 71 uses the stuck-open state detection map MP to detect reduction of the power generation efficiency of the fuel cell 10, so as to determine whether the stuck-open state of the bypass valve 210 occurs. The bypass valve monitor 71 may, however, adopt another means to determine whether the stuck-open state of the bypass valve 210 occurs. For example, an air flow meter may be located in the downstream of the bypass valve 210, and the bypass valve monitor 71 may determine the occurrence or non-occurrence of the stuck-open state based on its measurement result. In another example, an air flow meter may be located in the downstream of the connecting location between the upstream cathode gas piping 100 and the cathode bypass piping 200, and the bypass valve monitor 71 may determine the occurrence or non-occurrence of the stuck-open state based on the comparison between its measurement result and the operating condition of the air compressor 20.

E8. Modification 8

In the second embodiment described above, the valve recovery processor 72 controls the cathode exhaust valve 310 and the air compressor 20 as the process to eliminate the stuck-open state of the bypass valve 210 (steps S30 and S40 in FIG. 31). The valve recovery processor 72 may, however, perform another process to eliminate the stuck-open state of the bypass valve 210. For example, the valve recovery processor 72 may continually repeat the opening/closing operations of the bypass valve 210 for a predetermined time.

E9. Modification 9

In the third embodiment described above, the first to the third protrusions 92a to 92c are formed in the casing 90 of the fuel cell unit 500. One, two or all of these first to third protrusions 92a to 92c may, however, be omitted. In another example, a plurality of protrusions may be formed in addition to the first to the third protrusions 92a to 92c. A similar protrusion to the first to the third protrusions 92a to 92c may be formed at the position different from those described in the third embodiment. For example, a protrusion may be formed at the position that allows cracking on the wall surface of the downstream cathode off-gas piping 320. It is preferable that these protrusions are formed at the positions with substantially no possibility of being in contact with the current-carrying body, such as motor or wiring, attached to the piping unit 40.

E10. Modification 10

In the third embodiment described above, the waterproof wall 91 is provided in the casing 90 of the fuel cell unit 500 to form the water reservoir, where the cathode exhaust valve 310 and the downstream cathode off-gas piping 320 are placed. The waterproof wall 91 may not, however, be provided to form the water reservoir. The waterproof wall 91 may be provided as a wall member located between the cathode exhaust valve 310 with the downstream cathode off-gas piping 320 and the first end plate 12. For example, the wall surface of the bottom face of the casing 90 may accordingly be separate from the waterproof wall 91. In this modified structure, the waterproof wall 91 prevents the leaked drainage water from the cathode exhaust valve 310 and the downstream cathode off-gas piping 320 from being spattered to the fuel cell 10 and thereby protects the fuel cell 10.

REFERENCE SIGNS LIST 10, 10B, 10E Fuel cell
11 Unit cell
12, 12E First end plate
13 Second end plate
15 Clamping member
16 Recess
17 Flow channel
20 Air compressor
21 Tube
30 Anode gas supplier
31 Anode gas supply piping
32 Regulator
33 On-off valve
40, 40B, 40C, 40E, 40J Piping Unit
41, 41A, 41B, 41C, 41D, 41E, 41J Cathode gas supply passage
42, 42B, 42E Cathode gas discharge passage
43, 43B, 43E, 43J Anode gas discharge passage
50 Hydrogen pump
70, 70K Controller
71 Bypass valve monitor
72 Valve recovery processor
80 Voltage sensor
90 Casing
91 Waterproof wall
92a First protrusion
92b Second protrusion
92c Third protrusion
94 Recess
98 Base
100, 100A, 100B, 100C, 100E Upstream cathode gas piping
101 Cylindrical tube section
102 Connecting tube section
110, 110B, 110C, 110E Cathode supply valve
111 Outlet
112 Valve plug
113 Diaphragm
114 Pressing mechanism
115 Inlet
116 Valve seat
117 Casing
118 Casing cap
119 Thin-walled portion
120, 120B, 120J Downstream cathode gas piping
121, 121D Flange
122 Curved convex
123 Bend
124 Flow channel closing member
141 First opening
142 Second opening 143 Flange
150 Valve seat plate
151, 152 Plate surfaces
153 Through window
155 Reed valve
200, 200B, 200C, 200E, 200F, 200G Cathode bypass piping
201, 201C, 201E Upstream tube section
202, 202B, 202C Downstream tube section
204 Inner wall surface
205 Junction
210 Bypass piping valve
211 Motor
212 Valve plug
213 Valve seat
300, 300B, 300E Upstream cathode off-gas piping
301 Flange
302 Upstream tube section
303 Downstream tube section
310 Cathode exhaust valve
310 Exhaust valve
311 Motor
312 Inlet
313 Outlet
314 Valve seat
315 Valve plug
320 Downstream cathode off-gas piping
400 Anode off-gas piping
401 Opening
402 Flange
403 Thin-walled portion
410 Gas-liquid separator
411 Water reservoir
412 Higher floor face
413 Lower floor face
413w Bulkhead
414 Inner wall surface
415 Anode drain valve
4151 Inlet
4152 Outlet
4153 Valve plug
420, 420B, 420E Separate water drainage piping
425 Opening
430, 430B, 430E, 430J Separate off-gas piping
432 Bulkhead
500 Fuel cell unit
1000 Fuel cell system
CR Crack
Ind Bend
M1 Anode supply manifold
M2 Anode exhaust manifold
M3a First cathode supply manifold
M3b Second cathode supply manifold
M4a First cathode exhaust manifold
M4b Second cathode exhaust manifold
M5 Coolant supply manifold
M6 Coolant discharge manifold
MP Stuck-open state detection map
SL Seal line
W Liquid water, Leaked drainage water

The invention claimed is:

1. A piping unit for a fuel cell, which is connected with the fuel cell having a cathode gas supply manifold and a cathode gas exhaust manifold formed in one end plate, the piping unit for the fuel cell comprising:
a cathode gas supply passage arranged to supply a cathode gas to the fuel cell; and
a cathode gas discharge passage arranged to discharge a cathode off-gas from the fuel cell, wherein
the cathode gas supply passage includes: a cathode supply valve configured to control flow of the cathode gas; upstream cathode gas piping connected with an inlet of the cathode supply valve; and downstream cathode gas piping connected with an outlet of the cathode supply valve and connected with the cathode gas supply manifold,
the cathode gas discharge passage includes: a cathode exhaust valve configured to control flow of the cathode off-gas; upstream cathode off-gas piping connected with an inlet of the cathode exhaust valve and connected with the cathode gas exhaust manifold; and downstream cathode off-gas piping connected with an outlet of the cathode exhaust valve,
the cathode supply valve is fixed to the end plate via the downstream cathode gas piping and an outlet of the cathode supply valve is open toward the end plate,
the cathode supply gas passage includes a cathode bypass piping arranged to connect the upstream cathode gas piping with the downstream cathode off-gas piping and bypass part of the cathode gas to the downstream cathode off-gas piping, and a bypass piping valve configured to control flow of the cathode gas in the cathode bypass piping,
the cathode gas supply passage and the cathode gas discharge passage are coupled with each other integrally by the cathode bypass piping that connects the upstream cathode gas piping and the downstream cathode off-gas piping,
the downstream cathode gas piping has a passage outer wall formed to surround an outer periphery of an outlet of the cathode supply valve and the gas supply manifold, and gradually widen along the outer surface of the end plate in a direction from the outlet of the cathode supply valve to the gas supply manifold, and
the passage outer wall is attached to the end plate to form a cavity between an inner wall surface of the passage outer wall and the outer surface of the end plate extending from the outlet of the cathode supply valve to the cathode gas supply manifold such that the outer surface of the end plate is used as a guide wall surface to introduce the cathode gas to the gas supply manifold.

2. The piping unit for the fuel cell according to claim 1, wherein
the cathode supply valve is placed in a plane of the end plate and is located above the cathode exhaust valve in a direction of gravity,
the upstream cathode gas piping is extended along outer surface of the end plate to be connected with the cathode supply valve,
the downstream cathode off-gas piping is located below the upstream cathode gas piping in the direction of gravity to be more distant away from the end plate than the upstream cathode gas piping and is extended in parallel to the upstream cathode gas piping to be connected with the cathode exhaust valve.

3. The piping unit for the fuel cell according to claim 2, further comprising:
an anode gas discharge passage arranged to discharge an anode off-gas from the fuel cell, wherein
the anode gas discharge passage includes: anode off-gas piping connected with an anode gas exhaust manifold formed in the end plate and configured to have a gas-liquid separating structure to separate water from the anode off-gas; separate gas piping arranged to introduce a gas component separated by the gas-liquid separating structure; and separate water drainage piping arranged to introduce and discharge the water separated by the gas-liquid separating structure, the separate water drainage piping has a bottom face provided to be located above a bottom face of the downstream cathode off-gas piping in the direction of gravity, and the anode gas discharge passage is located between the end plate and the downstream cathode off-gas piping and is integrated with the cathode gas discharge passage by the separate water drainage piping inclined downward in the direction of gravity to and connected with the downstream cathode off-gas piping.

4. The piping unit for the fuel cell according to claim 3, wherein
the downstream cathode off-gas piping is connected with the cathode exhaust valve at a first connecting location and is connected with the separate water drainage piping at a second connecting location, and
the cathode bypass piping is inclined to and connected with the downstream cathode off-gas piping to be open toward either the first connecting location or the second connecting location.

5. The piping unit for the fuel cell according to claim 2, wherein
the upstream cathode off-gas piping includes a first gas tube section inclined upward in the direction of gravity from a junction with the cathode gas exhaust manifold, and a second gas tube section extended downward in the direction of gravity from the first gas tube section.

6. The piping unit for the fuel cell according to claim 2, wherein
the cathode bypass piping includes an upstream tube section extended from the upstream cathode gas piping in a direction opposite to the end plate, and a downstream tube section bent from the upstream tube section and extends toward the downstream cathode off-gas piping located below the downstream tube section in the direction of gravity, and
the bypass piping valve is placed inside the downstream tube section and has a valve plug configured to move along a piping direction of the downstream tube section and a valve seat located below the valve plug in the direction of gravity and configured to receive the valve plug.

7. The piping unit for the fuel cell according to claim 1, wherein
the cathode supply valve is configured to have an inlet formed to be open to a direction along outer surface of the end plate and an outlet formed to be open to the outer surface of the end plate.

8. The piping unit for the fuel cell according to claim 1, wherein
the cathode supply valve is a poppet valve opened and closed by moving a valve plug along an opening direction of the inlet, and
the upstream cathode gas piping has a cross-sectional shape substantially fixed from an upstream end to a downstream end.

9. A fuel cell unit, comprising:
a fuel cell having a cathode gas supply manifold and a cathode gas exhaust manifold formed in one end plate;
the piping unit for the fuel cell according to claim 1 to be connected with the fuel cell; and
a housing provided to place the fuel cell and the piping unit for fuel cell therein, wherein
the housing has a bulkhead formed between the downstream cathode off-gas piping of the piping unit for fuel cell and the end plate of the fuel cell.

10. A fuel cell system, comprising:
a fuel cell having a cathode gas supply manifold and a cathode gas exhaust manifold formed in one end plate;
the piping unit for the fuel cell according to claim 6 to be connected with the fuel cell;
a controller configured to control opening/closing of the cathode exhaust valve and the bypass piping valve of the piping unit for fuel cell, so as to regulate a flow rate of a cathode gas to be supplied to the fuel cell; and
a stuck-open state detector configured to detect a stuck-open state of the bypass piping valve, wherein
when the stuck-open state detector detects the stuck-open state of the bypass piping valve, the controller controls the cathode exhaust valve to be closed, so as to increase a flow rate of a gas flowing into the bypass piping valve and thereby increase an external force applied to the valve plug.

11. The piping unit for the fuel cell according to claim 2, wherein
the upstream cathode off-gas piping is extended from the cathode exhaust valve beyond the cathode supply valve upward in the direction of gravity to be connected with the cathode gas exhaust manifold.

12. The piping unit for the fuel cell according to claim 1, wherein
prior to being integrated with each other via the cathode bypass piping, the cathode gas supply passage and the cathode gas discharge passage are separate parts.

* * * * *